(12) United States Patent
Li

(10) Patent No.: US 9,860,927 B2
(45) Date of Patent: Jan. 2, 2018

(54) METHOD, APPARATUS, AND SYSTEM FOR ESTABLISHING COOPERATIVE COMMUNICATION

(71) Applicant: Huawei Technologies Co., Ltd., Shenzhen (CN)

(72) Inventor: Hantao Li, Beijing (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 15/192,650

(22) Filed: Jun. 24, 2016

(65) Prior Publication Data

US 2016/0309529 A1 Oct. 20, 2016

Related U.S. Application Data

(63) Continuation of application No. PCT/CN2013/090457, filed on Dec. 25, 2013.

(51) Int. Cl.
*H04W 88/04* (2009.01)
*H04W 76/02* (2009.01)
(Continued)

(52) U.S. Cl.
CPC ......... *H04W 76/021* (2013.01); *H04W 4/008* (2013.01); *H04W 12/06* (2013.01);
(Continued)

(58) Field of Classification Search
CPC combination set(s) only.
See application file for complete search history.

(56) References Cited

U.S. PATENT DOCUMENTS 8,280,373 B2* 10/2012 Huggett ............... H04L 63/101
455/411
9,578,635 B2* 2/2017 Vannithamby .... H04W 52/0258
(Continued)

FOREIGN PATENT DOCUMENTS

CN 101217784 A 7/2008
CN 101562863 A 10/2009
(Continued)

OTHER PUBLICATIONS

"General Considerations for D2D Discovery," 3GPP TSG-RAN1 Meeting #73, R1-132067, Agent Item 6.2.7.3, Alcatel-Lucent, Alcatel-Lucent Shanghai Bell, Discussion, pp. 104, Fukuoka, Japan, May 2013.

(Continued)

*Primary Examiner* — Cindy Trandai
(74) *Attorney, Agent, or Firm* — Slater Matsil, LLP

(57) ABSTRACT

Embodiments of the present disclosure provide a method that includes receiving, by supporting user equipment UE, a pairing request message sent by a network side; and acquiring, by the supporting UE, a friend UE short-distance identifier list when self supporting capability information of the supporting UE indicates that the supporting UE supports a friend UE. The method also includes performing, by the supporting UE, identity authentication on the benefitted UE according to the friend UE short-distance identifier list and a short-distance identifier of a benefitted UE that is carried in the pairing request message. The method also includes performing, by the supporting UE, pairing processing with the benefitted UE, and sending a pairing response message to the network side, if the benefited UE has been authenticated.

20 Claims, 15 Drawing Sheets

(51) Int. Cl.
    *H04W 4/00*     (2009.01)
    *H04W 12/06*     (2009.01)

(52) U.S. Cl.
    CPC ....... *H04W 76/023* (2013.01); *H04W 76/027* (2013.01); *H04W 88/04* (2013.01)

(56) References Cited

U.S. PATENT DOCUMENTS

| | | | |
|---|---|---|---|
| 9,622,156 B2 * | 4/2017 | Calcev | H04W 48/16 |
| 9,730,003 B2 * | 8/2017 | Gu | H04W 4/008 |
| 2003/0153300 A1 * | 8/2003 | Nakao | H04W 12/06 455/410 |
| 2007/0030824 A1 * | 2/2007 | Ribaudo | G01S 5/0018 370/328 |
| 2007/0189322 A1 * | 8/2007 | Hirose | H04W 8/245 370/447 |
| 2007/0223438 A1 | 9/2007 | Bennett | |
| 2007/0287421 A1 * | 12/2007 | Kirke | H04L 63/102 455/411 |
| 2010/0093346 A1 * | 4/2010 | Song | H04L 41/12 455/435.1 |
| 2010/0274859 A1 * | 10/2010 | Bucuk | H04L 63/08 709/206 |
| 2010/0275249 A1 * | 10/2010 | McCann | H04L 63/08 726/5 |
| 2011/0280228 A1 * | 11/2011 | McCann | H04W 48/14 370/338 |
| 2011/0280234 A1 * | 11/2011 | Wentink | H04W 8/005 370/338 |
| 2011/0299481 A1 * | 12/2011 | Kim | H04W 48/14 370/329 |
| 2012/0076118 A1 * | 3/2012 | Montemurro | H04W 48/16 370/338 |
| 2012/0284413 A1 | 11/2012 | Miura | |
| 2012/0322379 A1 | 12/2012 | Eun et al. | |
| 2013/0017816 A1 * | 1/2013 | Talty | H04W 4/008 455/418 |
| 2013/0029597 A1 * | 1/2013 | Liu | H04W 12/06 455/41.1 |
| 2013/0107757 A1 * | 5/2013 | Cherian | H04W 48/16 370/255 |
| 2013/0152147 A1 * | 6/2013 | Toney, Jr. | H04N 21/4722 725/110 |
| 2013/0281056 A1 * | 10/2013 | Abraham et al. | H04W 48/16 455/411 |
| 2014/0106673 A1 * | 4/2014 | Son | A61B 5/0024 455/41.1 |
| 2014/0254523 A1 * | 9/2014 | Chai | H04W 76/02 370/329 |
| 2014/0370879 A1 * | 12/2014 | Redding | H04W 4/001 455/419 |
| 2015/0163843 A1 | 6/2015 | Zhu et al. | |
| 2015/0245398 A1 * | 8/2015 | Cserna | H04L 67/303 455/41.1 |
| 2015/0351145 A1 * | 12/2015 | Burks | G08C 17/02 455/41.3 |
| 2016/0174278 A1 | 6/2016 | Gao et al. | |

FOREIGN PATENT DOCUMENTS

| | | |
|---|---|---|
| CN | 103188706 A | 7/2013 |
| CN | 103460780 A | 12/2013 |
| EP | 2922327 A1 | 9/2015 |
| WO | 2012118311 A2 | 9/2012 |
| WO | 2013166999 A1 | 11/2013 |
| WO | 2014026384 | 2/2014 |

OTHER PUBLICATIONS

"Future Smartphone Solution White Paper," Issue 2.0, Change History, Huawei Technologies, Smartphone Ecosystem R&D Support Team, Sep. 17, 2012, 32 pages.

Li, Yue et al., "System Design for Multiple Users Cooperative Communication in LTE," IEEE Vehicular Technology conference (VTC Fall), 2013 IEEE 78th, Sep. 2-5, 2013, 6 pages.

Mao, Yinian et al., "Security Issues in Cooperative Communications: Tracing Adversarial Relays," Department of ECE University of Maryland, IEEE ICASSP 2006, 4 pages.

* cited by examiner

METHOD, APPARATUS, AND SYSTEM FOR ESTABLISHING COOPERATIVE COMMUNICATION

CROSS-REFERENCE TO RELATED APPLICATIONS

This application is a continuation of International Application No. PCT/CN2013/090457, filed on Dec. 25, 2013, which application is hereby incorporated herein by reference.

TECHNICAL FIELD

The present disclosure relates to the communications field, and in particular embodiments, to a method, an apparatus, and a system for establishing cooperative communication.

BACKGROUND

With rapid development of mobile communications technologies, there is an increasing focus on a multiple user equipment cooperative communications technology. In the multiple user equipment cooperative communications technology, because D2D (device to device) communications technology may be used to implement communication between terminals, it becomes possible that UEs (user equipment) support each other, so that data to be sent by a base station to UE may be first sent to another UE (that is, supporting UE, S-UE) near the UE, and is then forwarded to final target UE (that is, benefitted UE, B-UE) by using a short-range communications technology between UEs. In this way, in short-range communication between the UEs, UE having an optimal channel condition may be selected to send data, and therefore, by using a multiuser diversity scheduling gain, a customer edge rate may be increased and efficiency of spectral utilization may be increased.

The multiple user equipment cooperative communications technology includes two parts: device discovery of B-UE and MUCC (multiple user equipment cooperative communications technology) pairing. In a process of device discovery of B-UE, the B-UE discovers that another UE is within a short-distance range of the B-UE, and discovered UE list information within the short-distance range is registered in a short-distance device list, corresponding to the B-UE, in a short-distance service server. When the B-UE runs an application that supports short-distance discovery, the short-distance device list corresponding to the B-UE may be acquired from the short-distance service server. The B-UE sends, to the base station, the acquired short-distance device list corresponding to the B-UE. In a process of MUCC pairing, the base station acquires channel quality of a communication link between UEs served by the base station and the base station, further acquires channel quality of a communication link between the B-UE and S-UEs of the B-UE, and determines S-UE, where channel quality of a communication link between the B-UE and the S-UE and channel quality of a communication link between the S-UE and the base station are better than channel quality of a direct communication link between the B-UE and the base station, so as to complete a process of pairing.

In the cooperative communications technology, because data needs to be transmitted between the S-UE and the B-UE, if the S-UE is any short-distance UE in the short-distance device list of the B-UE, if the S-UE and the B-UE are not related to each other, data transmitted by the base station to the B-UE is acquired by the S-UE, which impairs security of data transmission of the B-UE, and further impairs user experience of the S-UE and the B-UE.

SUMMARY

Embodiments of the present invention provide a method, an apparatus, and a system for establishing cooperative communication, so as to improve security of data transmission of UE, and improve user experience of the UE.

To achieve the foregoing objective, the following technical solutions are adopted in the embodiments of the present invention:

According to a first aspect, an embodiment of the present invention provides a method for establishing cooperative communication, including: receiving, by supporting user equipment UE, a pairing request message sent by a network side, where the pairing request message carries a short-distance identifier of benefitted UE; when self supporting capability information of the supporting UE indicates that the supporting UE supports only friend UE, acquiring, by the supporting UE, a friend UE short-distance identifier list, where the friend UE short-distance identifier list is used to record short-distance identifier information of UE that is served by the supporting UE and that is related to the supporting UE; performing, by the supporting UE, identity authentication on the benefited UE according to the friend UE short-distance identifier list and the short-distance identifier of the benefitted UE that is carried in the pairing request message; and if the benefitted UE has been authenticated, performing, by the supporting UE, pairing processing with the benefitted UE, and sending a pairing response message to the network side.

In an implementation of the first aspect, the acquiring, by the supporting UE, a friend UE short-distance identifier list includes: sending, by the supporting UE, a friend UE short-distance identifier list request message to a multiple user equipment cooperative communication mobile broadband control server (MUCC MBB Control Server), where the friend UE short-distance identifier list request message carries a short-distance identifier of the supporting UE; and receiving, by the supporting UE, a friend UE short-distance identifier list response message sent by the MUCC MBB Control Server, where the friend UE short-distance identifier list response message carries the friend UE short-distance identifier list.

In an implementation of the first aspect, after the receiving, by supporting UE, a pairing request message sent by a network side, when the self supporting capability information of the supporting UE indicates that the supporting UE supports only friend UE, before the acquiring, by the supporting UE, a friend UE short-distance identifier list of the supporting UE, the method further includes: determining, by the supporting UE, whether the supporting UE provides a supporting service; and when the self supporting capability information of the supporting UE indicates that the supporting UE supports only friend UE, the acquiring, by the supporting UE, a friend UE short-distance identifier list of the supporting UE includes: in a case in which the supporting UE determines that the supporting UE provides a supporting service, when the self supporting capability information of the supporting UE indicates that the supporting UE supports only friend UE, acquiring, by the supporting UE, the friend UE short-distance identifier list of the supporting UE.

In an implementation of the first aspect, the method further includes: in a case in which the supporting UE determines that the supporting UE does not provide a supporting service, sending a pairing failure response message to the network side.

In an implementation of the first aspect, the method further includes: when the self supporting capability information of the supporting UE indicates that the supporting UE supports all UEs, performing, by the supporting UE, pairing processing with the benefitted UE, and sending the pairing response message to the network side.

In an implementation of the first aspect, the pairing response message includes: a pairing establishment response message or the pairing failure response message.

In an implementation of the first aspect, the method further includes: if the benefitted UE has not been authenticated, sending, by the supporting UE, the pairing failure response message to the network side.

According to a second aspect, an embodiment of the present invention provides a method for establishing cooperative communication, including: acquiring, by benefitted UE, a first short-distance identifier list, where the first short-distance identifier list of the benefitted UE is used to record short-distance identifier information of UE that provides a service to the benefitted UE; when self benefitted capability information of the benefitted UE indicates that the benefitted UE allows only friend UE of the benefitted UE to provide support, acquiring, by the benefitted UE, a friend UE short-distance identifier list, where the friend UE short-distance identifier list is used to record short-distance identifier information of UE related to the benefitted UE; determining, by the benefitted UE, a first friend supporting UE list of the benefitted UE in the first short-distance identifier list of the benefitted UE according to the friend UE short-distance identifier list, where the first friend supporting UE list of the benefitted UE is used to record short-distance identifier information of friend supporting UE of the benefitted UE, and the short-distance identifier information of the friend supporting UE is short-distance identifier information that is in the first short-distance identifier list and that is the same as the short-distance identifier information recorded in the friend UE short-distance identifier list; sending, by the benefitted UE, a multiple user equipment cooperative communication establishment request message carrying first information to a network side, where the first information includes the first friend supporting UE list of the benefitted UE and a short-distance identifier of the benefitted UE; and receiving, by the benefitted UE, a multiple user equipment cooperative communication establishment response message sent by the network side.

In an implementation of the second aspect, the method further includes: when the self benefitted capability information of the benefitted UE indicates that the benefitted UE allows any UE to provide support, sending, by the benefitted UE, a multiple user equipment cooperative communication establishment request message carrying second information to the network side, where the second information includes the first short-distance identifier list of the benefitted UE and the short-distance identifier of the benefitted UE.

In an implementation of the second aspect, the multiple user equipment cooperative communication establishment response message includes: an establishment success response message or an establishment failure response message.

In an implementation of the second aspect, the short-distance identifier information of the UE is further used to identify whether the UE provides a supporting service; after the acquiring, by benefitted UE, a first short-distance identifier list, and before the determining, by the benefitted UE, a first friend supporting UE list of the benefitted UE in the first short-distance identifier list of the benefited UE according to the friend UE short-distance identifier list, the method further includes: determining, in the first short-distance identifier list by the benefitted UE according to each piece of short-distance identifier information recorded in the first short-distance identifier list, short-distance identifier information identifying that a supporting service is provided; and the determining, by the benefitted UE, a first friend supporting UE list of the benefitted UE in the first short-distance identifier list of the benefited UE according to the friend UE short-distance identifier list includes: determining, by the benefitted UE, the first friend supporting UE list of the benefitted UE according to the friend UE short-distance identifier list and the short-distance identifier information, in which a supporting service is provided, in the first short-distance identifier list of the benefitted UE.

According to a third aspect, an embodiment of the present invention provides a method for establishing cooperative communication, including: receiving, by a network side, a multiple user equipment cooperative communication establishment request message sent by benefitted UE, where the multiple user equipment cooperative communication establishment request message carries first information or second information, the first information includes a first friend supporting UE list of the benefitted UE and a short-distance identifier of the benefitted UE, and the second information includes a first short-distance identifier list of the benefitted UE and the short-distance identifier of the benefitted UE; when the multiple user equipment cooperative communication establishment request message carries the first information, sending, by the network side according to each piece of short-distance identifier information in the first friend supporting UE list of the benefitted UE, a pairing request message to friend supporting UE corresponding to each piece of short-distance identifier information in the first friend supporting UE list of the benefitted UE, where the pairing request message carries the short-distance identifier of the benefited UE; or when the multiple user equipment cooperative communication establishment request message carries the second information, sending, by the network side according to each piece of short-distance identifier information in the first short-distance identifier list of the benefited UE, a pairing request message to supporting UE corresponding to each piece of short-distance identifier information in the first short-distance identifier list of the benefited UE, where the pairing request message carries the short-distance identifier of the benefitted UE; and receiving, by the network side, a pairing response message sent by supporting UE corresponding to each piece of short-distance identifier information in the first friend supporting UE list of the benefitted UE or a first short-distance list, and sending a multiple user equipment cooperative communication establishment response message to the benefited UE.

In an implementation of the third aspect, the pairing response message includes: a pairing establishment response message or a pairing failure response message; and the multiple user equipment cooperative communication establishment response message includes: an establishment success response message or an establishment failure response message.

According to a fourth aspect, an embodiment of the present invention provides a method for establishing cooperative communication, including: receiving, by a base station, a multiple user equipment cooperative communication establishment request message sent by benefitted UE, where the multiple user equipment cooperative communication establishment request message carries a short-distance identifier of the benefitted UE; sending, by the base station, a multiple user equipment cooperative communication authentication request message to a first server, where the multiple user equipment cooperative communication authentication request message carries a first short-distance identifier list of the benefitted UE, self benefitted capability information of the benefitted UE, and the short-distance identifier of the benefitted UE, the first short-distance identifier list of the benefitted UE is used to record short-distance identifier information of UE that provides a service to the benefited UE, the self benefitted capability information of the benefitted UE is information used to indicate whether only friend UE provides support to the benefitted UE; receiving, by the base station, a multiple user equipment cooperative communication authentication response message sent by the first server, where the multiple user equipment cooperative communication authentication response message carries a supporting UE short-distance identifier list of the benefitted UE, and the supporting UE short-distance identifier list is used to record short-distance identifier information of UE that is determined by the first server and that provides a service to the benefitted UE; sending, by the base station, a pairing request message to first supporting UE according to the supporting UE short-distance identifier list, where the first supporting UE is UE corresponding to each piece of short-distance identifier information recorded in the supporting UE short-distance identifier list, and the pairing request message carries the short-distance identifier of the benefited UE, so that the first supporting UE determines, according to the short-distance identifier of the benefitted UE, whether the first supporting UE performs pairing with the benefitted UE; and receiving, by the base station, a pairing response message sent by the first supporting UE, and sending a multiple user equipment cooperative communication establishment response message to the benefitted UE.

In an implementation of the fourth aspect, before the receiving, by a base station, a multiple user equipment cooperative communication establishment request message sent by benefitted UE, the method further includes: acquiring, by the base station, an information report of UE, where the information report of the UE carries a first short-distance identifier list of the UE, a short-distance identifier of the UE, and self capability information of the UE, the self capability information of the UE includes self supporting capability information of the UE and self benefitted capability information of the UE, the self supporting capability information of the UE is used to indicate whether the UE supports only friend UE, the self benefitted capability information of the UE is used to indicate whether only friend UE provides support to the UE, and the UE is UE that performs communication with the base station, and includes: the benefitted UE and the first supporting UE.

In an implementation of the fourth aspect, before the sending, by the base station, a multiple user equipment cooperative communication authentication request message to a first server, the method further includes: acquiring, by the base station, link quality information between UE served by the base station and the base station; and updating, by the base station, the first short-distance identifier list of the benefited UE according to the acquired link quality information; and the sending, by the base station, a multiple user equipment cooperative communication authentication request message to a first server includes: sending, by the base station to the first server, the multiple user equipment cooperative communication authentication request message carrying the updated first short-distance identifier list of the benefitted UE, the short-distance identifier of the benefitted UE, and the self benefitted capability information of the benefitted UE.

In an implementation of the fourth aspect, the updating, by the base station, the first short-distance identifier list of the benefited UE according to the acquired link quality information includes: determining, by the base station according to the acquired link quality information in UEs served by the base station, UE whose link with the base station has quality that is less than a first threshold value; and deleting, from the first short-distance identifier list of the benefited UE, short-distance identifier information of the determined UE whose link with the base station has the quality that is less than the first threshold value, and updating the first short-distance identifier list of the benefitted UE.

In an implementation of the fourth aspect, the multiple user equipment cooperative communication authentication response message further carries key information of the benefitted UE and key information of supporting UE corresponding to each piece of short-distance identifier information in the supporting UE short-distance identifier list of the benefitted UE; the pairing request message further carries the key information of the benefited UE; and the pairing response message further carries key information of UE that sends the pairing response message to the base station.

In an implementation of the fourth aspect, the pairing response message includes: a pairing establishment response message or a pairing failure response message; and the multiple user equipment cooperative communication establishment response message includes: an establishment success response message or an establishment failure response message.

According to a fifth aspect, an embodiment of the present invention provides a method for establishing cooperative communication, including: receiving, by a first server, a multiple user equipment cooperative communication authentication request message sent by a base station, where the multiple user equipment cooperative communication authentication request message carries a first short-distance identifier list of benefited UE, self benefited capability information of the benefitted UE, and a short-distance identifier of the benefited UE, the first short-distance identifier list of the benefited UE is used to record short-distance identifier information of UE that provides support to the benefitted UE, and the self benefitted capability information of the benefitted UE is used to indicate whether only friend UE provides support to the benefitted UE; when the self benefitted capability information of the benefited UE indicates that the benefitted UE allows only friend UE to provide support, acquiring, by the first server, a friend UE short-distance identifier list of the benefitted UE according to the short-distance identifier of the benefited UE, where the friend UE short-distance identifier list is used to record short-distance identifier information of UE related to the benefitted UE; determining, by the first server, a first friend supporting UE list of the benefited UE in the first short-distance identifier list of the benefited UE according to the friend UE short-distance identifier list of the benefitted UE, where the first friend supporting UE list of the benefitted UE is used to record the short-distance identifier information of friend supporting UE of the benefitted UE; the short-distance identifier information of the friend supporting UE of the benefitted UE is short-distance identifier information that is in the first short-distance identifier list of the benefitted UE and that is same as the short-distance identifier information recorded in the friend UE short-distance identifier list of the benefitted UE; acquiring, by the first server, self supporting capability information of the friend supporting UE of the benefited UE according to the short-distance identifier information of the friend supporting UE of the benefitted UE, where the self supporting capability information of the friend supporting UE is used to indicate whether the friend supporting UE supports only friend UE; determining, by the first server, a supporting UE short-distance identifier list of the benefitted UE in the first friend supporting UE list of the benefitted UE according to the acquired self supporting capability information of the friend supporting UE of the benefitted UE, where the supporting UE short-distance identifier list of the benefited UE is used to record short-distance identifier information of UE that is determined by the first server and that provides a supporting service to the benefitted UE; and sending, by the first server, a multiple user equipment cooperative communication authentication response message to the base station, where the multiple user equipment cooperative communication authentication response message carries the supporting UE short-distance identifier list of the benefited UE.

In an implementation manner of the fifth aspect, the determining, by the first server, a supporting UE short-distance identifier list of the benefitted UE in the first friend supporting UE list of the benefitted UE according to the acquired self supporting capability information of the friend supporting UE of the benefitted UE includes: if the self supporting capability information of the friend supporting UE that is acquired by the first server indicates that the friend supporting UE supports only friend UE, acquiring, by the first server, a friend UE short-distance identifier list of the friend supporting UE according to the short-distance identifier information of the friend supporting UE; performing, by the first server, identity authentication on the benefitted UE according to the friend UE short-distance identifier list of the friend supporting UE and the short-distance identifier of the benefitted UE; and if the first server determines that the benefitted UE has been authenticated, recording, by the first server, a short-distance identifier of the friend supporting UE to the supporting UE short-distance identifier list of the benefited UE.

In an implementation of the fifth aspect, the determining, by the first server, a supporting UE short-distance identifier list of the benefitted UE in the first friend supporting UE list of the benefitted UE according to the acquired self supporting capability information of the friend supporting UE of the benefitted UE includes: if the self supporting capability information of the friend supporting UE that is acquired by the first server indicates that the friend supporting UE supports all UEs, recording, by the first server, a short-distance identifier of the friend supporting UE to the supporting UE short-distance identifier list of the benefited UE.

In an implementation of the fifth aspect, the method further includes: when the self benefitted capability information of the benefitted UE indicates that the benefitted UE allows any UE to provide support, acquiring, by the first server, self supporting capability information of the first UE, where the first UE is UE corresponding to each piece of short-distance identifier information recorded in the first short-distance identifier list of the benefitted UE; and determining, by the first server, the supporting UE short-distance identifier list of the benefitted UE in the first short-distance identifier list of the benefitted UE according to the self supporting capability information of the first UE.

In an implementation of the fifth aspect, the determining, by the first server, the supporting UE short-distance identifier list of the benefitted UE in the first short-distance identifier list of the benefited UE according to the self supporting capability information of the first UE includes: if the self supporting capability information, acquired by the first server, of the first UE indicates that the first UE supports only friend UE, acquiring, by the first server, a friend UE short-distance identifier list of the first UE according to the first short-distance identifier information of the first UE; performing, by the first server, identity authentication on the benefitted UE according to the friend UE short-distance identifier list of the first UE and the short-distance identifier of the benefitted UE; and if the first server determines that the benefitted UE has been authenticated, recording, by the first server, a short-distance identifier of the first UE to the supporting UE short-distance identifier list of the benefitted UE.

In an implementation of the fifth aspect, the determining, by the first server, the supporting UE short-distance identifier list of the benefitted UE in the first short-distance identifier list of the benefited UE according to the self supporting capability information of the first UE includes: if the self supporting capability information, acquired by the first server, of the first UE indicates that the first UE supports all UEs, recording, by the first server, a short-distance identifier of the first UE to the supporting UE short-distance identifier list of the benefitted UE.

In an implementation of the fifth aspect, the short-distance identifier information of the UE is further used to identify whether the UE provides a supporting service, where the UE includes: the benefitted UE and supporting UE; before the sending, by the first server, a multiple user equipment cooperative communication authentication response message to the base station, the method further includes: determining, by the first server, in the supporting UE short-distance identifier list of the UE according to each piece of short-distance identifier information recorded in the supporting UE short-distance identifier list of the benefitted UE, short-distance identifier information identifying that a supporting service is provided, and updating the supporting UE short-distance identifier list of the UE; and the sending, by the first server, a multiple user equipment cooperative communication authentication response message to the base station, where the multiple user equipment cooperative communication authentication response message carries the supporting UE short-distance identifier list of the benefitted UE includes: sending, by the first server, the multiple user equipment cooperative communication authentication response message to the base station, where the multiple user equipment cooperative communication authentication response message carries the updated supporting UE short-distance identifier list of the UE.

In an implementation of the fifth aspect, before the sending, by the first server, a multiple user equipment cooperative communication authentication response message to the base station, the method further includes: acquiring, by the first server, key information of the benefitted UE and key information of supporting UE corresponding to each piece of short-distance identifier information in the supporting UE short-distance identifier list of the benefitted UE; and the sending, by the first server, a multiple user equipment cooperative communication authentication response message to the base station includes: sending, by the first server, a multiple user equipment cooperative communication authentication response message to the base station, where the multiple user equipment cooperative communication authentication response message further carries the key information of the benefitted UE, and the key information of the supporting UE corresponding to each piece of short-distance identifier information in the supporting UE short-distance identifier list of the benefitted UE.

According to a sixth aspect, an embodiment of the present invention provides a method for establishing cooperative communication, including: sending, by benefited UE, a multiple user equipment cooperative communication establishment request message to a base station, where the multiple user equipment cooperative communication establishment request message carries a short-distance identifier of the benefitted UE; and receiving, by the benefitted UE, a multiple user equipment cooperative communication establishment response message sent by the base station.

In an implementation of the sixth aspect, before the sending, by benefitted UE, a multiple user equipment cooperative communication establishment request message to the base station, the method further includes: acquiring, by the benefited UE, an information report of the benefitted UE, where the information report of the benefitted UE carries a first short-distance identifier list of the benefited UE, the short-distance identifier of the benefitted UE, and self capability information of the benefited UE, the first short-distance identifier list of the benefitted UE is used to record short-distance identifier information of UE that provides a service to the benefitted UE, the self capability information of the benefited UE includes the self supporting capability information of the benefited UE and self benefitted capability information of the benefitted UE, the self supporting capability information of the benefitted UE is used to indicate whether the benefitted UE supports only friend UE, and the self benefitted capability information of the benefitted UE is used to indicate whether only friend UE provides support to the benefitted UE; and sending, by the benefitted UE, the information report of the benefitted UE to the base station.

In an implementation of the sixth aspect, the multiple user equipment cooperative communication establishment response message includes: an establishment success response message or an establishment failure response message.

According to a seventh aspect, an embodiment of the present invention provides a method for establishing cooperative communication, including: receiving, by supporting UE, a pairing request message of a base station, where the pairing request message carries a short-distance identifier of benefitted UE; performing, by the supporting UE, pairing processing with the benefitted UE according to the pairing request message; and sending, by the supporting UE, a pairing response message to the base station, where the pairing response message carries a short-distance identifier of the supporting UE.

In an implementation of the seventh aspect, before the receiving, by supporting UE, a pairing request message of a base station, the method further includes: acquiring, by the supporting UE, an information report of the supporting UE, where the information report of the supporting UE carries a first short-distance identifier list of the supporting UE, the short-distance identifier of the supporting UE, and status information of the supporting UE, the first short-distance identifier list of the supporting UE is used to record short-distance identifier information of UE that provides a service to the supporting UE, self capability information of the supporting UE includes self supporting capability information of the supporting UE and self benefitted capability information of the supporting UE, the self supporting capability information of the supporting UE is used to indicate whether the supporting UE supports only friend UE, and the self benefitted capability information of the supporting UE is used to indicate whether only friend UE provides support to the supporting UE; and sending, by the supporting UE, the information report of the supporting UE to the base station.

In an implementation of the seventh aspect, the pairing request message further carries key information of the benefitted UE; the performing, by the supporting UE, pairing processing with the benefitted UE according to the pairing request message includes: performing, by the supporting UE, pairing processing with the benefitted UE according to the key information of the benefited UE; and the pairing response message further carries key information of the supporting UE.

In an implementation of the seventh aspect, the pairing response message includes: a pairing establishment response message or a pairing failure response message.

According to an eighth aspect, an embodiment of the present invention provides supporting user equipment (UE), including: a receiving unit, configured to receive a pairing request message sent by a network side, where the pairing request message carries a short-distance identifier of benefitted UE; an acquiring unit, configured to: when self supporting capability information of the supporting UE indicates that the supporting UE supports only friend UE, acquire a friend UE short-distance identifier list, where the friend UE short-distance identifier list is used to record short-distance identifier information of UE that is served by the supporting UE and that is related to the supporting UE; a authentication unit, configured to perform identity authentication on the benefited UE according to the friend UE short-distance identifier list acquired by the acquiring unit and the short-distance identifier of the benefitted UE that is carried in the pairing request message received by the receiving unit; a pairing unit, configured to: when the benefitted UE has been authenticated by the authentication unit, perform pairing processing with the benefitted UE; and a sending unit, configured to send a pairing response message to the network side.

In an implementation of the eighth aspect, the acquiring unit is configured to send a friend UE short-distance identifier list request message to a multiple user equipment cooperative communication mobile broadband control server MUCC MBB Control Server, where the friend UE short-distance identifier list request message carries a short-distance identifier of the supporting UE; and receive a friend UE short-distance identifier list response message sent by the MUCC MBB Control Server, where the friend UE short-distance identifier list response message carries the friend UE short-distance identifier list.

In an implementation of the eighth aspect, the method further includes: a determining unit, configured to determine whether the supporting UE provides a supporting service; and the acquiring unit is configured to: in a case in which the determining unit determines that the supporting UE provides a supporting service, when the self supporting capability information of the supporting UE indicates that the supporting UE supports only friend UE, acquire the friend UE short-distance identifier list of the supporting UE.

In an implementation of the eighth aspect, the sending unit is further configured to: in a case in which the determining unit determines that the supporting UE does not provide a supporting service, send a pairing failure response message to the network side.

In an implementation of the eighth aspect, the pairing unit is further configured to: when the self supporting capability information of the supporting UE indicates that the supporting UE supports all UEs, perform pairing processing with the benefited UE.

In an implementation of the eighth aspect, the sending unit is further configured to: when the benefited UE has not been authenticated by the authentication unit, send the pairing failure response message to the network side.

According to a ninth aspect, an embodiment of the present invention provides benefitted UE, including: an acquiring unit, configured to acquire a first short-distance identifier list, where the first short-distance identifier list of the benefitted UE is used to record short-distance identifier information of UE that provides a service to the benefitted UE, where the acquiring unit is further configured to: when self benefitted capability information of the benefitted UE indicates that the benefited UE allows only friend UE to provide support, acquire a friend UE short-distance identifier list, where the friend UE short-distance identifier list is used to record short-distance identifier information of UE related to the benefited UE; a determining unit, configured to determine a first friend supporting UE list of the benefitted UE in the first short-distance identifier list of the benefited UE according to the friend UE short-distance identifier list acquired by the acquiring unit, where the first friend supporting UE list of the benefitted UE is used to record short-distance identifier information of friend supporting UE of the benefitted UE, and the short-distance identifier information of the friend supporting UE is short-distance identifier information that is in the first short-distance identifier list and that is the same as the short-distance identifier information recorded in the friend UE short-distance identifier list; a sending unit, configured to send a multiple user equipment cooperative communication establishment request message carrying first information to a network side, where the first information includes the first friend supporting UE list of the benefitted UE and a short-distance identifier of the benefited UE; and a receiving unit, configured to receive a multiple user equipment cooperative communication establishment response message sent by the network side.

In an implementation of the ninth aspect, the sending unit is further configured to: when the self benefited capability information of the benefitted UE indicates that the benefitted UE allows any UE to provide support, send a multiple user equipment cooperative communication establishment request message carrying second information to the network side, where the second information includes the first short-distance identifier list of the benefitted UE and the short-distance identifier of the benefitted UE.

In an implementation of the ninth aspect, the short-distance identifier information of the UE is further used to identify whether the UE provides a supporting service; the determining unit is further configured to determine, in the first short-distance identifier list according to each piece of short-distance identifier information recorded in the first short-distance identifier list acquired by the acquiring unit, short-distance identifier information identifying that a supporting service is provided; and the determining unit is configured to determine the first friend supporting UE list of the benefitted UE according to the friend UE short-distance identifier list and the short-distance identifier information, in which a supporting service is provided, in the first short-distance identifier list of the benefitted UE.

According to a tenth aspect, an embodiment of the present invention provides an apparatus for establishing cooperative communication, including: a receiving unit, configured to receive a multiple user equipment cooperative communication establishment request message sent by benefited UE, where the multiple user equipment cooperative communication establishment request message carries first information or second information, the first information includes a first friend supporting UE list of the benefited UE and a short-distance identifier of the benefitted UE, and the second information includes a first short-distance identifier list of the benefited UE and the short-distance identifier of the benefitted UE; and a sending unit, configured to: when the multiple user equipment cooperative communication establishment request message carries the first information, send, according to each piece of short-distance identifier information in the first friend supporting UE list of the benefitted UE, a pairing request message to friend supporting UE corresponding to each piece of short-distance identifier information in the first friend supporting UE list of the benefitted UE, where the pairing request message carries the benefited short-distance identifier; or, when the multiple user equipment cooperative communication establishment request message carries the second information, send, according to each piece of short-distance identifier information in the first short-distance identifier list of the benefited UE, a pairing request message to supporting UE corresponding to each piece of short-distance identifier information in the first short-distance identifier list of the benefited UE, where the pairing request message carries the short-distance identifier of the benefitted UE, where the receiving unit is further configured to receive a pairing response message sent by supporting UE corresponding to each piece of short-distance identifier information in the first friend supporting UE list of the benefitted UE or a first short-distance list; and the sending unit is further configured to send a multiple user equipment cooperative communication establishment response message to the benefitted UE.

In an implementation of the tenth aspect, the pairing response message includes: a pairing establishment response message or a pairing failure response message; and the multiple user equipment cooperative communication establishment response message includes: an establishment success response message or an establishment failure response message.

According to an eleventh aspect, an embodiment of the present invention provides a base station, including: a receiving unit, configured to receive a multiple user equipment cooperative communication establishment request message sent by benefitted UE, where the multiple user equipment cooperative communication establishment request message carries a short-distance identifier of the benefitted UE; a sending unit, configured to send a multiple user equipment cooperative communication authentication request message to a first server, where the multiple user equipment cooperative communication authentication request message carries a first short-distance identifier list of the benefited UE, self benefitted capability information of the benefitted UE, and the short-distance identifier of the benefitted UE, the first short-distance identifier list of the benefited UE is used to record short-distance identifier information of UE that provides a service to the benefitted UE, and the self benefitted capability information of the benefitted UE is information used to indicate whether only friend UE provides support to the benefitted UE, where the receiving unit is further configured to receive a multiple user equipment cooperative communication authentication response message sent by the first server, where the multiple user equipment cooperative communication authentication response message carries a supporting UE short-distance identifier list of the benefitted UE, and the supporting UE short-distance identifier list is used to record short-distance identifier information of UE that is determined by the first server and that provides a service to the benefitted UE; the sending unit is further configured to send a pairing request message to first supporting UE according to the supporting UE short-distance identifier list, where the first supporting UE is UE corresponding to each piece of short-distance identifier information recorded in the supporting UE short-distance identifier list, and the pairing request message carries the short-distance identifier of the benefited UE, so that the first supporting UE determines, according to the short-distance identifier of the benefitted UE, whether the first supporting UE performs pairing with the benefitted UE; the receiving unit is further configured to receive a pairing response message sent by the first supporting UE; and the sending unit is further configured to send a multiple user equipment cooperative communication establishment response message to the benefited UE according to the pairing response message received by the receiving unit.

In an implementation of the eleventh aspect, the base station further includes: an acquiring unit, configured to acquire an information report of UE, where the information report of the UE carries a first short-distance identifier list of the UE, a short-distance identifier of the UE, and self capability information of the UE, the self capability information of the UE includes self supporting capability information of the UE and self benefitted capability information of the UE, the self supporting capability information of the UE is used to indicate whether the UE supports only friend UE, the self benefited capability information of the UE is used to indicate whether only friend UE provides support to the UE, and the UE is UE that performs communication with the base station, and includes: the benefitted UE and the first supporting UE.

In an implementation of the eleventh aspect, the apparatus further includes: an update unit, where the acquiring unit is further configured to acquire link quality information between UE served by the base station and the base station; the update unit is configured to update the first short-distance identifier list of the benefitted UE according to the link quality information acquired by the acquiring unit; and the sending unit is configured to send, to the first server, the multiple user equipment cooperative communication authentication request message carrying the updated first short-distance identifier list of the benefitted UE, the short-distance identifier of the benefited UE, and the self benefitted capability information of the benefitted UE.

In an implementation of the eleventh aspect, the update unit is configured to determine, according to the acquired link quality information in UEs served by the base station, UE whose link with the base station has quality that is less than a first threshold value; and delete, from the first short-distance identifier list of the benefited UE, short-distance identifier information of the determined UE whose link with the base station has the quality that is less than the first threshold value, and update the first short-distance identifier list of the benefited UE.

In an implementation of the eleventh aspect, the multiple user equipment cooperative communication authentication response message further carries key information of the benefitted UE and key information of supporting UE corresponding to each piece of short-distance identifier information in the supporting UE short-distance identifier list of the benefitted UE; the pairing request message further carries the key information of the benefited UE; and the pairing response message further carries key information of UE that sends the pairing response message to the base station.

According to a twelfth aspect, an embodiment of the present invention provides a server, including: a receiving unit, configured to receive a multiple user equipment cooperative communication authentication request message sent by a base station, where the multiple user equipment cooperative communication authentication request message carries a first short-distance identifier list of benefitted UE, self benefitted capability information of the benefitted UE, and a short-distance identifier of the benefitted UE, the first short-distance identifier list of the benefitted UE is used to record short-distance identifier information of UE that provides support to the benefitted UE, and the self benefitted capability information of the benefitted UE is used to indicate whether only friend UE provides support to the benefited UE; an acquiring unit, configured to: when the self benefitted capability information of the benefitted UE indicates that the benefitted UE allows only friend UE to provide support, acquire a friend UE short-distance identifier list of the benefited UE according to the short-distance identifier of the benefitted UE, where the friend short UE distance identifier list of the benefitted UE is used to record short-distance identifier information of UE related to the benefitted UE; a determining unit, configured to determine a first friend supporting UE list of the benefitted UE in the first short-distance identifier list of the benefited UE according to the friend UE short-distance identifier list of the benefited UE that is acquired by the acquiring unit, where the first friend supporting UE list of the benefitted UE is used to record short-distance identifier information of friend supporting UE of the benefitted UE, and the short-distance identifier information of the friend supporting UE of the benefitted UE is short-distance identifier information that is in the first short-distance identifier list of the benefitted UE and that is same as the short-distance identifier information recorded in the friend UE short-distance identifier list of the benefitted UE, where the acquiring unit is further configured to acquire self supporting capability information of the friend supporting UE of the benefitted UE the short-distance identifier information, determined by the determining unit, of the friend supporting UE of the benefitted UE, where the self supporting capability information of the friend supporting UE is used to indicate whether the friend supporting UE supports only friend UE; and the determining unit is further configured to determine a supporting UE short-distance identifier list of the benefited UE in the first friend supporting UE list of the benefited UE according to the self supporting capability information, acquired by the acquiring unit, of the friend supporting UE of the benefitted UE, where the supporting UE short-distance identifier list of the benefited UE is used to record short-distance identifier information of UE that is determined by the first server and that provides a supporting service to the benefitted UE; and a sending unit, configured to send a multiple user equipment cooperative communication authentication response message to the base station, where the multiple user equipment cooperative communication authentication response message carries the supporting UE short-distance identifier list of the benefitted UE.

In an implementation of the twelfth aspect, the determining unit is configured to: when the acquired self supporting capability information of the friend supporting UE indicates that the friend supporting UE supports only friend UE, acquire a friend UE short-distance identifier list of the friend supporting UE according to the short-distance identifier information of the friend supporting UE; perform identity authentication on the benefited UE according to the friend UE short-distance identifier list of the friend supporting UE and the short-distance identifier of the benefitted UE; and when it is determined that the benefited UE has been authenticated, record a short-distance identifier of the friend supporting UE to the supporting UE short-distance identifier list of the benefitted UE.

In an implementation of the twelfth aspect, the determining unit is configured to: when the acquired self supporting capability information of the friend supporting UE indicates that the friend supporting UE supports all UEs, record a short-distance identifier of the friend supporting UE to the supporting UE short-distance identifier list of the benefitted UE.

In an implementation of the twelfth aspect, the acquiring unit is further configured to: when the self benefited capability information of the benefitted UE indicates that the benefitted UE allows any UE to provide support, acquire self supporting capability information of first UE, where the first UE is UE corresponding to each piece of short-distance identifier information recorded in the first short-distance identifier list of the benefitted UE; and the determining unit is further configured to determine the supporting UE short-distance identifier list of the benefitted UE in the first short-distance identifier list of the benefited UE according to the self supporting capability information, acquired by the acquiring unit, of the first UE.

In an implementation of the twelfth aspect, the determining unit is configured to: when the self supporting capability information, acquired by the acquiring unit, of the first UE indicates that the first UE supports only friend UE, acquire a friend UE short-distance identifier list of the first UE according to the first short-distance identifier information of the first UE; perform identity authentication on the benefited UE according to the friend UE short-distance identifier list of the first UE and the short-distance identifier of the benefited UE; and when it is determined that the benefitted UE has been authenticated, record a short-distance identifier of the first UE to the supporting UE short-distance identifier list of the benefitted UE.

In an implementation of the twelfth aspect, the determining unit is configured to: when the self supporting capability information, acquired by the acquiring unit, of the first UE indicates that the first UE supports all UEs, record a short-distance identifier of the first UE to the supporting UE short-distance identifier list of the benefitted UE.

In an implementation of the twelfth aspect, the server further includes: an update unit, where the short-distance identifier information of the UE is further used to identify whether the UE provides a supporting service; the determining unit is further configured to determine, in the supporting UE short-distance identifier list of the UE according to each piece of short-distance identifier information recorded in the supporting UE short-distance identifier list of the benefitted UE, short-distance identifier information identifying that a supporting service is provided; the update unit is configured to update the supporting UE short-distance identifier list of the UE according to the short-distance identifier information, identifying that a supporting service is provided, determined by the determining unit; and the sending unit is configured to send the multiple user equipment cooperative communication authentication response message to the base station, where the multiple user equipment cooperative communication authentication response message carries the updated supporting UE short-distance identifier list of the UE.

In an implementation of the twelfth aspect, the acquiring unit is further configured to acquire key information of the benefited UE, and key information of supporting UE corresponding to each piece of short-distance identifier information in the supporting UE short-distance identifier list of the benefited UE, and the sending unit is configured to send the multiple user equipment cooperative communication authentication response message to the base station, where the multiple user equipment cooperative communication authentication response message further carries the key information of the benefitted UE, and the key information of the supporting UE corresponding to each piece of short-distance identifier information in the supporting UE short-distance identifier list of the benefitted UE.

According to a thirteenth aspect, an embodiment of the present invention provides benefitted UE, including: a sending unit, configured to send a multiple user equipment cooperative communication establishment request message to a base station, where the multiple user equipment cooperative communication establishment request message carries a short-distance identifier of the benefited UE; and a receiving unit, configured to receive a multiple user equipment cooperative communication establishment response message sent by the base station.

In an implementation of the thirteenth aspect, the benefitted UE further includes: an acquiring unit, configured to acquire an information report of the benefitted UE, where the information report of the benefitted UE carries a first short-distance identifier list of the benefitted UE, the short-distance identifier of the benefitted UE, and self capability information of the benefited UE, the first short-distance identifier list of the benefitted UE is used to record short-distance identifier information of UE that provides a service to the benefitted UE, the self capability information of the benefitted UE includes the self supporting capability information of the benefited UE and self benefitted capability information of the benefitted UE, the self supporting capability information of the benefited UE is used to indicate whether the benefitted UE supports only friend UE, and the self benefited capability information of the benefitted UE is used to indicate whether only friend UE provides support to the benefited UE, where the sending unit is further configured to send the information report of the benefitted UE to the base station.

According to a fourteenth aspect, an embodiment of the present invention provides supporting UE, including: a receiving unit, configured to receive a pairing request message of a base station, where the pairing request message carries a short-distance identifier of benefitted UE; a processing unit, configured to perform pairing processing with the benefitted UE according to the pairing request message received by the receiving unit; and a sending unit, configured to send a pairing response message to the base station, where the pairing response message carries a short-distance identifier of the supporting UE.

In an implementation of the fourteenth aspect, the supporting UE further includes: an acquiring unit, configured to acquire an information report of the supporting UE, where the information report of the supporting UE carries a first short-distance identifier list of the supporting UE, the short-distance identifier of the supporting UE, and status information of the supporting UE, the first short-distance identifier list of the supporting UE is used to record short-distance identifier information of UE that provides a service to the supporting UE, self capability information of the supporting UE includes self supporting capability information of the supporting UE and self benefited capability information of the supporting UE, the self supporting capability information of the supporting UE is used to indicate whether the supporting UE supports only friend UE, and the self benefited capability information of the supporting UE is used to indicate whether only friend UE provides support to the supporting UE, where the sending unit is further configured to send the information report of the supporting UE to the base station.

In an implementation of the fourteenth aspect, the pairing request message further carries key information of the benefitted UE; the processing unit is configured to perform pairing processing with the benefitted UE according to the key information of the benefitted UE; and the pairing response message further carries key information of the supporting UE.

According to a fifteenth aspect, an embodiment of the present invention provides supporting UE, including: a receiver, configured to receive a pairing request message sent by a network side, where the pairing request message carries a short-distance identifier of benefitted UE; a processor, configured to: when self supporting capability information of the supporting UE indicates that the supporting UE supports only friend UE, acquire a friend UE short-distance identifier list, where the friend UE short-distance identifier list is used to record short-distance identifier information of UE that is served by the supporting UE and that is related to the supporting UE, where the processor is further configured to perform identity authentication on the benefitted UE according to the acquired friend UE short-distance identifier list and the short-distance identifier of the benefitted UE that is carried in the pairing request message received by the receiving unit, and the processor is further configured to: when the benefitted UE has been authenticated, perform pairing processing with the benefitted UE; and a sender, configured to send a pairing response message to the network side.

According to a sixteenth aspect, an embodiment of the present invention provides benefitted UE, including: a processor, configured to acquire a first short-distance identifier list, where the first short-distance identifier list of the benefitted UE is used to record short-distance identifier information of UE that provides a service to the benefited UE, where the processor is further configured to: when self benefitted capability information of the benefitted UE indicates that the benefitted UE allows only friend UE to provide support, acquire a friend UE short-distance identifier list, where the friend UE short-distance identifier list is used to record short-distance identifier information of UE related to the benefitted UE; and the processor is further configured to determine a first friend supporting UE list of the benefitted UE in the first short-distance identifier list of the benefited UE according to the acquired friend UE short-distance identifier list, where the first friend supporting UE list of the benefitted UE is used to record short-distance identifier information of friend supporting UE of the benefitted UE, and the short-distance identifier information of the friend supporting UE is short-distance identifier information that is in the first short-distance identifier list and that is the same as the short-distance identifier information recorded in the friend UE short-distance identifier list; a sender, configured to send a multiple user equipment cooperative communication establishment request message carrying first information to a network side, where the first information includes the first friend supporting UE list of the benefitted UE and a short-distance identifier of the benefitted UE; and a receiver, configured to receive a multiple user equipment cooperative communication establishment response message sent by the network side.

According to a seventeenth aspect, an embodiment of the present invention provides an apparatus for establishing cooperative communication, including: a receiver, configured to receive a multiple user equipment cooperative communication establishment request message sent by benefited UE, where the multiple user equipment cooperative communication establishment request message carries first information or second information, the first information includes a first friend supporting UE list of the benefitted UE and a short-distance identifier of the benefitted UE, and the second information includes a first short-distance identifier list of the benefited UE and the short-distance identifier of the benefitted UE; a sender, configured to: when the multiple user equipment cooperative communication establishment request message carries the first information, send, according to each piece of short-distance identifier information in the first friend supporting UE list of the benefitted UE, a pairing request message to friend supporting UE corresponding to each piece of short-distance identifier information in the first friend supporting UE list of the benefitted UE, where the pairing request message carries the benefited short-distance identifier; or, when the multiple user equipment cooperative communication establishment request message carries the second information, send, according to each piece of short-distance identifier information in the first short-distance identifier list of the benefited UE, a pairing request message to supporting UE corresponding to each piece of short-distance identifier information in the first short-distance identifier list of the benefited UE, where the pairing request message carries the short-distance identifier of the benefitted UE, where the receiver is further configured to receive a pairing response message sent by supporting UE corresponding to each piece of short-distance identifier information in the first friend supporting UE list of the benefitted UE or a first short-distance list, and send a multiple user equipment cooperative communication establishment response message to the benefited UE.

According to an eighteenth aspect, an embodiment of the present invention provides a base station, including: a receiver, configured to receive a multiple user equipment cooperative communication establishment request message sent by benefitted UE, where the multiple user equipment cooperative communication establishment request message carries a short-distance identifier of the benefitted UE; and a sender, configured to send a multiple user equipment cooperative communication authentication request message to a first server, where the multiple user equipment cooperative communication authentication request message carries a first short-distance identifier list of the benefited UE, self benefited capability information of the benefitted UE, and the short-distance identifier of the benefited UE, the first short-distance identifier list of the benefited UE is used to record short-distance identifier information of UE that provides a service to the benefited UE, and the self benefitted capability information of the benefitted UE is information used to indicate whether only friend UE provides support to the benefitted UE, where the receiver is further configured to receive a multiple user equipment cooperative communication authentication response message sent by the first server, where the multiple user equipment cooperative communication authentication response message carries a supporting UE short-distance identifier list of the benefitted UE, and the supporting UE short-distance identifier list is used to record short-distance identifier information of UE that is determined by the first server and that provides a service to the benefitted UE; the sender is further configured to send a pairing request message to first supporting UE according to the supporting UE short-distance identifier list, where the first supporting UE is UE corresponding to each piece of short-distance identifier information recorded in the supporting UE short-distance identifier list, and the pairing request message carries the short-distance identifier of the benefitted UE, so that the first supporting UE determines, according to the short-distance identifier of the benefitted UE, whether the first supporting UE performs pairing with the benefitted UE; the receiver is further configured to receive a pairing response message sent by the first supporting UE; and the sender is further configured to send a multiple user equipment cooperative communication establishment response message to the benefitted UE according to the pairing response message received by the receiver.

According to the nineteenth aspect, an embodiment of the present invention provides a server, including: a receiver, configured to receive a multiple user equipment cooperative communication authentication request message sent by a base station, where the multiple user equipment cooperative communication authentication request message carries a first short-distance identifier list of benefitted UE, self benefitted capability information of the benefitted UE, and a short-distance identifier of the benefitted UE, the first short-distance identifier list of the benefitted UE is used to record short-distance identifier information of UE that provides support to the benefitted UE, and the self benefitted capability information of the benefitted UE is used to indicate whether only friend UE provides support to the benefited UE; a processor, configured to: when the self benefitted capability information of the benefitted UE indicates that the benefitted UE allows only friend UE to provide support, acquire a friend UE short-distance identifier list of the benefited UE according to the short-distance identifier of the benefitted UE, where the friend short UE distance identifier list of the benefited UE is used to record short-distance identifier information of UE related to the benefitted UE, where the processor is further configured to determine a first friend supporting UE list of the benefitted UE in the first short-distance identifier list of the benefited UE according to the acquired friend UE short-distance identifier list of the benefited UE, where the first friend supporting UE list of the benefited UE is used to record short-distance identifier information of friend supporting UE of the benefited UE, and the short-distance identifier information of the friend supporting UE of the benefitted UE is short-distance identifier information that is in the first short-distance identifier list of the benefitted UE and that is the same as the short-distance identifier information recorded in the friend UE short-distance identifier list of the benefitted UE; the processor is further configured to acquire self supporting capability information of the friend supporting UE of the benefitted UE according to the determined short-distance identifier information of the friend supporting UE of the benefitted UE, where the self supporting capability information of the friend supporting UE is used to indicate whether the friend supporting UE supports only friend UE; and the processor is further configured to determine the supporting UE short-distance identifier list of the benefitted UE in the first friend supporting UE list of the benefitted UE according to the acquired self supporting capability information of the friend supporting UE of the benefited UE, where the supporting UE short-distance identifier list of the benefitted UE is used to record short-distance identifier information of UE that is determined by the first server and that provides a supporting service to the benefitted UE; and a sender, configured to send a multiple user equipment cooperative communication authentication response message to the base station, where the multiple user equipment cooperative communication authentication response message carries the supporting UE short-distance identifier list of the benefitted UE.

According to a twentieth aspect, an embodiment of the present invention provides benefitted UE, including: a sender, configured to send a multiple user equipment cooperative communication establishment request message to a base station, where the multiple user equipment cooperative communication establishment request message carries a short-distance identifier of the benefitted UE; and a receiver, configured to receive a multiple user equipment cooperative communication establishment response message sent by the base station.

According to a twenty-first aspect, an embodiment of the present invention provides supporting UE, including: a receiver, configured to receive a pairing request message of a base station, where the pairing request message carries a short-distance identifier of benefitted UE; a processor, configured to perform pairing processing with the benefitted UE according to the received pairing request message; and a sender, configured to send a pairing response message to the base station, where the pairing response message carries a short-distance identifier of the supporting UE.

According to a twenty-second aspect, an embodiment of the present invention provides a system for establishing cooperative communication, including: supporting UE, benefitted UE, and an apparatus for establishing cooperative communication, where the supporting UE is the supporting UE according to the foregoing embodiments, the benefitted UE is the benefitted UE according to the foregoing embodiments, and the apparatus for establishing cooperative communication is the apparatus for establishing cooperative communication according to the foregoing embodiments.

According to a twenty-third aspect, an embodiment of the present invention provides a system for establishing cooperative communication, includes: supporting UE, benefitted UE, a base station, and a first server; where the supporting UE is the supporting UE according to the foregoing embodiments, the benefitted UE is the benefitted UE according to the foregoing embodiments, the base station is the base station according to the foregoing embodiments, and the first server is the first server according to the foregoing embodiments.

For the method for establishing cooperative communication provided in the embodiments of the present invention, after supporting UE receives a pairing request message, when self supporting capability information of the supporting UE indicates that the supporting UE supports only friend UE, the supporting UE acquires a friend UE short-distance identifier list, performs identity authentication on the benefited UE according to a short-distance identifier of benefitted UE carried in the pairing request message and the friend UE short-distance identifier list, and in a case in which the benefited UE has been authenticated, sends a pairing establishment response message to a network side, so as to establish a communication link between the supporting UE and the benefitted UE. In this way, in a process of establishing cooperative communication, when the self supporting capability information of the supporting UE indicates that the supporting UE supports only friend UE, the supporting UE may perform identity authentication on the benefitted UE requesting to establish a communication link, and a communication link can be established between the supporting UE and only the benefited UE that has been authenticated. Because the supporting UE performs identity authentication on the benefitted UE, a communication link can be established between the supporting UE and only the benefitted UE related to the supporting UE, so that transmission of data between the supporting UE and the benefitted UE is implemented, thereby improving security of data transmission of UE and improving user experience of the UE.

BRIEF DESCRIPTION OF THE DRAWINGS

To describe the technical solutions in the embodiments of the present invention or in the more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
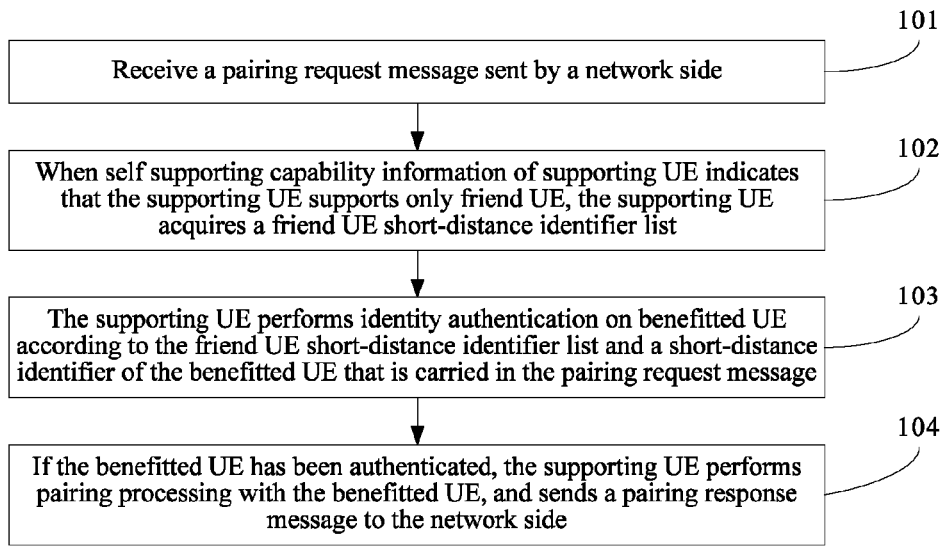
FIG. 1 is a schematic diagram of a method for establishing cooperative communication according to an embodiment of the present invention.

An embodiment of the present invention provides a method for establishing cooperative communication. As shown in FIG. 1, the method includes the following.

101: Supporting user equipment UE receives a pairing request message sent by a network side.

The pairing request message carries a short-distance identifier of benefited user equipment UE. The short-distance identifier of the benefitted UE may uniquely identify the benefitted UE.

In a process of establishing cooperative communication, on the network side, the supporting UE needs to perform pairing processing on the benefitted UE and this supporting UE. In this case, the network side needs to send the pairing request message carrying the short-distance identifier of the benefited UE to the supporting UE, so that the supporting UE performs corresponding pairing processing according to the short-distance identifier of the benefitted UE.

102: When self supporting capability information of the supporting UE indicates that the supporting UE supports only friend UE, the supporting UE acquires a friend UE short-distance identifier list.

The friend UE short-distance identifier list is used to record short-distance identifier information of UE that is served by the supporting UE and that is related to the supporting UE. The self supporting capability information of the supporting UE is used to indicate whether the supporting UE supports only friend UE. The friend UE of the supporting UE refers to UE related to the supporting UE.

It should be noted that, after receiving the pairing request message sent by the network side, the supporting UE needs to determine, according to the self supporting capability information of the supporting UE, steps that need to be performed subsequently. When the self supporting capability information of the supporting UE indicates that the supporting UE supports only friend UE, it indicates that the supporting UE can only provide support to friend UE of the supporting UE, and does not provide a supporting service to another UE. When the self supporting capability information of the supporting UE indicates that the supporting UE supports all UEs, it indicates that the supporting UE may provide support to any UE.

When the self supporting capability information of the supporting UE indicates that the supporting UE supports only friend UE, it indicates that the supporting UE can only provide support to friend UE of the supporting UE, and after receiving the pairing request message sent by the network side, the supporting UE needs to perform identity authentication on the benefitted UE on which pairing needs to be performed, so as to determine whether this benefitted UE is friend UE of the supporting UE. The supporting UE may acquire the friend UE short-distance identifier list of the supporting UE from an MUCC MBB Control Server (multiple user equipment cooperative communication mobile broadband control server).

Furthermore, the supporting UE may send a friend UE short-distance identifier list request message to the MUCC MBB Control Server. The friend UE short-distance identifier list request message carries a short-distance identifier of the supporting UE. The supporting UE receives a friend UE short-distance identifier list response message sent by the MUCC MBB Control Server. The friend UE short-distance identifier list response message carries the friend UE short-distance identifier list.

The supporting UE sends the friend UE short-distance identifier list request message carrying the short-distance identifier of the supporting UE to the MUCC MBB Control Server, so that after receiving the friend UE short-distance identifier list request message, the MUCC MBB Control Server searches all stored friend UE short-distance identifier lists according to the short-distance identifier of the supporting UE, finds a friend UE short-distance identifier list corresponding to the short-distance identifier of the supporting UE, adds the found the friend UE short-distance identifier list corresponding to the short-distance identifier of the supporting UE to the friend UE short-distance identifier list response message, and sends the friend UE short-distance identifier list response message to the supporting UE.

It should be noted that, in all the embodiments of the present invention, in the MUCC MBB Control Server, a short-distance identifier of UE and a friend UE short-distance identifier list corresponding to the UE are prestored. That is, in the MUCC MBB Control Server, a mapping relationship between the short-distance identifier of the UE and a friend UE short-distance identifier list is stored. That is, in the MUCC MBB Control Server, information, of friend UE of the UE, in each application is acquired, and according to the acquired information, of the friend UE of the UE, in each application, a correspondence between the short-distance identifier of the UE and a short-distance identifier, of friend UE of the UE, in each application is determined.

Exemplarily, in the MUCC MBB Control Server, information, of UE of friend UE, in a QQ application is acquired, and according to the information, of the friend UE of the UE, in the QQ application, a correspondence between a short-distance identifier of this UE and a short-distance identifier, of the friend UE of the UE, in the QQ application is determined.

Furthermore, the MUCC MBB Control Server may be deployed in a short-distance server, or may be deployed in an application server, or may be deployed in another device, which is not limited in the present invention.

103: The supporting UE performs identity authentication on the benefitted UE according to the friend UE short-distance identifier list and a short-distance identifier of the benefitted UE that is carried in the pairing request message.

After acquiring the friend UE short-distance identifier list of the supporting UE, the supporting UE searches the friend UE short-distance identifier list of the supporting UE according to the short-distance identifier of the benefitted UE that is carried in the pairing request message, so as to perform identity authentication on the benefitted UE.

Furthermore, if a friend UE short-distance identifier list corresponding to the short-distance identifier of the benefited UE is not found in the friend UE short-distance identifier lists of the supporting UE, it indicates that the benefited UE and the supporting UE are not related, that is, the benefitted UE is not friend UE of the supporting UE, that is, the benefitted UE has not been authenticated, and the supporting UE cannot provide support to this benefitted UE.

104: If the benefitted UE has been authenticated, the supporting UE performs pairing processing with the benefitted UE, and sends a pairing response message to the network side.

The pairing response message includes: a pairing establishment response message or a pairing failure response message.

Specifically, if a friend UE short-distance identifier list corresponding to the short-distance identifier of the benefited UE is found in the friend UE short-distance identifier lists of the supporting UE, it indicates that the benefitted UE is related to the supporting UE, that is, the benefitted UE is friend UE of the supporting UE, that is, the benefitted UE has been authenticated, and the supporting UE may provide support to this benefited UE. Pairing is performed on the supporting UE and this benefitted UE, and when pairing succeeds, the pairing establishment response message is sent to the network side, so as to establish a communication link between the benefitted UE and the supporting UE, and further establish multiple user equipment cooperative communication with the benefited UE. When pairing fails, the pairing failure response message is sent to the network side, so that the network side notifies the benefitted UE that this supporting UE cannot establish a communication link to the benefitted UE.

For the method for establishing cooperative communication provided in this embodiment of the present invention, after supporting UE receives a pairing request message, when self supporting capability information of the supporting UE indicates that the supporting UE supports only friend UE, the supporting UE acquires a friend UE short-distance identifier list, performs identity authentication on the benefited UE according to a short-distance identifier of benefitted UE carried in the pairing request message and the friend UE short-distance identifier list, and in a case in which the benefited UE has been authenticated, sends a pairing establishment response message to a network side, so as to establish a communication link between the supporting UE and the benefitted UE. In this way, in a process of establishing cooperative communication, when the self supporting capability information of the supporting UE indicates that the supporting UE supports only friend UE, the supporting UE may perform identity authentication on the benefitted UE requesting to establish a communication link, and a communication link can be established between the supporting UE and only the benefited UE that has been authenticated. Because the supporting UE performs identity authentication on the benefitted UE, a communication link can be established between the supporting UE and only the benefitted UE related to the supporting UE, so that transmission of data between the supporting UE and the benefitted UE is implemented, thereby improving security of data transmission of UE and improving user experience of the UE.

Figure 2:
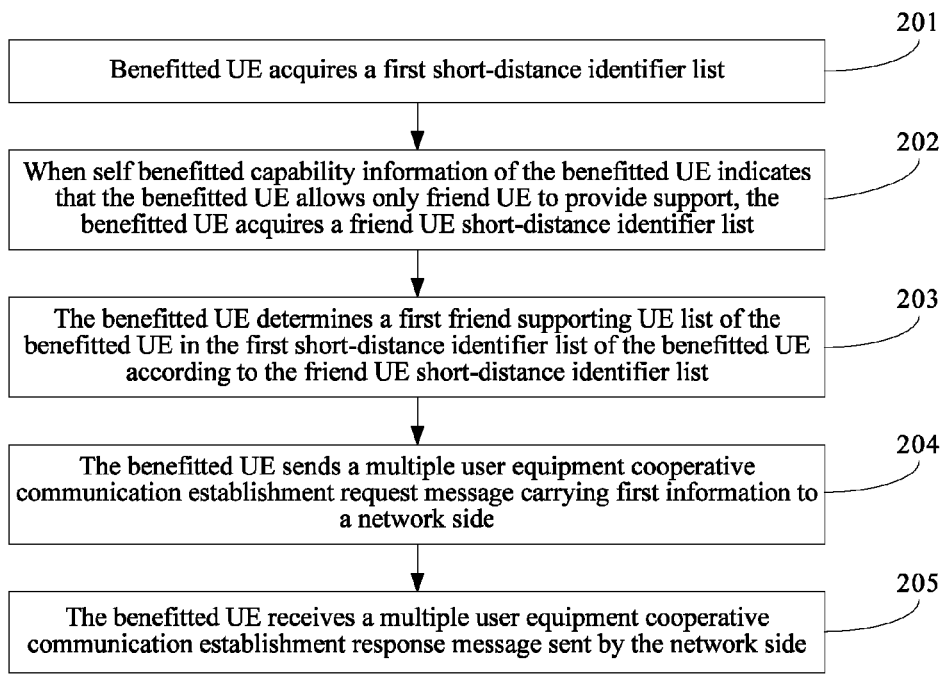
FIG. 2 is a schematic diagram of another method for establishing cooperative communication according to an embodiment of the present invention.

An embodiment of the present invention provides a method for establishing cooperative communication. As shown in FIG. 2, the method includes the following.

201: Benefitted UE acquires a first short-distance identifier list.

The first short-distance identifier list of the benefitted UE is used to record short-distance identifier information of UE that provides a service to the benefitted UE.

The benefitted UE may acquire the first short-distance identifier list from a short-distance server of an MUCC MBB Control Server. A specific process is the same as that in the prior art, and details are described herein.

202: When self benefited capability information of the benefited UE indicates that the benefitted UE allows only friend UE to provide support, the benefited UE acquires a friend UE short-distance identifier list.

The friend UE short-distance identifier list is used to record short-distance identifier information of UE related to the benefited UE. The self benefitted capability information of the benefitted UE is used to indicate whether only friend UE provides support to the benefitted UE. The friend UE of the benefitted UE refers to UE related to the benefitted UE.

It should be noted that, after acquiring the first short-distance identifier list of the benefitted UE, the benefited UE needs to determine, according to the self benefitted capability information of the benefitted UE, steps that need to be performed subsequently. When the self benefitted capability information of the benefitted UE indicates that the benefitted UE allows only friend UE to provide support, it indicates that only friend UE of a specific supporting function of the benefitted UE can provide support to the benefitted UE, and another non-friend UE does not provide support to the benefitted UE. When the self benefitted capability information of the benefitted UE indicates that the benefitted UE allows any UE to provide support, it indicates that any supporting UE may provide support to the benefitted UE.

When the self benefited capability information of the benefitted UE indicates that the benefitted UE allows only friend UE to provide support, it indicates that only friend UE, having a function of providing support, of the benefited UE can provide support to the benefitted UE, and the benefitted UE needs to determine the friend UE of the benefitted UE in the first short-distance identifier list acquired by the benefited UE. The benefitted UE may acquire the friend UE short-distance identifier list of the benefited UE from the MUCC MBB Control Server.

Furthermore, if the benefitted UE acquires the friend UE short-distance identifier list of the benefited UE from the MUCC MBB Control Server, the benefitted UE may send a friend UE short-distance identifier list request message to the MUCC MBB Control Server. The friend UE short-distance identifier list request message carries a short-distance identifier of the benefitted UE. The benefitted UE receives a friend UE short-distance identifier list response message sent by the MUCC MBB Control Server. The friend UE short-distance identifier list response message carries the friend UE short-distance identifier list.

The benefitted UE sends the friend UE short-distance identifier list request message to the MUCC MBB Control Server, where the friend UE short-distance identifier list request message carries the short-distance identifier of the benefitted UE, so that after receiving the friend UE short-distance identifier list request message, the MUCC searches all stored friend UE short-distance identifier lists according to the short-distance identifier of the benefitted UE, finds a friend UE short-distance identifier list corresponding to the short-distance identifier of the benefitted UE, adds the found friend UE short-distance identifier list corresponding to the short-distance identifier of the benefitted UE to the friend UE short-distance identifier list response message, and sends the friend UE short-distance identifier list response message to the benefitted UE.

It should be noted that, in the MUCC MBB Control Server, a short-distance identifier of UE and a friend UE short-distance identifier list corresponding to the UE are prestored. That is, in the MUCC MBB Control Server, a mapping relationship between the short-distance identifier of the UE and the corresponding friend UE short-distance identifier list is stored.

203: The benefitted UE determines a first friend supporting UE list of the benefited UE in the first short-distance identifier list of the benefitted UE according to the friend UE short-distance identifier list.

The first friend supporting UE list of the benefited UE is used to record short-distance identifier information of friend supporting UE of the benefitted UE. The short-distance identifier information of the friend supporting UE is short-distance identifier information that is in the first short-distance identifier list and that is the same as the short-distance identifier information recorded in the friend UE short-distance identifier list.

After acquiring the friend UE short-distance identifier list, the benefitted UE performs identity authentication on each piece of short-distance identifier information recorded in the first short-distance identifier list of the benefited UE according to the friend UE short-distance identifier list of the benefited UE, that is, compares each piece of short-distance identifier information recorded in the first short-distance identifier list of the benefitted UE with the short-distance identifier information recorded in the friend UE short-distance identifier list. Therefore, when short-distance identifier information that is the same as the short-distance identifier information recorded in the friend UE short-distance identifier list is determined in the first short-distance identifier list, the first friend supporting UE list of the benefitted UE is determined.

Exemplarily, it is assumed that the short-distance identifier of the benefited UE is 001, and the short-distance identifier information recorded in the first short-distance identifier list of the benefitted UE includes 002, 003, and 004. If the short-distance identifier information recorded in the friend UE short-distance identifier list corresponding to the benefited UE includes 002, 003, and 005, after acquiring the friend UE short-distance identifier list, the benefitted UE compares each piece of short-distance identifier information recorded in the first short-distance identifier list of the benefited UE with each piece of short-distance identifier information recorded in the friend UE short-distance identifier list, and it is determined in the first short-distance identifier list that short-distance identifier information that is the same as the short-distance identifier information recorded in the friend UE short-distance identifier list is 002 and 003, and therefore the first friend supporting UE list of the benefitted UE may be acquired. The short-distance identifier information recorded in the first friend supporting UE list of the benefitted UE is 002 and 003. It is assumed that UE corresponding to the short-distance identifier information 002 is UE1, and UE corresponding to the short-distance identifier information 003 is UE 2, and in this case, friend supporting UEs of the UE are UE1 and UE 2.

204: The benefitted UE sends a multiple user equipment cooperative communication establishment request message carrying first information to a network side.

The first information includes the first friend supporting UE list of the benefitted UE and a short-distance identifier of the benefitted UE. The short-distance identifier of the benefitted UE may uniquely identify the benefitted UE.

After acquiring the first friend supporting UE list, the benefitted UE adds this first friend supporting UE list and the short-distance identifier of the benefitted UE, as the first information, to a first multiple user equipment cooperative communication establishment request message, so that the network side may establish a communication link between the benefitted UE and friend UE of the benefited UE, and therefore support is provided to the benefitted UE.

205: The benefitted UE receives a multiple user equipment cooperative communication establishment response message sent by the network side.

The multiple user equipment cooperative communication establishment response message includes: an establishment success response message or an establishment failure response message.

When the multiple user equipment cooperative communication establishment response message is the establishment success response message, the multiple user equipment cooperative communication establishment response message carries a short-distance identifier of supporting UE that sends a pairing establishment response message.

For the method for establishing cooperative communication provided in this embodiment of the present invention, after benefitted UE acquires a first short-distance identifier list, when self benefitted capability information of the benefited UE indicates that the benefitted UE allows only friend UE to provide support, the benefitted UE acquires a friend UE short-distance identifier list, determines a first friend supporting UE list of the benefitted UE in the first short-distance identifier list according to the friend UE short-distance identifier list, and sends a first multiple user equipment cooperative communication establishment request message carrying first information to a network side, where the first information includes the first friend supporting UE list of the benefitted UE and a short-distance identifier of the benefitted UE. In this way, in a process of establishing cooperative communication, when the self benefitted capability information of the benefitted UE indicates that the benefitted UE allows only friend UE to provide support, the benefited UE determines, in the first short-distance identifier list, friend UE that can provide support to the benefitted UE, that is, the first friend supporting UE list is acquired, and this list is sent to the network side, so that the network side establishes a communication link between friend supporting UE of the benefitted UE and the benefitted UE, and implements transmission of data between supporting UE and the benefitted UE, thereby improving security of data transmission of UE and improving user experience of the UE.

Figure 3:
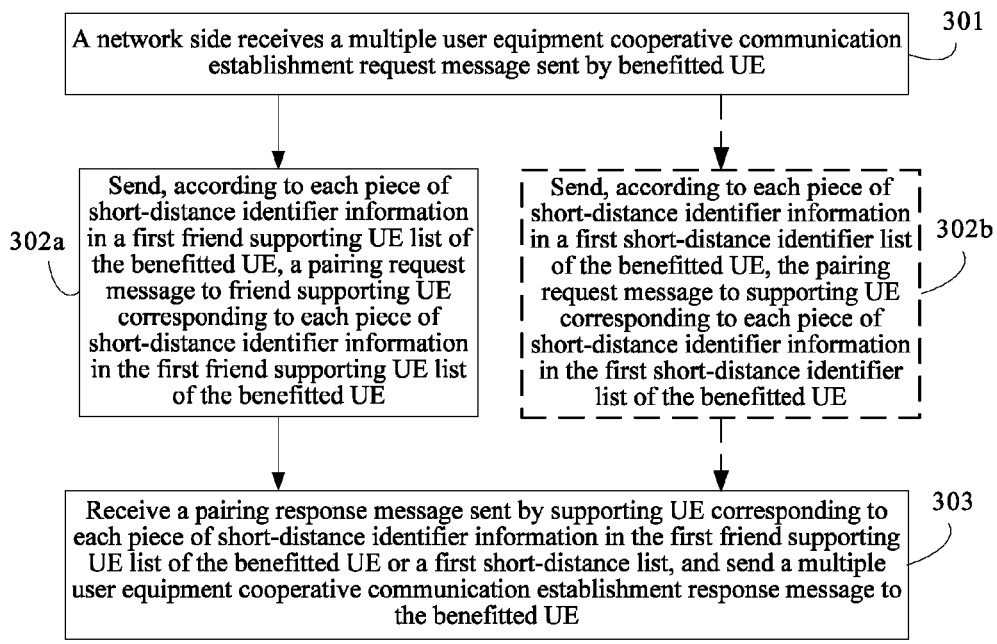
FIG. 3 is a schematic diagram of another method for establishing cooperative communication according to an embodiment of the present invention.

An embodiment of the present invention provides a method for establishing cooperative communication. As shown in FIG. 3, the method includes the following.

301: A network side receives a multiple user equipment cooperative communication establishment request message sent by benefited UE.

The multiple user equipment cooperative communication establishment request message carries first information or second information. The first information includes a first friend supporting UE list of the benefitted UE and a short-distance identifier of the benefitted UE. The second information includes a first short-distance identifier list of the benefitted UE and the short-distance identifier of the benefited UE. The short-distance identifier of the benefitted UE may uniquely identify the benefitted UE.

It should be noted that, after the network side receives the multiple user equipment cooperative communication establishment request message, according to different information carried in the multiple user equipment cooperative communication establishment request message, steps to be performed subsequently are different. When the multiple user equipment cooperative communication establishment request message carries the first information, perform step 302a, and when the multiple user equipment cooperative communication establishment request message carries the second information, perform step 302b.

302a: When the multiple user equipment cooperative communication establishment request message carries first information, the network side sends, according to each piece of short-distance identifier information in a first friend supporting UE list of the benefited UE, a pairing request message to friend supporting UE corresponding to each piece of short-distance identifier information in the first friend supporting UE list of the benefitted UE.

The pairing request message carries a short-distance identifier of the benefited UE.

When receiving the multiple user equipment cooperative communication establishment request message sent by the benefitted UE, the network side may parse out the first information, and therefore acquire the first friend supporting UE list of the benefitted UE and the short-distance identifier of the benefited UE. The network side adds the short-distance identifier of the benefitted UE to the pairing request message, and sends, according to short-distance identifier information recorded in the first friend supporting UE list of the benefitted UE, the pairing request message to supporting UE that may provide support to the benefitted UE and that corresponds to each piece of short-distance identifier information in the first friend supporting UE list.

302b: When the multiple user equipment cooperative communication establishment request message carries second information, the network side sends, according to each piece of short-distance identifier information in a first short-distance identifier list of the benefitted UE, the pairing request message to supporting UE corresponding to each piece of short-distance identifier information in the first short-distance identifier list of the benefitted UE.

The pairing request message carries a short-distance identifier of the benefited UE.

When receiving the multiple user equipment cooperative communication establishment request message sent by the benefitted UE, the network side may parse out the second information, and therefore acquire the first short-distance identifier list of the benefited UE and the short-distance identifier of the benefitted UE. The network side adds the short-distance identifier of the benefited UE to the pairing request message, and sends, according to short-distance identifier information recorded in the first short-distance identifier list of the benefitted UE, the pairing request message to supporting UE that may provide support to the benefitted UE and that corresponds to each piece of short-distance identifier information in the first short-distance identifier list.

303: The network side receives a pairing response message sent by supporting UE corresponding to each piece of short-distance identifier information in the first friend supporting UE list of the benefitted UE or a first short-distance list, and sends a multiple user equipment cooperative communication establishment response message to the benefitted UE.

The pairing response message includes: a pairing establishment response message or a pairing failure response message.

The multiple user equipment cooperative communication establishment response message includes: an establishment success response message or an establishment failure response message.

If it is determined that supporting UE corresponding to each piece of short-distance identifier information in the first friend supporting UE list of the benefitted UE or the first short-distance list may provide support to the benefited UE, this supporting UE sends the pairing establishment response message to the network side. In this case, the pairing response message that is returned by this supporting UE and that is received by the network side is the pairing establishment response message, and the multiple user equipment cooperative communication establishment response message is sent to the benefitted UE; therefore, pairing between the supporting UE and the benefitted UE may be accomplished, and cooperative communication between the benefited UE and the supporting UE is further established. In this case, when the pairing response message is the pairing establishment response message, the multiple user equipment cooperative communication establishment response message is a response message used to indicate to the benefitted UE that multiple user equipments pairing is accomplished. That is, the multiple user equipment cooperative communication establishment response message is the establishment success response message.

The multiple user equipment cooperative communication establishment response message carries a short-distance identifier of the supporting UE that sends the pairing establishment response message.

If it is determined that supporting UE corresponding to each piece of short-distance identifier information in the first friend supporting UE list of the benefitted UE or the first short-distance list cannot provide support to this benefitted UE, this supporting UE sends the pairing failure response message to the network side. In this case, the network side receives the pairing failure response message returned by this supporting UE, and sends the multiple user equipment cooperative communication establishment response message to the benefitted UE. In this case, when the pairing response message is the pairing failure response message, the multiple user equipment cooperative communication establishment response message is a response message used to indicate to the benefitted UE that multiple user equipments pairing fails. That is, the multiple user equipment cooperative communication establishment response message is the establishment failure response message.

Furthermore, the multiple user equipment cooperative communication establishment response message carries the short-distance identifier of the supporting UE that sends the pairing failure response message.

For the method for establishing cooperative communication provided in this embodiment of the present invention, after a network side receives a multiple user equipment cooperative communication establishment request message sent by benefitted UE, when the multiple user equipment cooperative communication establishment request message carries first information, according to each piece of short-distance identifier information in a first friend supporting UE list of the benefitted UE, a pairing request message is sent to friend supporting UE corresponding to each piece of short-distance identifier information in the first friend supporting UE list, so that corresponding UE in the first friend supporting UE list determines whether to provide support to this benefitted UE. When the multiple user equipment cooperative communication establishment request message carries second information, according to each piece of short-distance identifier information in a first short-distance identifier list of the benefited UE, the pairing request message is sent to supporting UE corresponding to each piece of short-distance identifier information in the first short-distance identifier list, so that supporting UE corresponding to each piece of short-distance identifier information in the first short-distance identifier list determines whether to provide support to this benefitted UE. The network side receives a pairing response message sent by the first friend supporting UE list of the benefitted UE or the supporting UE corresponding to each piece of short-distance identifier information in the first short-distance identifier list, and sends a multiple user equipment cooperative communication establishment response message to the benefitted UE. In this way, in a process of establishing cooperative communication, the benefitted UE may implement that only friend UE of the benefitted UE provides support to the benefitted UE. Therefore a communication link is established between the friend UE of the benefitted UE and the benefitted UE, and/or supporting UE may implement that only the supporting UE provides support to friend UE of the supporting UE, and therefore a communication link is established between the friend UE of the supporting UE and the supporting UE, so that when transmission of data between the supporting UE and the benefitted UE is implemented, security of data transmission of UE is improved and user experience of the UE is improved.

Figure 4:
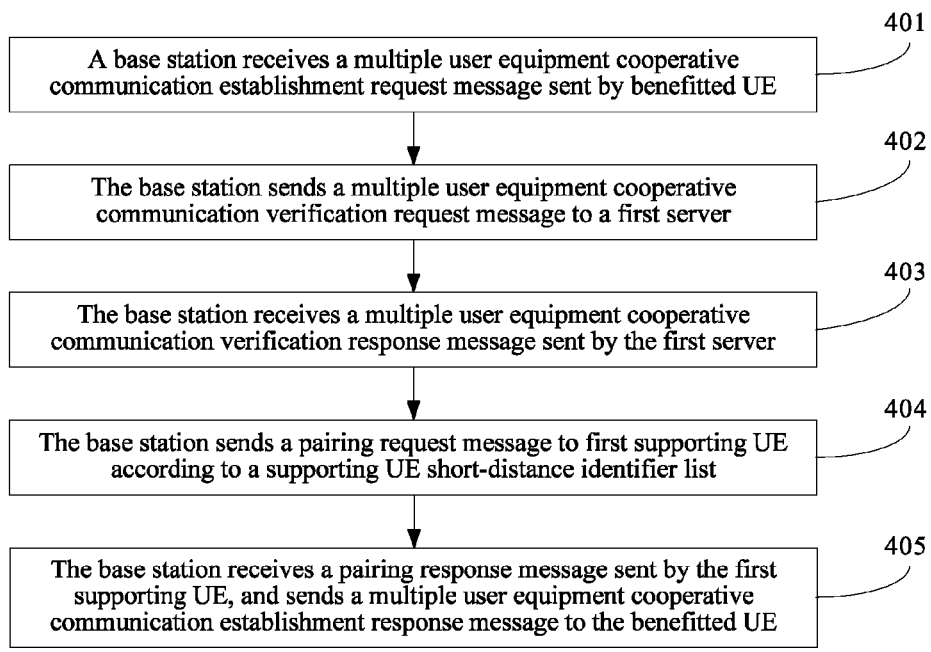
FIG. 4 is a schematic diagram of another method for establishing cooperative communication according to an embodiment of the present invention.

An embodiment of the present invention provides a method for establishing cooperative communication. As shown in FIG. 4, the method includes the following.

401: A base station receives a multiple user equipment cooperative communication establishment request message sent by benefited UE.

The multiple user equipment cooperative communication establishment request message carries a short-distance identifier of the benefitted UE. The short-distance identifier of the benefitted UE may uniquely identify the benefitted UE.

402: The base station sends a multiple user equipment cooperative communication authentication request message to a first server.

The multiple user equipment cooperative communication authentication request message carries a first short-distance identifier list of the benefitted UE, self benefitted capability information of the benefitted UE, and a short-distance identifier of the benefited UE. The first short-distance identifier list of the benefitted UE is used to record short-distance identifier information of UE that provides a service to the benefited UE. The self benefitted capability information of the benefitted UE is information used to indicate whether only friend UE provides support to the benefitted UE.

It should be noted that, the first short-distance identifier list of the benefitted UE and the self benefitted capability information of the benefited UE are acquired by the base station in advance.

The base station may determine the first short-distance identifier list of this benefitted UE and the self benefited capability information of the benefitted UE according to the short-distance identifier of the benefitted UE. The base station adds the first short-distance identifier list of the benefited UE, the self benefitted capability information of the benefitted UE, and the short-distance identifier of the benefitted UE to the multiple user equipment cooperative communication authentication request message, and sends the multiple user equipment cooperative communication authentication request message to the first server, so that the first server acquires a supporting UE short-distance identifier list of the benefitted UE according to the self benefitted capability information of the benefitted UE.

Optionally, the first server may include: an MBB short-distance server. Alternatively, the first server may include: an application server. When the first server includes the application server, that the base station sends a multiple user equipment cooperative communication authentication request message to a first server includes: sending, by the base station, the multiple user equipment cooperative communication authentication request message to the application server by using the short-distance server.

403: The base station receives a multiple user equipment cooperative communication authentication response message sent by the first server.

The multiple user equipment cooperative communication authentication response message carries a supporting UE short-distance identifier list of the benefitted UE. The supporting UE short-distance identifier list is used to record short-distance identifier information of UE that is determined by the first server and that provides a service to the benefitted UE.

Furthermore, the multiple user equipment cooperative communication authentication response message further carries key information of the benefitted UE and key information of supporting UE corresponding to each piece of short-distance identifier information in the supporting UE short-distance identifier list of the benefitted UE.

404: The base station sends a pairing request message to first supporting UE according to a supporting UE short-distance identifier list.

The first supporting UE is UE corresponding to each piece of short-distance identifier information recorded in the supporting UE short-distance identifier list. The pairing request message carries a short-distance identifier of the benefitted UE, so that the first supporting UE determines, according to the short-distance identifier of the benefitted UE, whether the first supporting UE performs pairing with the benefitted UE.

After receiving the multiple user equipment cooperative communication authentication response message sent by the first server, the base station adds the acquired short-distance identifier of the benefitted UE to the pairing request message, and sends, to the first supporting UE, the pairing request message to which the short-distance identifier of the benefitted UE is added, that is, sends the pairing request message to UE corresponding to each piece of short-distance identifier information recorded in the supporting UE short-distance identifier list of the benefited UE, so that after receiving the pairing request message, the UE corresponding to each piece of short-distance identifier information recorded in the supporting UE short-distance identifier list of the benefitted UE, that is, the first supporting UE determines, according to the short-distance identifier of the benefitted UE, whether to perform pairing with this benefitted UE.

405: The base station receives a pairing response message sent by the first supporting UE, and sends a multiple user equipment cooperative communication establishment response message to the benefited UE.

The pairing response message carries a short-distance identifier of UE that sends the pairing response message to the base station. The multiple user equipment cooperative communication establishment response message carries the short-distance identifier of the UE that sends the pairing response message to the base station.

It should be noted that the short-distance identifier of the UE that sends the pairing response message to the base station is a short-distance identifier of supporting UE that can provide support to the benefitted UE.

Furthermore, the pairing response message includes: a pairing establishment response message or a pairing failure response message. The multiple user equipment cooperative communication establishment response message includes: an establishment success response message or an establishment failure response message.

When the base station sends the pairing request message to the first supporting UE, the first supporting UE determines, according to a short-distance identifier of the benefitted UE, whether to perform pairing with this benefitted UE, and if pairing can be performed on the first supporting UE and the benefitted UE, returns the pairing establishment response message to the base station. In this case, the base station may receive the pairing establishment response message sent by the first supporting UE. After receiving the pairing establishment response message, the base station adds a short-distance identifier of this first supporting UE to the establishment success response message, that is, adds, to the establishment success response message, short-distance identifier information of the supporting UE that sends the pairing establishment response message to the base station, and sends the establishment success response message to the benefited UE, so that the benefitted UE acquires the short-distance identifier of the first supporting UE that provides support to the benefitted UE.

If the first supporting UE cannot perform pairing with the benefitted UE, the first supporting UE returns the pairing failure response message to the base station. In this case, the base station may receive the pairing failure response message sent by this first supporting UE. After receiving the pairing failure response message, the base station adds the short-distance identifier of this first supporting UE to the establishment failure response message, that is, adds, to the establishment failure response message, short-distance identifier information of the supporting UE that sends the pairing failure response message to the base station, and sends the establishment failure response message to the benefitted UE, so that the benefitted UE acquires the short-distance identifier of the first supporting UE that cannot provide support to the benefitted UE.

For the method for establishing cooperative communication provided in this embodiment of the present invention, after receiving a multiple user equipment cooperative communication establishment request message sent by benefitted UE, a base station sends a multiple user equipment cooperative communication authentication request message to a first server, receives a multiple user equipment cooperative communication authentication response message that is sent by the first server and that carries a supporting UE short-distance identifier list of the benefitted UE, and sends a pairing request message to first supporting UE according to the supporting UE short-distance identifier list of the benefitted UE; and if the base station receives a pairing establishment response message sent by the first supporting UE, the base station sends a multiple user equipment cooperative communication establishment response message to the benefitted UE. In this way, in a process of establishing cooperative communication, after receiving the multiple user equipment cooperative communication establishment request message sent by the benefitted UE, the base station may send the multiple user equipment cooperative communication authentication request message to the first server, so that the first server acquires a supporting UE short-distance list of the benefited UE, and therefore sends a pairing request to the first supporting UE, so as to establish a communication link between the first supporting UE and the benefitted UE, that is, the benefitted UE may provide support to friend UE of the benefitted UE, and/or, supporting UE provides support to friend UE of the supporting UE, so that while transmission of data between the supporting UE and the benefitted UE is implemented, security of data transmission of UE can be improved and user experience of the UE can be improved.

Figure 5:
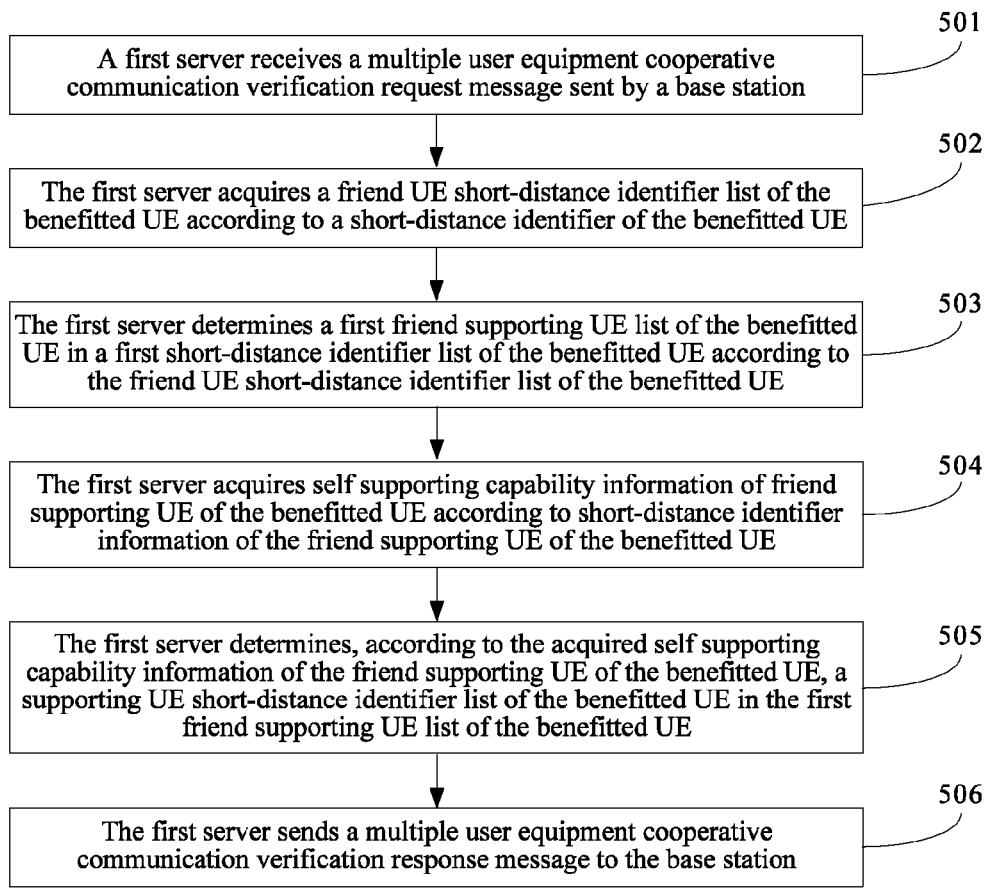
FIG. 5 is a schematic diagram of another method for establishing cooperative communication according to an embodiment of the present invention.

An embodiment of the present invention provides a method for establishing cooperative communication. As shown in FIG. 5, the method includes the following.

501: A first server receives a multiple user equipment cooperative communication authentication request message sent by a base station.

The multiple user equipment cooperative communication authentication request message carries a first short-distance identifier list of the benefitted UE, self benefitted capability information of the benefitted UE, and a short-distance identifier of the benefited UE. The first short-distance identifier list of the benefitted UE is used to record short-distance identifier information of UE that provides support to the benefitted UE. The self benefitted capability information of the benefitted UE is information used to indicate whether only friend UE provides support to the benefitted UE. The short-distance identifier of the benefitted UE may uniquely identify the benefitted UE.

Furthermore, the first server may include: an MBB short-distance server. Alternatively, the first server may include: an application server.

When the first server is the MBB short-distance server, the first server may directly receive the multiple user equipment cooperative communication authentication request message that is sent by the base station and that carries the first short-distance identifier list of the benefitted UE and the short-distance identifier of the benefitted UE, and therefore acquire the first short-distance identifier list of the benefited UE and the short-distance identifier of the benefitted UE. When the first server is the application server, the first server receives the multiple user equipment cooperative communication authentication request message that is sent by the base station by using the short-distance server and that carries the first short-distance identifier list of benefitted UE and the short-distance identifier of the benefitted UE, and therefore the first short-distance identifier list of the benefitted UE and the short-distance identifier of the benefitted UE are acquired.

It should be noted that, after acquiring the self benefitted capability information of the benefitted UE, the first server may perform different steps according to the self benefitted capability information of the benefitted UE. When the self benefitted capability information of the benefitted UE indicates that the benefitted UE allows only friend UE to provide support, it indicates that only friend UE, having a specific supporting function of the benefitted UE, can provide support to the benefitted UE, and another non-friend UE does not provide support to the benefitted UE. When the self benefitted capability information of benefitted UE indicates that the benefitted UE allows any UE to provide support, it indicates that any supporting UE may provide support to the benefited UE.

502: When self benefitted capability information of a benefitted UE indicates that only friend UE is allowed to provide support, the first server acquires a friend UE short-distance identifier list of the benefited UE according to a short-distance identifier of the benefitted UE.

The friend UE short-distance identifier list is used to record short-distance identifier information of UE related to the benefited UE.

After receiving the multiple user equipment cooperative communication authentication request message, the first server may acquire the self benefited capability information of the benefitted UE from the multiple user equipment cooperative communication authentication request message. When it is parsed out that the self benefitted capability information of the benefitted UE indicates that only friend UE is allowed to provide support, the first server may search, according to the short-distance identifier of the benefitted UE, an MUCC MBB Control Server in which a friend UE short-distance identifier list of each UE is stored, and therefore may acquire the friend UE short-distance identifier list of the benefitted UE.

If the MUCC MBB Control Server is deployed in the first server, the first server may search, according to the short-distance identifier of the benefitted UE, a friend UE short-distance identifier list, of each UE, stored in the first server, and therefore acquire the friend UE short-distance identifier list of the benefited UE.

If the MUCC MBB Control Server is deployed in another server, the first server may send a friend UE short-distance identifier list request message to the other server in which the MUCC MBB Control Server is deployed. where the friend UE short-distance identifier list request message carries the short-distance identifier of the benefited UE. The first server receives a friend UE short-distance identifier list response message sent by the other server in which the MUCC MBB Control Server is deployed. The friend UE short-distance identifier list response message carries the friend UE short-distance identifier list of the benefitted UE.

It should be noted that in the MUCC MBB Control Server, a short-distance identifier of UE and a friend UE short-distance identifier list corresponding to the UE are prestored. That is, in the MUCC MBB Control Server, a mapping relationship between the short-distance identifier of the UE and a friend UE short-distance identifier list is stored. That is, in the MUCC MBB Control Server, information, of friend UE of the UE, in each application is acquired, and according to the acquired information, of the friend UE of the UE, in each application, a correspondence between the short-distance identifier of the UE and a short-distance identifier, of the friend UE of the UE, in each application is determined.

503: The first server determines a first friend supporting UE list of the benefitted UE in a first short-distance identifier list of the benefited UE according to the friend UE short-distance identifier list of the benefited UE.

The first friend supporting UE list of the benefited UE is used to record short-distance identifier information of friend supporting UE of the benefitted UE. The short-distance identifier information of the friend supporting UE of the benefitted UE is short-distance identifier information that is in the first short-distance identifier list of the benefitted UE and that is same as the short-distance identifier information recorded in the friend UE short-distance identifier list of the benefited UE.

After determining the friend UE short-distance identifier list of the benefitted UE according to the short-distance identifier of the benefitted UE, the first server performs identity authentication on each piece of short-distance identifier information recorded in the first short-distance identifier list of the benefited UE according to the friend UE short-distance identifier list of the benefitted UE, that is, compares each piece of short-distance identifier information recorded in the first short-distance identifier list of the benefitted UE with each piece of short-distance identifier information recorded in the friend short UE distance identifier list of the benefitted UE, and therefore, short-distance identifier information that is the same as the short-distance identifier information recorded in the friend UE short-distance identifier list of the benefitted UE is determined in the first short-distance identifier list, and accordingly the first friend supporting UE list of the benefited UE is determined.

504: The first server acquires self supporting capability information of friend supporting UE of the benefitted UE according to short-distance identifier information of the friend supporting UE of the benefitted UE.

The self supporting capability information of the friend supporting UE is used to indicate whether the friend supporting UE supports only friend UE. The friend UE of the UE refers to UE related to the UE. The friend supporting UE of the UE refers to UE, which can provide a supporting service to the UE, among friend UEs of the UE.

After acquiring the first friend supporting UE list of the benefitted UE, the first server may acquire a short-distance identifier of the friend supporting UE, and therefore may search an MUCC MBB Control Server according to the short-distance identifier information of the friend supporting UE, so that the self supporting capability information of each friend supporting UE of the benefitted UE may be acquired.

It should be noted that, in the MUCC MBB Control Server, self capability information of each UE is further prestored. Self capability information of UE includes self supporting capability information of the UE and self benefitted capability information of the UE.

505: The first server determines, according to the acquired self supporting capability information of the friend supporting UE of the benefitted UE, a supporting UE short-distance identifier list of the benefited UE in the first friend supporting UE list of the benefitted UE.

The supporting UE short-distance identifier list of the benefitted UE is used to record short-distance identifier information of UE that is determined by the first server and that provides a supporting service to the benefitted UE.

According to the different acquired self supporting capability information of the friend supporting UE of the benefitted UE, a method by using which the first server determines the supporting UE short-distance identifier list of the benefitted UE in the first friend supporting UE list of the benefitted UE is different, and is as follows.

If the self supporting capability information of the friend supporting UE that is acquired by the first server indicates that the friend supporting UE supports only friend UE, the first server acquires a friend UE short-distance identifier list of the friend supporting UE according to short-distance identifier information of the friend supporting UE.

The first server performs identity authentication on the benefitted UE according to the friend UE short-distance identifier list of the friend supporting UE and the short-distance identifier of the benefitted UE.

If the first server determines that the benefitted UE has been authenticated, the first server records a short-distance identifier of the friend supporting UE to the supporting UE short-distance identifier list of the benefited UE.

That is, when the first server parses out that the acquired self supporting capability information of the friend supporting UE of the benefitted UE indicates that the friend supporting UE supports only friend UE, it indicates that the friend supporting UE only supports friend UE of the friend supporting UE. In this case, the first server may search, according to the short-distance identifier of the friend supporting UE, an MUCC MBB Control Server in which a friend UE short-distance identifier list of each UE is stored, and therefore may acquire the friend UE short-distance identifier list of the friend supporting UE.

After acquiring a friend UE short-distance identifier list of the friend supporting UE, the first server may perform identity authentication on the benefited UE according to each piece of short-distance identifier information recorded in the friend UE short-distance identifier list of the friend supporting UE and the short-distance identifier of the benefited UE, that is, search the friend UE short-distance identifier lists of the friend supporting UE to find whether one friend UE short-distance identifier list matches the short-distance identifier of the benefitted UE.

If the first server finds, among the friend UE short-distance identifier lists of the friend supporting UE, one friend UE short-distance identifier list that matches the short-distance identifier of the benefited UE, it is determined that the benefitted UE is friend UE of the friend supporting UE, the first server may record the short-distance identifier of the friend supporting UE to the supporting UE short-distance identifier list of the benefitted UE, that is, determine this friend supporting UE as UE that can provide support to the benefitted UE, so as to establish cooperative communication between the friend supporting UE and the benefited UE.

If the self supporting capability information, of the friend supporting UE, acquired by the first server indicates that the friend supporting UE supports all UEs, the first server records the short-distance identifier of the friend supporting UE to the supporting UE short-distance identifier list of the benefited UE.

That is, the first server parses out that the acquired self supporting capability information of the friend supporting UE of the benefitted UE indicates that the friend supporting UE supports all UEs, it indicates that the friend supporting UE does not have any limit on UE to which the friend supporting UE needs to provide support. In this case, the first server may determine this friend supporting UE as UE that can provide support to the benefitted UE, and therefore, record the short-distance identifier of the friend supporting UE to the supporting UE short-distance identifier list of the benefitted UE, that is, determines this friend supporting UE as the UE that can provide support to the benefitted UE, so as to establish cooperative communication between the friend supporting UE and the benefited UE.

506: The first server sends a multiple user equipment cooperative communication authentication response message to the base station.

The multiple user equipment cooperative communication authentication response message carries the supporting UE short-distance identifier list of the benefitted UE.

After determining the supporting UE short-distance identifier list of the benefitted UE, that is, determining supporting UE that may provide support to the benefitted UE, the first server may add the supporting UE short-distance identifier list of the benefitted UE to the multiple user equipment cooperative communication authentication response message, so that the base station sends a pairing request message to supporting UE corresponding to each piece of short-distance identifier information recorded in the supporting UE short-distance identifier list of the benefitted UE, so as to establish a communication link between the benefitted UE and the supporting UE.

For the method for establishing cooperative communication provided in this embodiment of the present invention, after a first server receives a multiple user equipment cooperative communication authentication request message sent by a base station, when self benefitted capability information of benefited UE indicates that only friend UE is allowed to provide support, the first server acquires a friend UE short-distance identifier list of the benefitted UE according to a short-distance identifier of the benefitted UE, and determines a first friend supporting UE list of the benefitted UE in a first short-distance identifier list of the benefitted UE according to the friend UE short-distance identifier list of the benefitted UE. The first server acquires self supporting capability information of friend supporting UE of the benefitted UE according to short-distance identifier information of the friend supporting UE of the benefitted UE, determines, according to the acquired self supporting capability information of the friend supporting UE of the benefited UE, a supporting UE short-distance identifier list of the benefited UE in the first friend supporting UE list of the benefited UE, and sends a multiple user equipment cooperative communication authentication response message carrying the supporting UE short-distance identifier list of the benefitted UE to the base station. In this way, when the self benefitted capability information of the benefitted UE indicates that only friend UE is allowed to provide support, a server may determine the first friend supporting UE list that only records short-distance identifier information of friend UE of the benefitted UE, and according to self supporting capability information of the UE corresponding to each piece of short-distance identifier information recorded in the first friend supporting UE list, determines the supporting UE short-distance identifier list of the benefitted UE in the first friend supporting UE list according to self supporting capability information of the supporting UE, and sends the supporting UE short-distance identifier list to the base station, so that the base station sends a pairing request message to supporting UE corresponding to each piece of short-distance identifier information recorded in the supporting UE short-distance identifier list of the benefitted UE, so as to establish a communication link between the benefitted UE and friend supporting UE of the benefitted UE; therefore, while transmission of data between the supporting UE and the benefitted UE is implemented, security of data transmission of UE is improved and user experience of the UE is improved.

Figure 6:
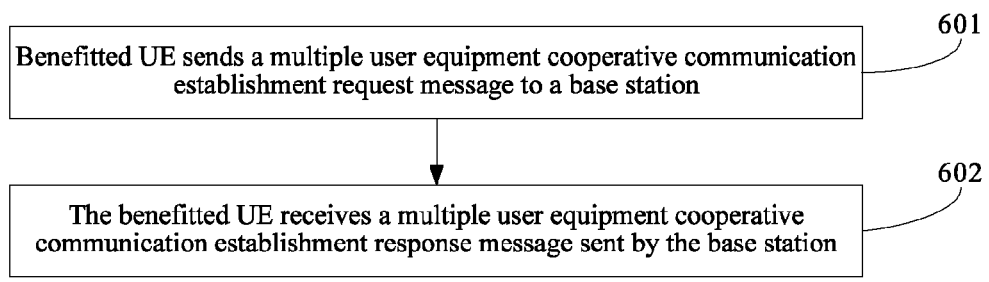
FIG. 6 is a schematic diagram of another method for establishing cooperative communication according to an embodiment of the present invention.

An embodiment of the present invention provides a method for establishing cooperative communication. As shown in FIG. 6, the method includes the following.

601: Benefitted UE sends a multiple user equipment cooperative communication establishment request message to a base station.

The multiple user equipment cooperative communication establishment request message carries a short-distance identifier of the benefitted UE. The short-distance identifier of the benefitted UE may uniquely identify the benefitted UE.

When needing to establish a cooperative communication link to supporting UE, the benefitted UE may send the multiple user equipment cooperative communication establishment request message to the base station, so as to establish a cooperative communication link to the supporting UE by using the base station.

602: The benefitted UE receives a multiple user equipment cooperative communication establishment response message sent by the base station.

The multiple user equipment cooperative communication establishment response message carries a short-distance identifier of UE that sends a pairing response message to the base station. That is, the multiple user equipment cooperative communication establishment response message carries a short-distance identifier of supporting UE.

After sending the multiple user equipment cooperative communication establishment request message to the base station, the benefitted UE may trigger the base station to establish a cooperative communication link between the benefitted UE and the supporting UE. The benefitted UE may receive the multiple user equipment cooperative communication establishment response message used to notify whether a cooperative communication link is successfully established between the benefitted UE and the supporting UE.

The multiple user equipment cooperative communication establishment response message includes: an establishment success response message or an establishment failure response message.

For the method for establishing cooperative communication provided in this embodiment of the present invention, benefited UE sends a multiple user equipment cooperative communication establishment request message to a base station, so that after receiving the multiple user equipment cooperative communication establishment request message sent by the benefitted UE, the base station sends a multiple user equipment cooperative communication authentication request message to a first server, receives a multiple user equipment cooperative communication authentication response message that is sent by the first server and that carries a supporting UE short-distance identifier list of the benefitted UE, and sends a pairing request message to UE corresponding to the supporting UE short-distance identifier list of the benefited UE according to the supporting UE short-distance identifier list of the benefitted UE; and if the base station receives a pairing establishment response message sent by the UE corresponding to the supporting UE short-distance identifier list of the benefitted UE, the base station sends a multiple user equipment cooperative communication establishment response message to the benefitted UE, and the benefitted UE receives the multiple user equipment cooperative communication establishment response message sent by the base station. In this way, in a process of establishing cooperative communication, after receiving the multiple user equipment cooperative communication establishment request message sent by the benefitted UE, the base station may send the multiple user equipment cooperative communication authentication request message to the first server, so that the first server acquires a supporting UE short-distance list of the benefitted UE according to self benefitted capability information of the benefitted UE and self supporting capability information of the supporting UE, and therefore sends a pairing request to UE corresponding to short-distance identifier information recorded in the supporting UE short-distance list of the benefitted UE, so as to establish a communication link to the benefitted UE, that is, friend UE of the benefitted UE may provide support to the benefitted UE, and/or, the supporting UE provides support to friend UE of the supporting UE, so that while transmission of data between the supporting UE and the benefitted UE is implemented, security of data transmission of UE can be improved and user experience of the UE can be improved.

Figure 7:
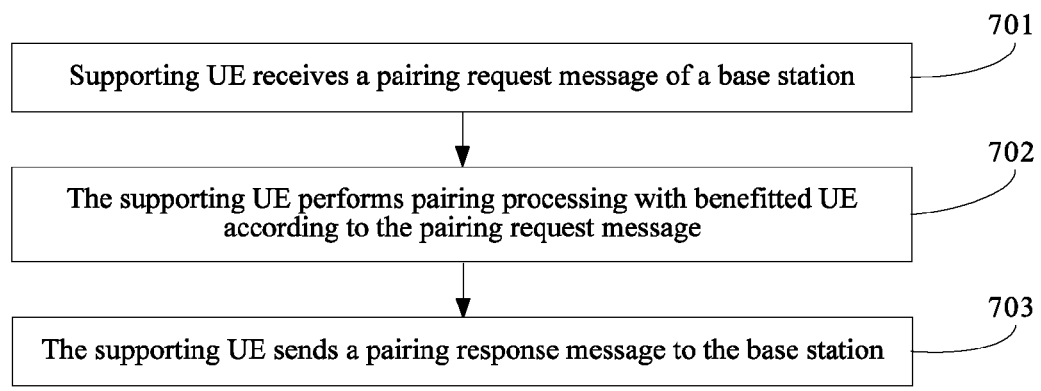
FIG. 7 is a schematic diagram of another method for establishing cooperative communication according to an embodiment of the present invention.

An embodiment of the present invention provides a method for establishing cooperative communication. as shown in FIG. 7, the method includes the following.

701: Supporting UE receives a pairing request message of a base station.

The pairing request message carries a short-distance identifier of a benefitted UE.

Furthermore, the pairing request message further carries key information of the benefitted UE.

702: The supporting UE performs pairing processing with the benefited UE according to the pairing request message.

The supporting UE may perform a process of pairing with the benefitted UE according to the benefitted UE carried in the pairing request message.

Furthermore, in a case in which the pairing request message further carries the key information of the benefitted UE, the supporting UE may perform pairing processing on key information of the supporting UE according to the key information of the benefitted UE, that is, the supporting UE detects whether the key information of the benefitted UE may match the key information of the supporting UE, and if the key information of the benefited UE may match the key information of the supporting UE, pairing between the supporting UE and the benefitted UE succeeds. If the key information of the benefitted UE cannot match the key information of the supporting UE, pairing between the supporting UE and the benefitted UE fails.

703: The supporting UE sends a pairing response message to the base station.

The pairing response message carries a short-distance identifier of the supporting UE. The short-distance identifier of the supporting UE may uniquely identify the supporting UE.

The pairing response message includes: a pairing establishment response message or a pairing failure response message.

After determining that pairing with the benefited UE succeeds, the supporting UE sends the pairing establishment response message to the base station, so as to notify the base station that a communication link may be established between the supporting UE and the benefitted UE. After determining that pairing with the benefitted UE fails, the supporting UE sends the pairing failure response message to the base station, so as to notify the base station that the supporting UE that a communication link cannot be established between the supporting UE and the benefitted UE.

Furthermore, the pairing response message further carries the key information of the supporting UE.

For the method for establishing cooperative communication provided in this embodiment of the present invention, after receiving a pairing request message, supporting UE may perform pairing processing with benefitted UE according to the pairing request message, and send a pairing response message to a base station according to a pairing result. In this way, in a process of establishing cooperative communication, after receiving a multiple user equipment cooperative communication establishment request message sent by the benefited UE, the base station may send a multiple user equipment cooperative communication authentication request message to a first server, so that the first server acquires a supporting UE short-distance list of the benefitted UE according to self benefited capability information of the benefitted UE and self supporting capability information of the supporting UE, and therefore the pairing request message is sent to UE corresponding to short-distance identifier information recorded in the supporting UE short-distance list of the benefitted UE, that is, a pairing request message is sent to the supporting UE, and the supporting UE performs pairing processing according to the pairing request message, so as to establish a communication link to the benefitted UE, that is, friend UE of the benefitted UE may provide support to the benefitted UE, and/or, the supporting UE provides support to friend UE of the supporting UE, so that while transmission of data between the supporting UE and the benefited UE is implemented, security of data transmission of UE can be improved and user experience of the UE can be improved.

Figure 8:
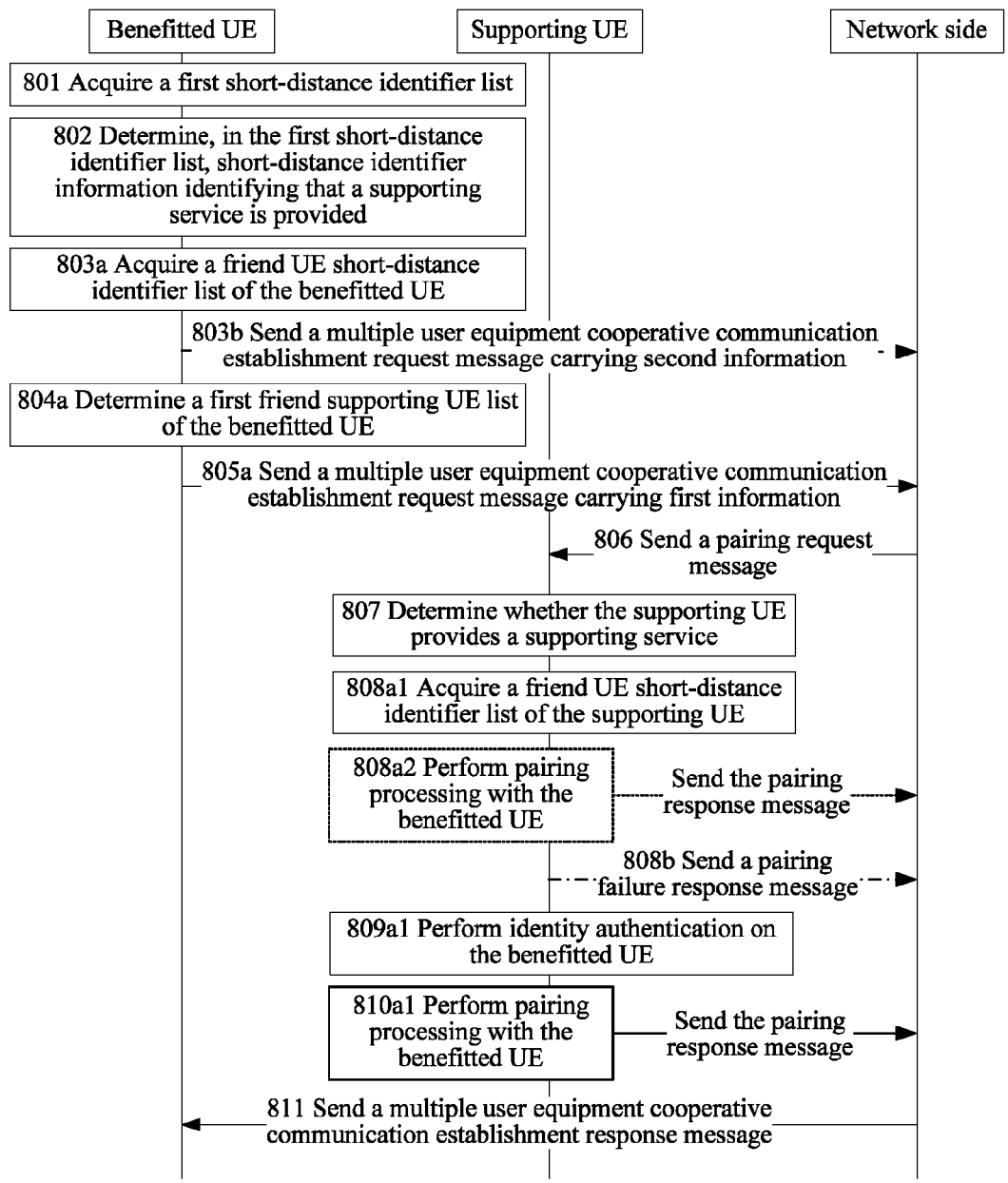
FIG. 8 is a schematic diagram of another method for establishing cooperative communication according to an embodiment of the present invention.

An embodiment of the present invention provides a method for establishing cooperative communication. As shown in FIG. 8, the method includes the following.

801: Benefitted UE acquires a first short-distance identifier list.

Reference may be made to step 201, and details are described herein.

802: The benefitted UE determines, in the first short-distance identifier list according to each piece of short-distance identifier information recorded in the first short-distance identifier list, short-distance identifier information identifying that a supporting service is provided.

The short-distance identifier information of the UE is further used to identify whether the UE provides a supporting service.

After acquiring the first short-distance identifier list, the benefited UE may determine, according to the short-distance identifier information recorded in the first short-distance identifier list, whether UE corresponding to each piece of short-distance identifier information recorded in the first short-distance identifier list provides a supporting service, and therefore may determine, in the first short-distance identifier list, the short-distance identifier information of the UE that can provide a supporting service.

It should be noted that, according to different self benefited capability information of the benefited UE, the benefited UE performs different steps. If self benefited capability information of the benefitted UE indicates that the benefitted UE allows only friend UE to provide support, perform steps 803*a* to 805*a* and 806 to 811. If self benefited capability information of the benefitted UE indicates that the benefitted UE allows any UE to provide support, perform steps 803*b* and 806 to 811.

803*a*: When self benefitted capability information of the benefitted UE indicates that the benefitted UE allows only friend UE to provide support, the benefited UE acquires a friend UE short-distance identifier list.

Reference may be made to step 202, and details are described herein.

803*b*: When self benefitted capability information of the benefited UE indicates that the benefitted UE allows any UE to provide support, the benefited UE sends a multiple user equipment cooperative communication establishment request message carrying second information to a network side. The network side receives the multiple user equipment cooperative communication establishment request message that is sent by the benefitted UE and that carries the second information.

The second information includes the first short-distance identifier list of the benefitted UE and a short-distance identifier of the benefited UE.

If the self benefitted capability information of the benefitted UE indicates that the benefitted UE allows any UE to provide support, it indicates that the benefitted UE does not have any limit on UE that provides support to the benefitted UE, which may be that friend UE of the benefitted UE provides a supporting service, or it may be not that friend UE of the benefitted UE provides a supporting service. In this way, any UE corresponding to short-distance identifier information recorded in the first short-distance identifier list acquired by the benefitted UE may provide support to the benefitted UE. In this case, the benefitted UE may directly send the multiple user equipment cooperative communication establishment request message carrying the second information to the network side, where the second information includes the first short-distance identifier list of the benefited UE and the short-distance identifier of the benefitted UE.

Furthermore, when the short-distance identifier information of the UE is further configured to identify whether the UE provides a supporting service, in step 802, the benefitted UE determines short-distance identifier information that is in the first short-distance identifier list and that identifies that the UE provides a supporting service. In this way, the benefited UE may add the short-distance identifier information that is in the first short-distance identifier list of the benefited UE and that identifies that the UE provides a supporting service and the short-distance identifier of the benefited UE, as the second information, to the multiple user equipment cooperative communication establishment request message, and send the multiple user equipment cooperative communication establishment request message to the network side.

The network side receives the multiple user equipment cooperative communication establishment request message that is sent by the benefitted UE and that carries the second information. Reference may be made to step 301, and details are described herein.

804*a*: The benefitted UE determines a first friend supporting UE list of the benefitted UE in the first short-distance identifier list of the benefitted UE according to the friend UE short-distance identifier list.

Reference may be made to step 203, and details are described herein.

Furthermore, when the short-distance identifier information of the UE is further configured to identify whether the UE provides a supporting service, and in step 802, the benefitted UE determines short-distance identifier information that is in the first short-distance identifier list and that identifies that the UE provides a supporting service. In this way, the benefitted UE may determine the first friend supporting UE list of the benefitted UE according to the friend UE short-distance identifier list from the short-distance identifier information that is in the first short-distance identifier list and that identifies that the UE provides a supporting service.

805*a*: The benefited UE sends a multiple user equipment cooperative communication establishment request message carrying first information to the network side. The network side receives the multiple user equipment cooperative communication establishment request message, carrying the first information, sent by the benefitted UE.

The first information includes the first friend supporting UE list of the benefitted UE and a short-distance identifier of the benefitted UE.

Reference may be made to step 204 and step 301, and details are described herein.

806: The network side sends a pairing request message to supporting UE. The supporting UE receives the pairing request message.

When the multiple user equipment cooperative communication establishment request message carries the first information, the network side sends, according to each piece of short-distance identifier information in the first friend supporting UE list of the benefitted UE, the pairing request message to friend supporting UE corresponding to each piece of short-distance identifier information in the first friend supporting UE list of the benefitted UE. Reference may be made to step 302, and details are described herein.

When the multiple user equipment cooperative communication establishment request message carries the second information, the network side sends, according to each piece of short-distance identifier information in the first short-distance identifier list of the benefited UE, the pairing request message to supporting UE corresponding to each piece of short-distance identifier information in the first short-distance identifier list of the benefitted UE. Reference may be made to step 302, and details are described herein.

The supporting UE receives the pairing request message. Reference may be made to step 101, and details are described herein.

807: The supporting UE determines whether the supporting UE provides a supporting service.

After receiving the pairing request message, the supporting UE may determine, according to whether the supporting UE turns off a function of providing support, whether the supporting UE provides a supporting service. If the supporting UE turns off a function of providing support, the supporting UE cannot provide a supporting service. If the supporting UE turns on a function of providing support, the supporting UE may provide a supporting service.

It should be noted that, according to different determining results of the supporting UE, steps to be performed are also different. If the supporting UE determines that the supporting UE provides a supporting service, perform steps 808*a*1 to 810*a*1 and 811 or 808*a*2 and 811. If the supporting UE determines that the supporting UE does not provide a supporting service, perform steps 808*b* and 811.

It should be noted that, after the supporting UE receives the pairing request message, in a case in which the supporting UE determines that the supporting UE provides a supporting service, according to different self supporting capability information of the supporting UE, the supporting UE subsequently performs different steps. If the self supporting capability information of the supporting UE indicates that the supporting UE supports only friend UE, perform steps 808*a*1 to 810*a*1 and 811. If the self supporting capability information of the supporting UE indicates that the supporting UE supports all UEs, perform steps 808*a*2 and 811.

808*a*1: When the self supporting capability information of the supporting UE indicates that the supporting UE supports only friend UE, the supporting UE acquires a friend UE short-distance identifier list of the supporting UE.

In a case in which the supporting UE determines that the supporting UE provides a supporting service, when the self supporting capability information of the supporting UE indicates that the supporting UE supports only friend UE, the supporting UE acquires the friend UE short-distance identifier list of the supporting UE. Reference may be made to step 102, and details are described herein.

808*a*2: When the self supporting capability information of the supporting UE indicates that the supporting UE supports all UEs, the supporting UE performs pairing processing with the benefitted UE, and sends a pairing response message to the network side. The network side receives the pairing response message.

In a case in which the supporting UE determines that the supporting UE provides a supporting service, when the self supporting capability information of the supporting UE indicates that the supporting UE supports all UEs, it indicates that the supporting UE does not have any limit on UE to which the supporting UE needs to provide support, which may be that friend UE of the supporting UE provides support, or may be that another non-friend UE provides support. In this case, after the supporting UE receives the pairing request message, the supporting UE may perform pairing processing with the benefitted UE according to a short-distance identifier of the benefited UE that is carried in the pairing request message. If pairing between the supporting UE and the benefitted UE succeeds, the supporting UE sends a pairing establishment response message to the network side. If pairing between the supporting UE and the benefitted UE fails, the supporting UE sends a pairing failure response message to the network side. The network side receives the pairing response message. Reference may be made to step 303, and details are described herein.

It should be noted that, that the supporting UE performs pairing processing with the benefitted UE according to the short-distance identifier of the benefited UE that is carried in the pairing request message is the same as that in the prior art, and details are described herein.

808*b*: In a case in which the supporting UE determines that the supporting UE does not provide a supporting service, send a pairing failure response message to the network side. The network side receives the pairing failure response message.

In a case in which the supporting UE determines that the supporting UE does not provide a supporting service, it indicates that the supporting UE cannot provide support to the benefitted UE, and therefore a communication link cannot be established between the supporting UE and the benefitted UE. In this case, the supporting UE sends the pairing failure response message to the network side, so as to notify the benefitted UE by using the network side that this supporting UE cannot provide support to the benefitted UE. The network side receives the pairing failure response message. Reference may be made to step 303, and details are described herein.

809*a*1: The supporting UE performs identity authentication on the benefitted UE according to the friend UE short-distance identifier list and a short-distance identifier of the benefitted UE that is carried in the pairing request message.

Reference may be made to step 103, and details are described herein.

810*a*1: If the benefitted UE has been authenticated, the supporting UE performs pairing processing with the benefitted UE, and sends the pairing response message to the network side. The network side receives the pairing response message.

Reference may be made to step 104 and step 303, and details are described herein.

811: The network side sends a multiple user equipment cooperative communication establishment response message to the benefitted UE. The benefitted UE receives the multiple user equipment cooperative communication establishment response message sent by the network side.

Reference may be made to step 303 and step 205, and details are described herein.

For the method for establishing cooperative communication provided in this embodiment of the present invention, benefited UE acquires a first short-distance identifier list, sends a multiple user equipment cooperative communication establishment request message carrying first information or second information to a network side according to self benefitted capability information of the benefitted UE, and after the network side receives the multiple user equipment cooperative communication establishment request message sent by the benefitted UE, when the multiple user equipment cooperative communication establishment request message carries the first information, sends, according to each piece of short-distance identifier information in a first friend supporting UE list of the benefitted UE, a pairing request message to friend supporting UE corresponding to each piece of short-distance identifier information in the first friend supporting UE list of the benefitted UE, so that corresponding UE in the first friend supporting UE list determines whether to provide support to this the benefitted UE. Alternatively, when the multiple user equipment cooperative communication establishment request message carries the second information, according to each piece of short-distance identifier information in the first short-distance identifier list of the benefitted UE, the pairing request message is sent to supporting UE corresponding to each piece of short-distance identifier information in the first short-distance identifier list of the benefitted UE, so that the UE corresponding to the first short-distance identifier list determines whether to provide support to this benefitted UE. The network side receives a pairing response message sent by the first friend supporting UE list or supporting UE corresponding to each piece of short-distance identifier information in the first short-distance identifier list, and sends a multiple user equipment cooperative communication establishment response message to the benefitted UE. In this way, in a process of establishing cooperative communication, the benefitted UE may implement that only friend UE of the benefitted UE provides support, and therefore a communication link is established between the friend UE of the benefitted UE and the benefitted UE, and/or supporting UE may implement that the supporting UE provides support to only friend UE of the supporting UE; therefore, a communication link is established between the friend UE of the supporting UE and the supporting UE, so that when transmission of data between the supporting UE and the benefitted UE is implemented, security of data transmission of UE is improved and user experience of the UE is improved.

Figure 9:
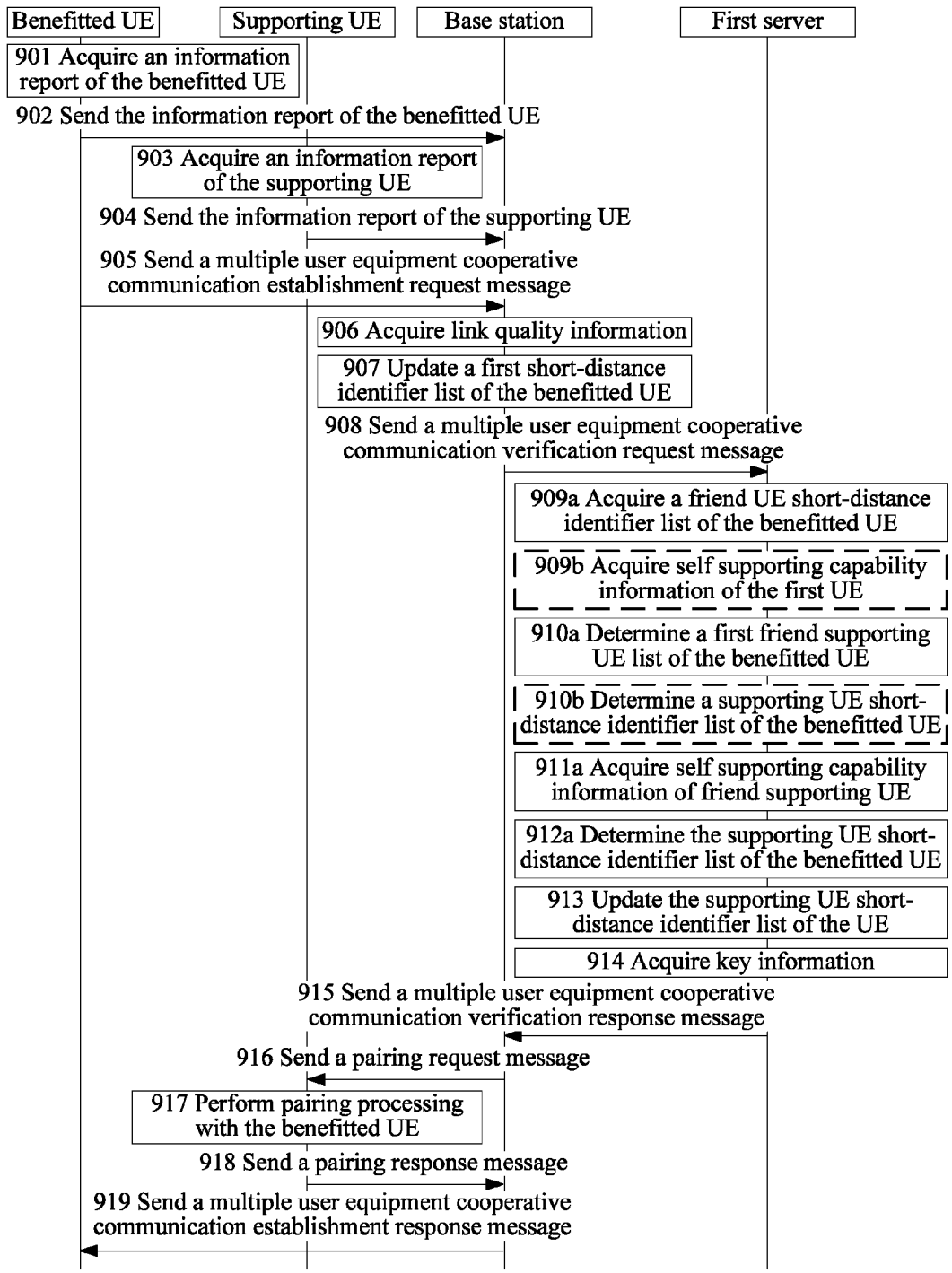
FIG. 9 is a schematic diagram of another method for establishing cooperative communication according to an embodiment of the present invention.

An embodiment of the present invention provides a method for establishing cooperative communication. As shown in FIG. 9, the method includes the following.

901: Benefitted UE acquires an information report of the benefited UE.

The information report of the benefitted UE carries a first short-distance identifier list of the benefitted UE, a short-distance identifier of the benefitted UE, and self capability information of the benefitted UE. The first short-distance identifier list of the benefitted UE is used to record short-distance identifier information of UE that provides a service to the benefitted UE. The self capability information of the benefitted UE includes the self supporting capability information of the benefitted UE and self benefitted capability information of the benefitted UE. The self supporting capability information of the benefitted UE is used to indicate whether the benefitted UE supports only friend UE. The self benefitted capability information of the benefitted UE is used to indicate whether only friend UE provides support to the benefitted UE. The friend UE of the benefitted UE refers to UE related to the benefitted UE.

The benefitted UE may acquire the first short-distance identifier list of the benefitted UE from an MBB short-distance server, and the benefitted UE may know the short-distance identifier of the benefitted UE and self capability information of the benefitted UE.

902: The benefitted UE sends the information report of the benefitted UE to a base station, and the base station receives the information report of the benefitted UE.

903: The supporting UE acquires an information report of the supporting UE.

The information report of the supporting UE carries a first short-distance identifier list of the supporting UE, a short-distance identifier of the supporting UE, and self capability information of the supporting UE. The first short-distance identifier list of the supporting UE is used to record short-distance identifier information of UE that provides a service to the supporting UE. The self capability information of the supporting UE includes self supporting capability information of the supporting UE and self benefitted capability information of the supporting UE. The self supporting capability information of the supporting UE is used to indicate whether the supporting UE supports only friend UE. The self benefited capability information of the supporting UE is used to indicate whether only friend UE provides support to the supporting UE. The friend UE of the supporting UE refers to UE related to the supporting UE.

Reference may be made to a process that the benefitted UE acquires the information report of the benefitted UE, and details are described herein.

904: The supporting UE sends the information report of the supporting UE to the base station. The base station receives the information report of the supporting UE.

It should be noted that in the present invention, a sequence between steps 901 and 902 and steps 903 and 904 is not limited. Steps 901 and 902 may be performed first, and steps 903 and 904 are performed; steps 903 and 904 may be performed first, and steps 901 and 902 are performed; or steps 901 and 902 may be performed at the same time when steps 903 and 904 are performed; only one case is represented in the figure.

905: The benefitted UE sends a multiple user equipment cooperative communication establishment request message to the base station. The base station receives the multiple user equipment cooperative communication establishment request message sent by the benefited UE.

The multiple user equipment cooperative communication establishment request message carries a short-distance identifier of the benefitted UE. The short-distance identifier of the benefitted UE may be used to uniquely identify the benefited UE.

Reference may be made to step 401 and step 601, and details are described herein.

906: The base station acquires link quality information between UE served by the base station and the base station.

The base station may determine, according to a received signal sent by UE served by the base station, the link quality information between the UE served by the base station and the base station.

907: The base station updates a first short-distance identifier list of the benefitted UE according to the acquired link quality information.

The base station determines, according to the acquired link quality information in UEs served by the base station, UE whose link with the base station has quality that is less than a first threshold value, deletes, from the first short-distance identifier list of the benefited UE, short-distance identifier information of the determined UE whose link with the base station has the quality that is less than the first threshold value, and updates the first short-distance identifier list of the benefited UE.

It should be noted that the first threshold value is preset.

That is, after acquiring the link quality information between the UE served by the base station and the base station, the base station determines, in UEs served by the base station, the UE whose link with the base station has the quality that is less than the first threshold value, and deletes, from the first short-distance identifier list, the short-distance information of the UE whose link with the base station has the quality that is less than the first threshold value, so as to update the first short-distance identifier list. Therefore, the quality of the link between UE corresponding to each piece of short-distance identifier information recorded in the updated first short-distance identifier list and the base station is greater than the first threshold value.

908: The base station sends a multiple user equipment cooperative communication authentication request message to a first server. The first server receives the multiple user equipment cooperative communication authentication request message sent by the base station.

The multiple user equipment cooperative communication authentication request message carries the first short-distance identifier list of the benefitted UE, self benefited capability information of the benefitted UE, and a short-distance identifier of the benefited UE. The first short-distance identifier list of the benefitted UE is used to record short-distance identifier information of UE that provides a service to the benefited UE. The self benefitted capability information of the benefitted UE is used to indicate whether only friend UE provides support to the benefitted UE.

Reference may be made to step 402 and step 501, and details are described herein.

Furthermore, if the base station updates first short-distance identifier list of the benefitted UE, the base station adds the updated first short-distance identifier list of the benefitted UE, the short-distance identifier of the benefitted UE, and the self benefitted capability information of the benefitted UE to the multiple user equipment cooperative communication authentication request message, and sends this multiple user equipment cooperative communication authentication request message to the first server. In this case, the first server receives the multiple user equipment cooperative communication authentication request message sent by the base station. The multiple user equipment cooperative communication authentication request message carries the first short-distance identifier list, of the benefitted UE, updated by the base station, the short-distance identifier of the benefited UE, and the self benefitted capability information of the benefitted UE.

That is, the quality of a link between UE corresponding to each piece of short-distance identifier information recorded in the first short-distance identifier list, of the benefitted UE, acquired by the first server and the base station is greater than a first threshold value.

It should be noted that, according to different self benefited capability information of the benefited UE, the first server performs different steps subsequently. If the self benefitted capability information of the benefitted UE indicates that the benefitted UE allows only friend UE to provide support, perform steps 909a to 912a and steps 913 to 919. If the self benefitted capability information of the benefitted UE indicates that the benefitted UE allows any UE to provide support, perform steps 909b and 910b and steps 913 to 919.

909a: When self benefitted capability information of the benefitted UE indicates that only friend UE is allowed to provide support, the first server acquires a friend UE short-distance identifier list of the benefited UE according to a short-distance identifier of the benefitted UE.

The friend UE short-distance identifier list is used to record short-distance identifier information of UE related to the benefited UE.

Reference may be made to step 502, and details are described herein.

909b: When self benefitted capability information of the benefitted UE indicates that any UE is allowed to provide support, the first server acquires self supporting capability information of the first UE.

The first UE is UE corresponding to each piece of short-distance identifier information recorded in the first short-distance identifier list of the benefitted UE.

A process that the first server acquires the self supporting capability information of the first UE according to the first short-distance identifier information of UE is the same as a process that the first server acquires self supporting capability information of friend supporting UE of the benefitted UE according to short-distance identifier information of the friend supporting UE of the benefitted UE. Reference may be made to step 911a, and details are described herein.

910a: The first server determines a first friend supporting UE list of the benefited UE in the first short-distance identifier list of the benefitted UE according to the friend UE short-distance identifier list of the benefited UE.

The first friend supporting UE list of the benefited UE is used to record short-distance identifier information of friend supporting UE of the benefitted UE. The short-distance identifier information of the friend supporting UE of the benefitted UE is short-distance identifier information that is in the first short-distance identifier list of the benefitted UE and that is same as the short-distance identifier information recorded in the friend UE short-distance identifier list of the benefited UE.

Reference may be made to step 503, and details are described herein.

910b: The first server determines a supporting UE short-distance identifier list of the benefitted UE in the first short-distance identifier list of the benefitted UE according to the self supporting capability information of the first UE.

The supporting UE short-distance identifier list of the benefitted UE is used to record short-distance identifier information of UE that is determined by the first server and that provides a supporting service to the benefitted UE.

According to different acquired self supporting capability information of the first UE, a method by using which the first server determines the supporting UE short-distance identifier list of the benefitted UE in the first short-distance identifier list of the benefited UE is different, and is as follows:

If the self supporting capability information, acquired by the first server, of the first UE indicates that the first UE supports only friend UE, the first server acquires a friend UE short-distance identifier list of the first UE according to the first short-distance identifier information of the first UE.

The first server performs identity authentication on the benefitted UE according to the friend UE short-distance identifier list of the first UE and the short-distance identifier of the benefitted UE.

If the first server determines that the benefitted UE has been authenticated, the first server records a short-distance identifier of the first UE to the supporting UE short-distance identifier list of the benefited UE.

That is, when the first server parses out that the self supporting capability information of the first UE indicates that the first UE supports only friend UE, the first server may search, according to the short-distance identifier of the first UE, an MUCC MBB Control Server in which a friend UE short-distance identifier list of each UE is stored, and therefore may acquire a friend UE short-distance identifier list of the first UE.

After acquiring the friend UE short-distance identifier list of the first UE, the first server may perform identity authentication on the benefitted UE according to each piece of short-distance identifier information recorded in the friend UE short-distance identifier list of the first UE and the short-distance identifier of the benefitted UE, that is, search the friend UE short-distance identifier lists of the first UE to find whether one friend UE short-distance identifier list matches the short-distance identifier of the benefitted UE.

If the first server finds, among the friend UE short-distance identifier lists of the first UE, one friend UE short-distance identifier list that matches the short-distance identifier of the benefitted UE, it is determined that the benefitted UE is friend UE of the first UE, and the first server may record the short-distance identifier of the first UE to the supporting UE short-distance identifier list of the benefited UE. That is, this first UE is determined as UE that can provide support to the benefitted UE.

If the self supporting capability information of the first UE acquired by the first server indicates that the first UE supports all UEs, the first server records a short-distance identifier of the first UE to the supporting UE short-distance identifier list of the benefitted UE.

That is, when the first server parses out that the acquired self supporting capability information of the first UE indicates that the first UE supports all UEs, it indicates that the first UE does not have any limit on UE to which the first UE needs to provide support. In this case, the first server may determine this first UE as UE that can provide support to the benefitted UE, and therefore, record the short-distance identifier of the first UE to the supporting UE short-distance identifier list of the benefited UE.

911a: The first server acquires self supporting capability information of friend supporting UE of the benefitted UE according to short-distance identifier information of the friend supporting UE of the benefitted UE.

The self supporting capability information of the friend supporting UE is used to indicate whether the friend supporting UE supports only friend UE. The friend UE of the UE refers to UE related to the UE. The friend supporting UE of the UE refers to UE, which can provide a supporting service to the UE, among friend UEs of the UE.

Reference may be made to step 504, and details are described herein.

912a: The first server determines the supporting UE short-distance identifier list of the benefitted UE in the first friend supporting UE list of the benefitted UE according to the acquired self supporting capability information of the friend supporting UE of the benefitted UE.

The supporting UE short-distance identifier list of the benefitted UE is used to record short-distance identifier information of UE that is determined by the first server and that provides a supporting service to the benefitted UE.

Reference may be made to step 505, and details are described herein.

913: The first server determines, in the supporting UE short-distance identifier list of the UE according to each piece of short-distance identifier information recorded in the supporting UE short-distance identifier list of the benefitted UE, short-distance identifier information identifying that a supporting service is provided, and updates the supporting UE short-distance identifier list of the UE.

The short-distance identifier information of the UE is further configured to identify whether the UE provides a supporting service, and the UE includes: the benefitted UE and the supporting UE.

After acquiring the supporting UE short-distance identifier list of the benefitted UE, the first server may determine, according to each piece of short-distance identifier information recorded in the supporting UE short-distance identifier list of the benefitted UE, whether UE corresponding to each piece of short-distance identifier information recorded in the supporting UE short-distance identifier list of the benefitted UE provides a supporting service, and therefore, may determine, in the supporting UE short-distance identifier list of the benefitted UE, short-distance identifier information identifying that a supporting service can be provided, so as to update the supporting UE short-distance identifier list of the UE, so that UE corresponding to each piece of short-distance identifier information recorded in the updated supporting UE short-distance identifier list of the UE provides a supporting service.

914: The first server acquires key information of the benefitted UE, and key information of supporting UE corresponding to each piece of short-distance identifier information recorded in the supporting UE short-distance identifier list of the benefitted UE.

The first server may search an MUCC MBB Control Server, and therefore may acquire the key information of the benefited UE, and the key information of the supporting UE corresponding to each piece of short-distance identifier information recorded in the supporting UE short-distance identifier list of the benefitted UE.

It should be noted that, in the MUCC MBB Control Server, key information of each UE is further prestored.

915: The first server sends a multiple user equipment cooperative communication authentication response message to the base station. The base station receives the multiple user equipment cooperative communication authentication response message sent by the first server.

The multiple user equipment cooperative communication authentication response message carries the supporting UE short-distance identifier list of the benefitted UE.

Reference may be made to steps 506 and 403, and details are described herein.

Furthermore, after the first server updates the supporting UE short-distance identifier list of the UE, the multiple user equipment cooperative communication authentication response message carries the updated supporting UE short-distance identifier list of the benefitted UE, that is, UE corresponding to each piece of short-distance identifier information recorded in the supporting UE short-distance identifier list, of the benefitted UE, acquired by the base station provides a supporting service.

Furthermore, the multiple user equipment cooperative communication authentication response message further carries the key information of the benefitted UE, and the key information of the supporting UE corresponding to each piece of short-distance identifier information recorded in the supporting UE short-distance identifier list of the benefitted UE.

916: The base station sends a pairing request message to first supporting UE according to the supporting UE short-distance identifier list. The first supporting UE receives the pairing request message.

The first supporting UE is UE corresponding to each piece of short-distance identifier information recorded in the supporting UE short-distance identifier list, and the pairing request message carries the short-distance identifier of the benefitted UE, so that the first supporting UE determines, according to the short-distance identifier of the benefitted UE, whether the first supporting UE performs pairing with the benefitted UE.

Reference may be made to step 404 and step 701, and details are described herein.

Furthermore, the pairing request message further carries the key information of the benefitted UE.

917: The first supporting UE performs pairing processing with the benefitted UE according to the pairing request message.

Reference may be made to step 702, and details are described herein.

918: The first supporting UE sends a pairing response message to the base station. The base station receives the pairing response message sent by the first supporting UE.

The pairing response message carries a short-distance identifier of the first supporting UE.

Furthermore, the pairing response message further carries key information of the first supporting UE.

Reference may be made to step 703 and step 405, and details are described herein.

919: The base station sends a multiple user equipment cooperative communication establishment response message to the benefitted UE. The benefitted UE receives the multiple user equipment cooperative communication establishment response message sent by the base station.

Reference may be made to step 405 and step 602, and details are described herein.

For the method for establishing cooperative communication provided in this embodiment of the present invention, benefited UE sends a multiple user equipment cooperative communication establishment request message to a base station, after receiving the multiple user equipment cooperative communication establishment request message sent by the benefitted UE, the base station sends a multiple user equipment cooperative communication authentication request message to a first server, and the first server receives the multiple user equipment cooperative communication authentication request message, determines, according to self benefitted capability information of the benefitted UE, supporting UE that provides support to the benefitted UE, determines a supporting UE short-distance identifier list of the benefitted UE according to self supporting capability information of the supporting UE that provides support to the benefitted UE, and sends the supporting UE short-distance identifier list of the benefited UE to the base station. After receiving the supporting UE short-distance identifier list of the benefited UE, the base station sends a pairing request message to first supporting UE according to the supporting UE short-distance identifier list of the benefitted UE. The first supporting UE performs pairing processing with the benefitted UE according to the pairing request message, and sends a pairing response message to the base station. The base station sends a multiple user equipment cooperative communication establishment response message to the benefitted UE. In this way, in a process of establishing cooperative communication, the benefitted UE may implement that only friend UE of the benefitted UE provides support, and therefore a communication link is established between the friend UE of the benefitted UE and the benefitted UE, and/or the supporting UE may implement that the supporting UE provides support to only friend UE of the supporting UE, and therefore a communication link is established between the friend UE of the supporting UE and the supporting UE, so that when transmission of data between the supporting UE and the benefitted UE is implemented, security of data transmission of UE is improved and user experience of the UE is improved.

Figure 10:
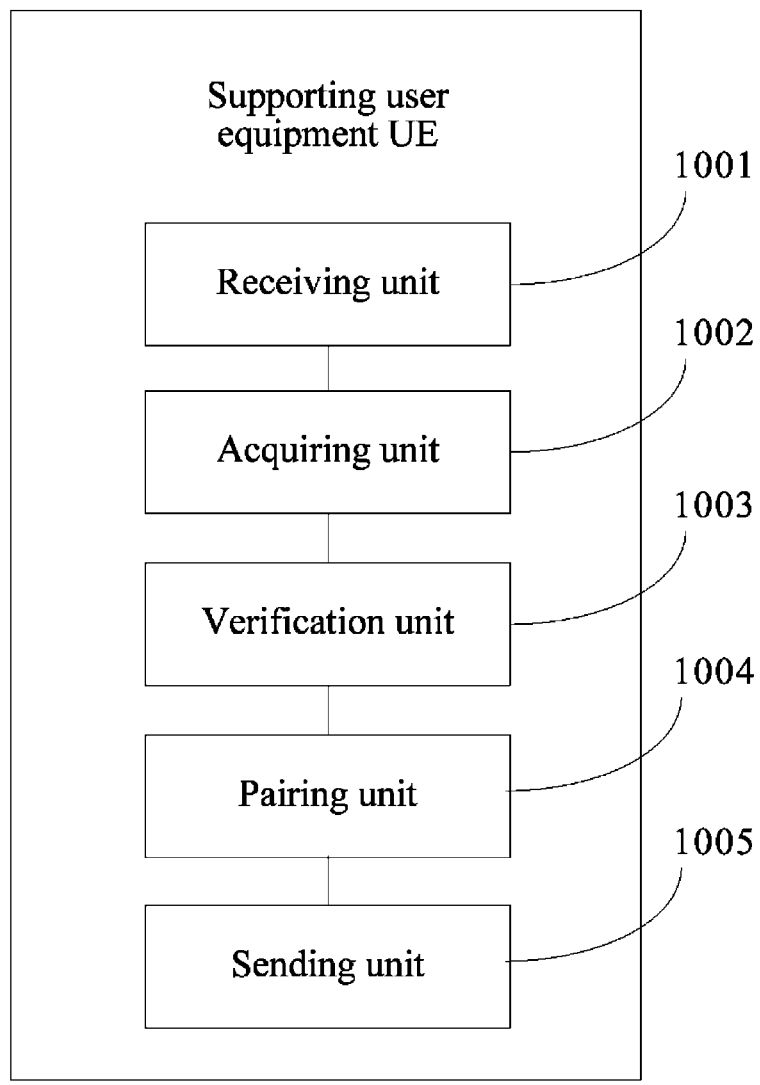
FIG. 10 is a schematic functional diagram of supporting UE according to an embodiment of the present invention.

An embodiment of the present invention provides supporting user equipment UE. As shown in FIG. 10, the supporting UE includes the following.

A receiving unit 1001 is configured to receive a pairing request message sent by a network side.

The pairing request message carries a short-distance identifier of benefited UE, and the short-distance identifier of the benefitted UE may be used to uniquely identify the benefitted UE.

An acquiring unit 1002 is configured to: when self supporting capability information of the supporting UE indicates that the supporting UE supports only friend UE, acquire a friend UE short-distance identifier list.

The friend UE short-distance identifier list is used to record short-distance identifier information of UE that is served by the supporting UE and that is related to the supporting UE. The self supporting capability information of the supporting UE is information used to indicate whether the supporting UE supports only friend UE. The friend UE of the supporting UE refers to UE related to the supporting UE.

The acquiring unit 1002, configured to send a friend UE short-distance identifier list request message to a multiple user equipment cooperative communication mobile broadband control server MUCC MBB Control Server, and receive a friend UE short-distance identifier list response message sent by the MUCC MBB Control Server. The friend UE short-distance identifier list response message carries the friend UE short-distance identifier list.

The friend UE short-distance identifier list request message carries a short-distance identifier of the supporting UE.

A authentication unit 1003 is configured to perform identity authentication on the benefitted UE according to the friend UE short-distance identifier list acquired by the acquiring unit 1002 and the short-distance identifier, carried in the pairing request message received by the receiving unit 1001, of the benefitted UE.

A pairing unit 1004 is configured to: when the benefited UE has been authenticated by the authentication unit 1003, perform pairing processing with the benefitted UE.

A sending unit 1005 is configured to send a pairing response message to the network side.

The pairing response message includes: a pairing establishment response message or a pairing failure response message.

Furthermore, the sending unit 1005 is further configured to: when the benefitted UE has not been authenticated by the authentication unit 1003, send the pairing failure response message to the network side.

Figure 11:
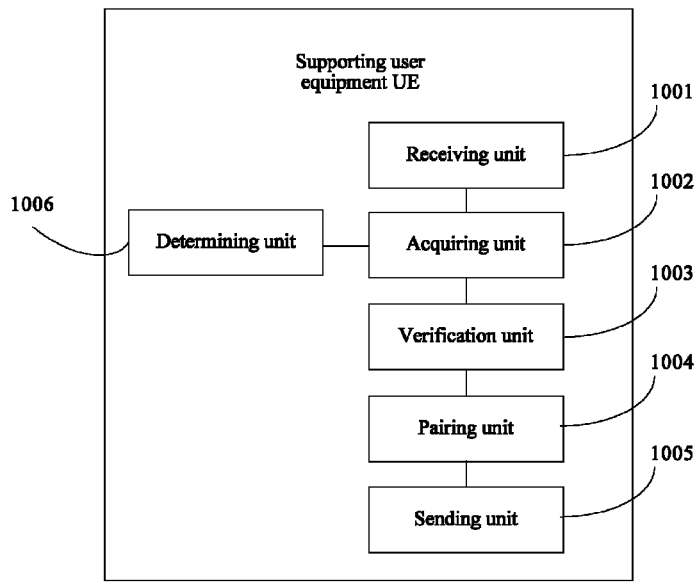
FIG. 11 is a schematic functional diagram of another supporting UE according to an embodiment of the present invention.

Furthermore, as shown in FIG. 11, the supporting UE further includes the following.

A determining unit 1006, configured to determine whether the supporting UE provides a supporting service.

The acquiring unit 1002 is configured to: in a case in which the determining unit 1006 determines that the supporting UE provides a supporting service, when the self supporting capability information of the supporting UE indicates that the supporting UE supports only friend UE, acquire the friend UE short-distance identifier list of the supporting UE.

Furthermore, the sending unit 1005 is further configured to: in a case in which the determining unit 1006 determines that the supporting UE does not provide a supporting service, send the pairing failure response message to the network side.

Furthermore, the pairing unit 1004 is further configured to: when the self supporting capability information of the supporting UE indicates that the supporting UE supports all UEs, perform pairing processing with the benefitted UE.

For the supporting UE provided in this embodiment of the present invention, after the supporting UE receives a pairing request message, when self supporting capability information of the supporting UE indicates that the supporting UE supports only friend UE, the supporting UE acquires a friend UE short-distance identifier list, performs identity authentication on the benefitted UE according to a short-distance identifier of benefitted UE carried in the pairing request message and the friend UE short-distance identifier list, and in a case in which the benefitted UE has been authenticated, send a pairing establishment response message to a network side, so as to establish a communication link between the supporting UE and the benefited UE. In this way, in a process of establishing cooperative communication, when the self supporting capability information of the supporting UE indicates that the supporting UE supports only friend UE, the supporting UE may perform identity authentication on the benefitted UE requesting to establish a communication link, so that a communication link can be established between the supporting UE and only the benefitted UE that has been authenticated. Because the supporting UE performs identity authentication on the benefitted UE, a communication link can be established between the supporting UE and only the benefitted UE related to the supporting UE, so that transmission of data between the supporting UE and the benefitted UE is implemented, thereby improving security of data transmission of UE and improving user experience of the UE.

Figure 12:
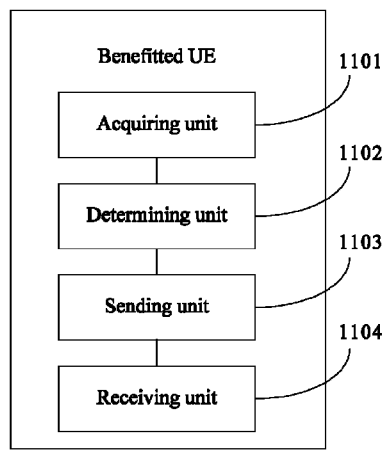
FIG. 12 is a schematic functional diagram of benefited UE according to an embodiment of the present invention.

An embodiment of the present invention provides benefitted UE. As shown in FIG. 12, the benefitted UE includes the following.

An acquiring unit 1101 is configured to acquire a first short-distance identifier list.

The first short-distance identifier list of the benefitted UE is used to record short-distance identifier information of UE that provides a service to the benefitted UE.

The acquiring unit 1101 is further configured to: when self benefited capability information of the benefitted UE indicates that the benefitted UE allows only friend UE to provide support, acquire a friend UE short-distance identifier list.

The friend UE short-distance identifier list is used to record short-distance identifier information of UE related to the benefited UE. The self benefitted capability information of the benefitted UE is used to indicate whether only friend UE provides support to the benefitted UE. The friend UE of the benefitted UE refers to UE related to the benefitted UE.

Furthermore, the acquiring unit 1101 may acquire the friend UE short-distance identifier list of the benefited UE from an MUCC MBB Control Server. In this case, the acquiring unit 1101 is configured to send a friend UE short-distance identifier list request message to the MUCC MBB Control Server, and receive a friend UE short-distance identifier list response message sent by the MUCC MBB Control Server.

The friend UE short-distance identifier list request message carries a short-distance identifier of the benefited UE. The friend UE short-distance identifier list response message carries the friend UE short-distance identifier list.

It should be noted that in the MUCC MBB Control Server, a short-distance identifier of UE and a friend UE short-distance identifier list corresponding to the UE are prestored. That is, in the MUCC MBB Control Server, a mapping relationship between the short-distance identifier of the UE and a friend UE short-distance identifier list of the UE is stored.

A determining unit 1102 is configured to determine a first friend supporting UE list of the benefited UE in the first short-distance identifier list of the benefited UE according to the friend UE short-distance identifier list acquired by the acquiring unit 1101.

The first friend supporting UE list of the benefited UE is used to record short-distance identifier information of friend supporting UE of the benefited UE. The short-distance identifier information of the friend supporting UE is short-distance identifier information that is in the first short-distance identifier list and that is the same as the short-distance identifier information recorded in the friend UE short-distance identifier list.

A sending unit 1103 is configured to send a multiple user equipment cooperative communication establishment request message carrying first information to a network side.

The first information includes the first friend supporting UE list of the benefitted UE and the short-distance identifier of the benefited UE. The short-distance identifier of the benefitted UE may uniquely identify the benefitted UE.

A receiving unit 1104 is configured to receive a multiple user equipment cooperative communication establishment response message sent by the network side.

The multiple user equipment cooperative communication establishment response message includes: an establishment success response message or an establishment failure response message.

When the multiple user equipment cooperative communication establishment response message is the establishment success response message, the multiple user equipment cooperative communication establishment response message carries a short-distance identifier of supporting UE that sends a pairing establishment response message.

Furthermore, the sending unit 1103 is further configured to: when the self benefitted capability information of the benefitted UE indicates that the benefitted UE allows any UE to provide support, send a multiple user equipment cooperative communication establishment request message carrying second information to the network side.

The second information includes the first short-distance identifier list of the benefitted UE and the short-distance identifier of the benefitted UE.

Furthermore, the short-distance identifier information of the UE is further used to identify whether the UE provides a supporting service. In this case:

The determining unit 1102 is further configured to determine, in the first short-distance identifier list according to each piece of short-distance identifier information recorded in the first short-distance identifier list acquired by the acquiring unit 1101, short-distance identifier information identifying that a supporting service is provided.

The determining unit 1102 is configured to determine the first friend supporting UE list of the benefitted UE according to the friend UE short-distance identifier list and the short-distance identifier information, in which a supporting service is provided, in the first short-distance identifier list of the benefited UE.

For the benefitted UE provided in this embodiment of the present invention, after benefitted UE acquires a first short-distance identifier list, when self benefitted capability information of the benefitted UE indicates that the benefitted UE allows only friend UE to provide support, the benefited UE acquires a friend UE short-distance identifier list, determines a first friend supporting UE list of the benefited UE in the first short-distance identifier list according to the friend UE short-distance identifier list, and sends a first multiple user equipment cooperative communication establishment request message carrying first information to a network side, where the first information includes the first friend supporting UE list of the benefitted UE and a short-distance identifier of the benefited UE. In this way, in a process of establishing cooperative communication, when the self benefitted capability information of the benefitted UE indicates that the benefitted UE allows only friend UE to provide support, the benefited UE determines, in the first short-distance identifier list, friend UE that can provide support to the benefitted UE, that is, acquires the first friend supporting UE list, and sends this list to the network side, so that the network side establishes a communication link between friend supporting UE of the benefited UE and the benefitted UE, which implements transmission of data between supporting UE and the benefitted UE, thereby improving security of data transmission of UE and improving user experience of the UE.

Figure 13:
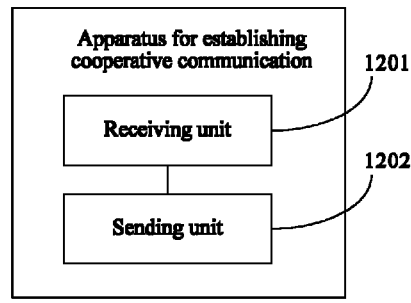
FIG. 13 is a schematic functional diagram of an apparatus for establishing cooperative communication according to an embodiment of the present invention.

An embodiment of the present invention provides an apparatus for establishing cooperative communication. As shown in FIG. 13, the apparatus includes the following.

A receiving unit 1201 is configured to receive a multiple user equipment cooperative communication establishment request message sent by benefitted UE.

The multiple user equipment cooperative communication establishment request message carries first information or second information. The first information includes a first friend supporting UE list of the benefitted UE and a short-distance identifier of the benefitted UE. The second information includes a first short-distance identifier list of the benefitted UE and the short-distance identifier of the benefited UE. The short-distance identifier of the benefitted UE may uniquely identify the benefitted UE.

A sending unit 1202 is configured to: when the multiple user equipment cooperative communication establishment request message carries the first information, send, according to each piece of short-distance identifier information in the first friend supporting UE list of the benefitted UE, a pairing request message to friend supporting UE corresponding to each piece of short-distance identifier information in the first friend supporting UE list of the benefitted UE. When the multiple user equipment cooperative communication establishment request message carries the second information, send, according to each piece of short-distance identifier information in the first short-distance identifier list of the benefitted UE, a pairing request message to supporting UE corresponding to each piece of short-distance identifier information in the first short-distance identifier list of the benefited UE.

The pairing request message carries the short-distance identifier of the benefitted UE.

The receiving unit 1201 is further configured to receive a pairing response message sent by supporting UE corresponding to each piece of short-distance identifier information in the first friend supporting UE list of the benefitted UE or a first short-distance list.

The pairing response message includes: a pairing establishment response message or a pairing failure response message.

The multiple user equipment cooperative communication establishment response message includes: an establishment success response message or an establishment failure response message.

Furthermore, when the multiple user equipment cooperative communication establishment response message is the establishment success response message, the multiple user equipment cooperative communication establishment response message carries a short-distance identifier of supporting UE that sends the pairing establishment response message.

The sending unit 1202 is further configured to send the multiple user equipment cooperative communication establishment response message to the benefitted UE.

For the apparatus for establishing cooperative communication provided in this embodiment of the present invention, after the apparatus for establishing cooperative communication receives a multiple user equipment cooperative communication establishment request message sent by benefited UE, when the multiple user equipment cooperative communication establishment request message carries first information, the apparatus for establishing cooperative communication sends, according to each piece of short-distance identifier information in a first friend supporting UE list of the benefitted UE, a pairing request message to friend supporting UE corresponding to each piece of short-distance identifier information in the first friend supporting UE list, so that corresponding UE in the first friend supporting UE list determines whether to provide support to this benefitted UE. When the multiple user equipment cooperative communication establishment request message carries second information, according to each piece of short-distance identifier information in a first short-distance identifier list of the benefited UE, the pairing request message is sent to supporting UE corresponding to each piece of short-distance identifier information in the first short-distance, so that supporting UE corresponding to each piece of short-distance identifier information in the first short-distance identifier list determines whether to provide support to this benefitted UE. The apparatus for establishing cooperative communication receives a pairing response message sent by the first friend supporting UE list of the benefitted UE or supporting UE corresponding to each piece of short-distance identifier information in the first short-distance identifier list, and sends a multiple user equipment cooperative communication establishment response message to the benefitted UE. In this way, in a process of establishing cooperative communication, the benefitted UE may implement that only friend UE of the benefitted UE provides support, and therefore a communication link is established between the friend UE of the benefitted UE and the benefitted UE, and/or supporting UE may implement that the supporting UE provides support to only friend UE of the supporting UE, and therefore a communication link is established between the friend UE of the supporting UE and the supporting UE, so that when transmission of data between the supporting UE and the benefitted UE is implemented, security of data transmission of UE is improved and user experience of the UE is improved.

Figure 14:
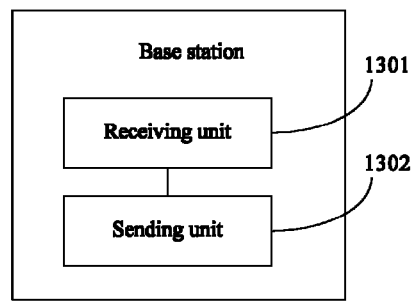
FIG. 14 is a schematic functional diagram of a base station according to an embodiment of the present invention.

An embodiment of the present invention provides a base station. As shown in FIG. 14, the base station includes the following.

A receiving unit 1301, configured to receive a multiple user equipment cooperative communication establishment request message sent by benefitted UE.

The multiple user equipment cooperative communication establishment request message carries a short-distance identifier of the benefitted UE. The short-distance identifier of the benefitted UE may uniquely identify the benefitted UE.

A sending unit 1302 is configured to send a multiple user equipment cooperative communication authentication request message to a first server.

The multiple user equipment cooperative communication authentication request message carries a first short-distance identifier list of the benefitted UE, self benefitted capability information of the benefitted UE, and the short-distance identifier of the benefitted UE. The first short-distance identifier list of the benefitted UE is used to record short-distance identifier information of UE that provides a service to the benefited UE. The self benefitted capability information of the benefitted UE is information used to indicate whether only friend UE provides support to the benefitted UE.

It should be noted that, the first short-distance identifier list of the benefitted UE and the self benefitted capability information of the benefited UE are acquired by the base station in advance.

The receiving unit 1301 is further configured to receive a multiple user equipment cooperative communication authentication response message sent by the first server.

The multiple user equipment cooperative communication authentication response message carries a supporting UE short-distance identifier list of the benefitted UE. The supporting UE short-distance identifier list is used to record short-distance identifier information of UE that is determined by the first server and that provides a service to the benefitted UE.

Furthermore, the multiple user equipment cooperative communication authentication response message further carries key information of supporting UE corresponding to each piece of short-distance identifier information recorded in the supporting UE short-distance identifier list of the benefitted UE, and key information of the benefitted UE.

The sending unit 1302 is further configured to send a pairing request message to first supporting UE according to according to the supporting UE short-distance identifier list.

The first supporting UE is UE corresponding to each piece of short-distance identifier information recorded in the supporting UE short-distance identifier list, and the pairing request message carries the short-distance identifier of the benefitted UE, so that the first supporting UE determines, according to the short-distance identifier of the benefitted UE, whether the first supporting UE performs pairing with the benefitted UE.

Furthermore, the pairing request message further carries the key information of the benefitted UE.

The receiving unit 1301 is further configured to receive a pairing response message sent by the first supporting UE.

The pairing response message carries a short-distance identifier of the first supporting UE, that is, carries a short-distance identifier of UE that sends the pairing response message to the base station.

Furthermore, the pairing response message includes: a pairing establishment response message or a pairing failure response message.

Furthermore, the pairing response message further carries key information of UE that sends the pairing response message to the base station, that is, the first supporting UE.

The sending unit 1302 is further configured to send a multiple user equipment cooperative communication establishment response message to the benefitted UE according to the pairing response message received by the receiving unit 1301.

The multiple user equipment cooperative communication establishment response message carries the short-distance identifier of the first supporting UE, that is, the short-distance identifier of the UE that sends the pairing response message to the base station.

Further, the multiple user equipment cooperative communication establishment response message includes: an establishment success response message or an establishment failure response message.

Figure 15:
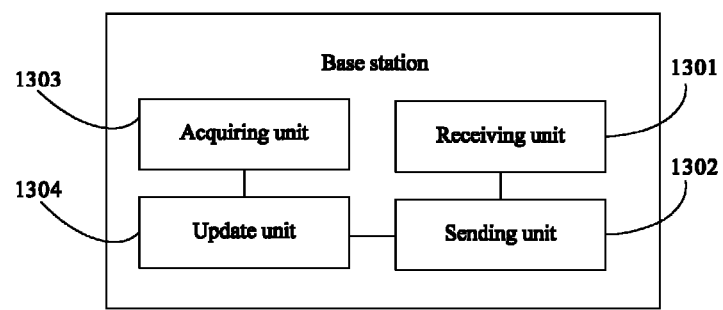
FIG. 15 is a schematic functional diagram of another base station according to an embodiment of the present invention.

Furthermore, as shown in FIG. 15, the base station further includes the following.

An acquiring unit 1303 is configured to acquire an information report of UE.

The information report of the UE carries the first short-distance identifier list of the UE, the short-distance identifier of the UE, and self capability information of UE. The self capability information of the UE includes self supporting capability information of the UE and self benefitted capability information of the UE. The self supporting capability information of the UE is used to indicate whether the UE supports only friend UE. The self benefitted capability information of the UE is used to indicate whether only friend UE provides support to the UE. The UE is UE that performs communication with the base station, and includes: the benefitted UE and the first supporting UE.

Furthermore, referring to FIG. 15, the base station further includes: an update unit 1304.

The acquiring unit 1303 is further configured to acquire link quality information between UE served by the base station and the base station.

The update unit 1304 is configured to update the first short-distance identifier list of the benefitted UE according to the link quality information acquired by the acquiring unit 1303.

The update unit 1304 is configured to determine, in UEs served by the base station according to the acquired link quality information, UE whose link with the base station has quality that is less than a first threshold value, delete, from the first short-distance identifier list of the benefited UE, short-distance identifier information of the determined UE whose link with the base station has the quality that is less than the first threshold value, and update the first short-distance identifier list of the benefitted UE.

It should be noted that, the first threshold value is preset.

The sending unit 1302 is configured to send the multiple user equipment cooperative communication authentication request message to the first server, where the multiple user equipment cooperative communication authentication request message carries the first short-distance identifier list, of the benefitted UE, updated by the update unit 1304, the short-distance identifier of the benefitted UE, and the self benefitted capability information of the benefitted UE.

For the base station provided in this embodiment of the present invention, after receiving a multiple user equipment cooperative communication establishment request message sent by benefited UE, the base station sends a multiple user equipment cooperative communication authentication request message to a first server, receives a multiple user equipment cooperative communication authentication response message that is sent by the first server and that carries a supporting UE short-distance identifier list of the benefited UE, and sends a pairing request message to first supporting UE according to the supporting UE short-distance identifier list of the benefited UE; and if the base station receives a pairing establishment response message sent by the first supporting UE, the base station sends a multiple user equipment cooperative communication establishment response message to the benefitted UE. In this way, in a process of establishing cooperative communication, after receiving the multiple user equipment cooperative communication establishment request message sent by the benefitted UE, the base station may send the multiple user equipment cooperative communication authentication request message to the first server, so that the first server acquires a supporting UE short-distance list of the benefitted UE, and therefore send a pairing request to the first supporting UE, so as to establish a communication link between the first supporting UE and the benefited UE, that is, the benefitted UE may provide support to friend UE of the benefitted UE, and/or, supporting UE provides support to friend UE of the supporting UE, so that while transmission of data between the supporting UE and the benefited UE is implemented, security of data transmission of UE can be improved and user experience of the UE can be improved.

Figure 16:
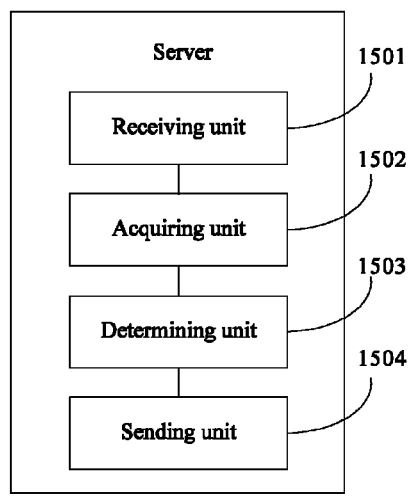
FIG. 16 is a schematic functional diagram of a server according to an embodiment of the present invention.

An embodiment of the present invention provides a server. As shown in FIG. 16, the server includes the following.

A receiving unit 1501 is configured to receive a multiple user equipment cooperative communication authentication request message sent by a base station.

The multiple user equipment cooperative communication authentication request message carries a first short-distance identifier list of a benefitted UE, self benefitted capability information of the benefitted UE, and a short-distance identifier of the benefitted UE. The first short-distance identifier list of the benefited UE is used to record short-distance identifier information of UE that provides support to the benefitted UE. The self benefited capability information of the benefitted UE is used to indicate whether only friend UE provides support to the benefitted UE. The short-distance identifier of the benefitted UE may uniquely identify the benefitted UE.

An acquiring unit 1502 is configured to: when the self benefitted capability information of the benefitted UE indicates that the benefitted UE allows only friend UE to provide support, acquire a friend UE short-distance identifier list of the benefitted UE according to the short-distance identifier of the benefited UE.

The friend UE short-distance identifier list of the benefitted UE is used to record short-distance identifier information of UE related to the benefitted UE.

A determining unit 1503 is configured to determine a first friend supporting UE list of the benefited UE in the first short-distance identifier list of the benefited UE according to the friend UE short-distance identifier list, of the benefitted UE, acquired by the acquiring unit 1502.

The first friend supporting UE list of the benefited UE is used to record short-distance identifier information of friend supporting UE of the benefitted UE. The short-distance identifier information of the friend supporting UE of the benefitted UE is short-distance identifier information that is in the first short-distance identifier list of the benefitted UE and that is the same as the short-distance identifier information recorded in the friend UE short-distance identifier list of the benefited UE.

The acquiring unit 1502 is further configured to acquire self supporting capability information of the friend supporting UE of the benefitted UE according to the short-distance identifier information, of the friend supporting UE of the benefitted UE, determined by the determining unit 1503.

The self supporting capability information of the friend supporting UE is used to indicate whether the friend supporting UE supports only friend UE.

The determining unit 1503 is further configured to determine a supporting UE short-distance identifier list of the benefited UE in the first friend supporting UE list of the benefited UE according to the self supporting capability information, of the friend supporting UE of the benefitted UE, acquired by the acquiring unit 1502.

The supporting UE short-distance identifier list of the benefitted UE is used to record short-distance identifier information of UE that is determined by the first server and that provides a supporting service to the benefitted UE.

According to different acquired self supporting capability information of the friend supporting UE of the benefited UE, a method by using which the determining unit 1503 determines the supporting UE short-distance identifier list of the benefitted UE in the first friend supporting UE list of the benefitted UE is different, and is as follows:

The determining unit 1503 is configured to: when the acquired self supporting capability information of the friend supporting UE indicates that the friend supporting UE supports only friend UE, acquire a friend UE short-distance identifier list of the friend supporting UE according to the short-distance identifier information of the friend supporting UE; perform identity authentication on the benefited UE according to the friend UE short-distance identifier list of the friend supporting UE and the short-distance identifier of the benefitted UE; and when it is determined that the benefitted UE has been authenticated, record a short-distance identifier of the friend supporting UE to the supporting UE short-distance identifier list of the benefited UE.

Alternatively, the determining unit 1503 is configured to: when the acquired self supporting capability information of the friend supporting UE indicates that the friend supporting UE supports all UEs, record a short-distance identifier of the friend supporting UE to the supporting UE short-distance identifier list of the benefitted UE.

A sending unit 1504 is configured to send a multiple user equipment cooperative communication authentication response message to the base station.

The multiple user equipment cooperative communication authentication response message carries the supporting UE short-distance identifier list of the benefitted UE.

Furthermore, the acquiring unit 1502 is further configured to: when the self benefitted capability information of the benefitted UE indicates that the benefitted UE allows any UE to provide support, acquire self supporting capability information of the first UE, where the first UE is UE corresponding to each piece of short-distance identifier information recorded in the first short-distance identifier list of the benefited UE.

In this case, the determining unit 1503 is further configured to determine the supporting UE short-distance identifier list of the benefitted UE in the first short-distance identifier list of the benefited UE according to the self supporting capability information, acquired by the acquiring unit 1502, of the first UE.

According to different acquired self supporting capability information of the UE corresponding to each piece of short-distance identifier information recorded in the first short-distance identifier list of the benefited UE, a method by using which the determining unit 1503 determines the supporting UE short-distance identifier list of the benefitted UE in the first short-distance identifier list of the benefited UE is different, and is as follows:

The determining unit 1503 is configured to: when the self supporting capability information of the first UE acquired by the acquiring unit 1502 indicated that the first UE supports only friend UE, acquire a friend UE short-distance identifier list of the first UE according to the first short-distance identifier information of the first UE; perform identity authentication on the benefitted UE according to the friend UE short-distance identifier list of the first UE and the short-distance identifier of the benefitted UE; and when it is determined that the benefitted UE has been authenticated, record a short-distance identifier of the first UE to the supporting UE short-distance identifier list of the benefitted UE.

Alternatively, the determining unit 1503 is configured to: when the self supporting capability information, acquired by the acquiring unit 1502, of the first UE indicates that the first UE supports all UEs, record the short-distance identifier of the first UE to the supporting UE short-distance identifier list of the benefitted UE.

Figure 17:
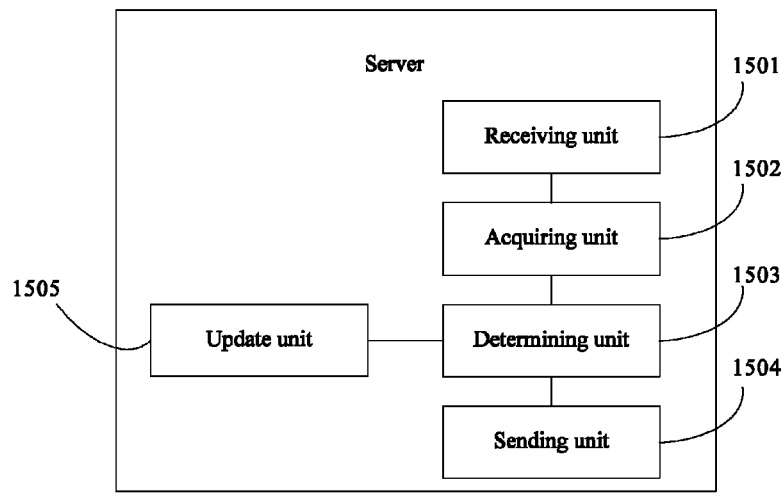
FIG. 17 is a schematic functional diagram of another server according to an embodiment of the present invention.

Furthermore, as shown in FIG. 17, the server further includes: an update unit 1505.

The short-distance identifier information of the UE is further used to identify whether the UE provides a supporting service.

In this case, the determining unit 1503 is further configured to determine, in the supporting UE short-distance identifier list of the UE according to each piece of short-distance identifier information recorded in the supporting UE short-distance identifier list of the benefitted UE, short-distance identifier information identifying that a supporting service is provided.

The update unit 1505 is configured to update the supporting UE short-distance identifier list of the UE according to the short-distance identifier information, identifying that a supporting service is provided, determined by the determining unit 1503.

The sending unit 1504 is configured to send the multiple user equipment cooperative communication authentication response message to the base station. In this case, the multiple user equipment cooperative communication authentication response message carries the supporting UE short-distance identifier list, of the UE, updated by the update unit 1505.

Furthermore, the acquiring unit 1502 is further configured to acquire key information of the benefitted UE, and key information of supporting UE corresponding to each piece of short-distance identifier information recorded in the supporting UE short-distance identifier list of the benefited UE.

The sending unit 1504 is configured to send the multiple user equipment cooperative communication response message to the base station. In this case, the multiple user equipment cooperative communication authentication response message further carries the key information of the benefitted UE, and the key information of the supporting UE corresponding to each piece of short-distance identifier information in the supporting UE short-distance identifier list of the benefited UE.

For the server provided in this embodiment of the present invention, after the server receives a multiple user equipment cooperative communication authentication request message sent by a base station, when self benefitted capability information of a benefitted UE indicates that the only friend UE is allowed to provide support, the server acquires a friend UE short-distance identifier list of the benefited UE according to a short-distance identifier of the benefitted UE, and determines a first friend supporting UE list of the benefitted UE in a first short-distance identifier list of the benefited UE according to the friend UE short-distance identifier list of the benefited UE. The server acquires self supporting capability information of friend supporting UE of the benefitted UE according to short-distance identifier information of the friend supporting UE of the benefitted UE, determines, according to the acquired self supporting capability information of the friend supporting UE of the benefited UE, a supporting UE short-distance identifier list of the benefitted UE in the first friend supporting UE list of the benefitted UE, and sends a multiple user equipment cooperative communication authentication response message carrying the supporting UE short-distance identifier list of the benefitted UE to the base station. In this way, when the self benefited capability information of the benefitted UE indicates that only friend UE is allowed to provide support, the server may determine the first friend supporting UE list that only records short-distance identifier information of friend UE of the benefitted UE, determine, according to self supporting capability information of the UE corresponding to each piece of short-distance identifier information recorded in the first friend supporting UE list, the supporting UE short-distance identifier list of the benefitted UE in the first friend supporting UE list according to self supporting capability information of the supporting UE, and sends the supporting UE short-distance identifier list to the base station, so that the base station sends a pairing request message to supporting UE corresponding to each piece of short-distance identifier information recorded in the supporting UE short-distance identifier list of the benefitted UE, so as to establish a communication link between the benefited UE and friend supporting UE of the benefitted UE; therefore, while transmission of data between the supporting UE and the benefited UE is implemented, security of data transmission of UE is improved and user experience of the UE is improved.

Figure 18:
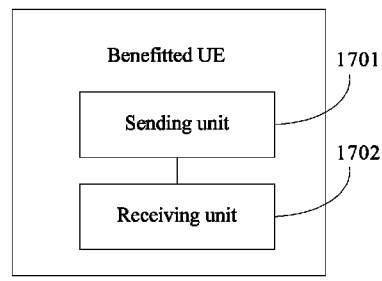
FIG. 18 is a schematic functional diagram of another benefited UE according to an embodiment of the present invention.

An embodiment of the present invention provides benefitted UE. As shown in FIG. 18, the benefited UE includes the following.

A sending unit 1701 is configured to send a multiple user equipment cooperative communication establishment request message to a base station.

The multiple user equipment cooperative communication establishment request message carries a short-distance identifier of the benefitted UE. The short-distance identifier of the benefitted UE may uniquely identify the benefitted UE.

A receiving unit 1702 is configured to receive a multiple user equipment cooperative communication establishment response message sent by the base station.

The multiple user equipment cooperative communication establishment response message carries a short-distance identifier of UE that sends a pairing response message to the base station. That is, the multiple user equipment cooperative communication establishment response message carries a short-distance identifier of supporting UE.

The multiple user equipment cooperative communication establishment response message includes: an establishment success response message or an establishment failure response message.

Figure 19:
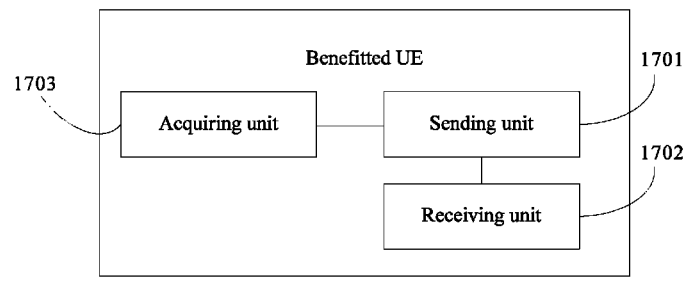
FIG. 19 is a schematic functional diagram of another benefitted UE according to an embodiment of the present invention.

Furthermore, as shown in FIG. 19, the benefitted UE further includes an acquiring unit 1703, configured to acquire an information report of the benefitted UE.

The information report of the benefitted UE carries a first short-distance identifier list of the benefitted UE, the short-distance identifier of the benefited UE, and self capability information of the benefitted UE. The first short-distance identifier list of the benefitted UE is used to record short-distance identifier information of UE that provides a service to the benefitted UE. The self capability information of the benefitted UE includes the self supporting capability information of the benefitted UE and self benefitted capability information of the benefitted UE. The self supporting capability information of the benefitted UE is used to indicate whether the benefitted UE supports only friend UE. The self benefitted capability information of the benefitted UE is used to indicate whether only friend UE provides support to the benefitted UE. The friend UE of the benefitted UE refers to UE related to the benefitted UE.

In this case, the sending unit 1701 is further configured to send the information report of the benefitted UE to the base station.

For the benefitted UE provided in this embodiment of the present invention, the benefitted UE sends a multiple user equipment cooperative communication establishment request message to a base station, so that after receiving the multiple user equipment cooperative communication establishment request message sent by the benefitted UE, the base station sends a multiple user equipment cooperative communication authentication request message to a first server, receives a multiple user equipment cooperative communication authentication response message that is sent by the first server and that carries a supporting UE short-distance identifier list of the benefited UE, and sends a pairing request message to UE corresponding to the supporting UE short-distance identifier list of the benefitted UE according to the supporting UE short-distance identifier list of the benefitted UE; and if the base station receives a pairing establishment response message sent by UE corresponding to the supporting UE short-distance identifier list of the benefitted UE, the base station sends a multiple user equipment cooperative communication establishment response message to the benefitted UE, and the benefited UE receives the multiple user equipment cooperative communication establishment response message sent by the base station. In this way, in a process of establishing cooperative communication, after receiving the multiple user equipment cooperative communication establishment request message sent by the benefitted UE, the base station may send the multiple user equipment cooperative communication authentication request message to the first server, so that the first server acquires a supporting UE short-distance list of the benefitted UE according to self benefitted capability information of the benefitted UE and self supporting capability information of the supporting UE, and therefore sends a pairing request to UE corresponding to short-distance identifier information recorded in the supporting UE short-distance list of the benefited UE, so as to establish a communication link to the benefitted UE, that is, friend UE of the benefitted UE may provide support to the benefitted UE, and/or, the supporting UE provides support to friend UE of the supporting UE, so that while transmission of data between the supporting UE and the benefited UE is implemented, security of data transmission of UE can be improved and user experience of the UE can be improved.

Figure 20:
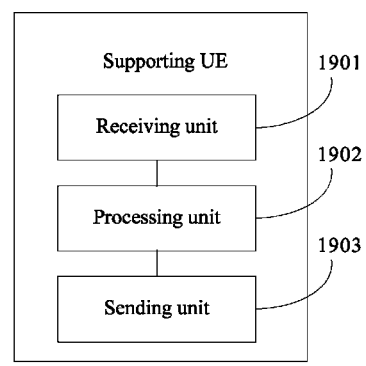
FIG. 20 is a schematic functional diagram of another supporting UE according to an embodiment of the present invention.

An embodiment of the present invention provides supporting UE. As shown in FIG. 20, the supporting UE includes the following.

A receiving unit 1901 is configured to receive a pairing request message of a base station.

The pairing request message carries a short-distance identifier of a benefitted UE.

Furthermore, the pairing request message further carries key information of the benefitted UE.

A processing unit 1902 is configured to perform pairing processing with the benefitted UE according to the pairing request message received by the receiving unit 1901.

When the pairing request message carries the key information of the benefitted UE, the processing unit 1902 is configured to perform pairing processing with the benefitted UE according to the key information of the benefitted UE.

A sending unit 1903 is configured to send a pairing response message to the base station.

The pairing response message carries a short-distance identifier of the supporting UE. The short-distance identifier of the supporting UE may uniquely identify the supporting UE.

The pairing response message includes: a pairing establishment response message or a pairing failure response message.

Furthermore, the pairing response message further carries key information of the supporting UE.

Figure 21:
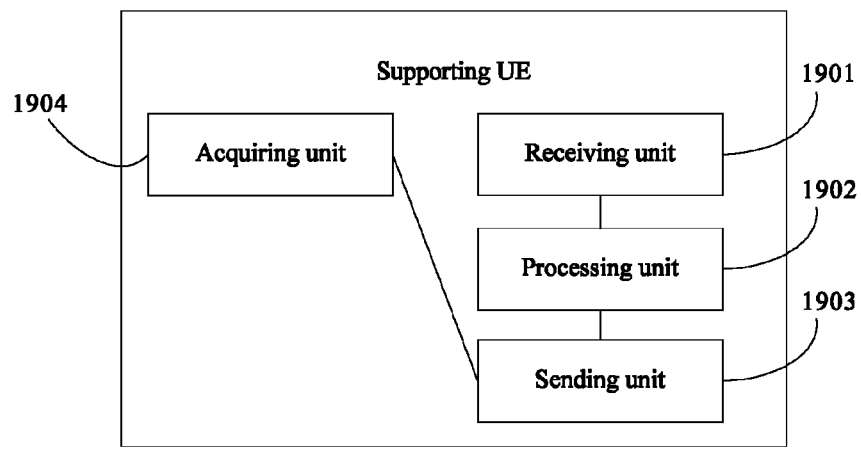
FIG. 21 is a schematic functional diagram of another supporting UE according to an embodiment of the present invention.

Furthermore, as shown in FIG. 21, the supporting UE further includes an acquiring unit 1904, configured to acquire an information report of the supporting UE.

The information report of the supporting UE carries a first short-distance identifier list of the supporting UE, the short-distance identifier of the supporting UE, and status information of the supporting UE. The first short-distance identifier list of the supporting UE is used to record short-distance identifier information of UE that provides a service to the supporting UE. Self capability information of the supporting UE includes self supporting capability information of the supporting UE and self benefitted capability information of the supporting UE. The self supporting capability information of the supporting UE is used to indicate whether the supporting UE supports only friend UE. The self benefited capability information of the supporting UE is used to indicate whether only friend UE provides support to the supporting UE. The friend UE of the supporting UE refers to UE related to the supporting UE.

The sending unit 1903 is further configured to send the information report of the supporting UE to the base station.

For the supporting UE provided in this embodiment of the present invention, after receiving a pairing request message, the supporting UE may perform pairing processing with benefitted UE according to the pairing request message, and send a pairing response message to a base station according to a pairing result. In this way, in a process of establishing cooperative communication, after receiving a multiple user equipment cooperative communication establishment request message sent by the benefitted UE, the base station may send a multiple user equipment cooperative communication authentication request message to a first server, so that the first server acquires a supporting UE short-distance list of the benefited UE according to self benefitted capability information of the benefitted UE and self supporting capability information of the supporting UE, and therefore the pairing request message is sent to UE corresponding to short-distance identifier information recorded in the supporting UE short-distance list of the benefitted UE, that is, a pairing request message is sent to the supporting UE, and the supporting UE performs pairing processing according to the pairing request message, so as to establish a communication link to the benefitted UE, that is, friend UE of the benefitted UE may provide support to the benefited UE, and/or, the supporting UE provides support to friend UE of the supporting UE, so that while transmission of data between the supporting UE and the benefitted UE is implemented, security of data transmission of UE can be improved and user experience of the UE can be improved.

Figure 22:
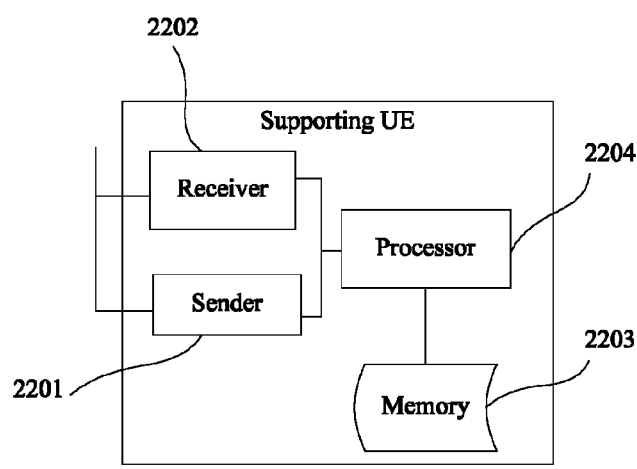
FIG. 22 is a schematic structural diagram of supporting UE according to an embodiment of the present invention.

An embodiment of the present invention provides supporting UE. As shown in FIG. 22, the supporting UE includes: a sender 2201, a receiver 2202, a memory 2203, and a processor 2204 separately connected to the sender 2201, the receiver 2202, and the memory 2203.

The memory 2203 stores a group of program code, and the processor 2204 is configured to invoke the program code in the memory 2203.

The receiver 2202 is configured to receive a pairing request message sent by a network side.

The pairing request message carries a short-distance identifier of benefited UE. The short-distance identifier of the benefitted UE may uniquely identify the benefitted UE.

The processor 2204 is configured to: when self supporting capability information of the supporting UE indicates that the supporting UE supports only friend UE, acquire a friend UE short-distance identifier list.

The friend UE short-distance identifier list is used to record short-distance identifier information of UE that is served by the supporting UE and that is related to the supporting UE. The self supporting capability information of the supporting UE is information used to indicate whether the supporting UE supports only friend UE. The friend UE of the supporting UE refers to UE related to the supporting UE.

The processor 2204 is configured to send a friend UE short-distance identifier list request message to a multiple user equipment cooperative communication mobile broadband control server MUCC MBB Control Server, and receive a friend UE short-distance identifier list response message sent by the MUCC MBB Control Server. The friend UE short-distance identifier list response message carries the friend UE short-distance identifier list.

The friend UE short-distance identifier list request message carries a short-distance identifier of the supporting UE.

The processor 2204 is further configured to perform identity authentication on the benefitted UE according to the acquired friend UE short-distance identifier list and the short-distance identifier, carried in the pairing request message received by the receiver 2202, of the benefitted UE.

The processor 2204 is further configured to: when the benefitted UE has been authenticated, perform pairing processing with the benefitted UE.

The sender 2201 is configured to send a pairing response message to the network side.

The pairing response message includes: a pairing establishment response message or a pairing failure response message.

Furthermore, the sender 2201 is further configured to: when the benefitted UE has not been authenticated by the processor 2204, send the pairing failure response message to the network side.

The processor 2204 is further configured to determine whether the supporting UE provides a supporting service.

The processor 2204 is configured to: in a case in which it is determined that the supporting UE provides a supporting service, when the self supporting capability information of the supporting UE indicates that the supporting UE supports only friend UE, acquire the friend UE short-distance identifier list of the supporting UE.

Furthermore, the sender 2201 is further configured to: in a case in which the processor 2204 determines that the supporting UE does not provide a supporting service, send the pairing failure response message to the network side.

Furthermore, the processor 2204 is further configured to: when the self supporting capability information of the supporting UE indicates that the supporting UE supports all UEs, perform pairing processing with the benefitted UE.

For the supporting UE provided in this embodiment of the present invention, after receiving a pairing request message, when self supporting capability information of the supporting UE indicates that the supporting UE supports only friend UE, the supporting UE acquires a friend UE short-distance identifier list, and performs identity authentication on the benefitted UE according to a short-distance identifier of benefitted UE carried in the pairing request message and the friend UE short-distance identifier list, and in a case in which the benefitted UE has been authenticated, send a pairing establishment response message to a network side, so as to establish a communication link between the supporting UE and the benefitted UE. In this way, in a process of establishing cooperative communication, when the self supporting capability information of the supporting UE indicates that the supporting UE supports only friend UE, the supporting UE may perform identity authentication on the benefitted UE requesting to establish a communication link, and a communication link can be established between the supporting UE and only the benefitted UE that has been authenticated. Because the supporting UE performs identity authentication on the benefitted UE, a communication link can be established between the supporting UE and only the benefited UE related to the supporting UE, so that transmission of data between the supporting UE and the benefitted UE is implemented, thereby improving security of data transmission of UE and improving user experience of the UE.

Figure 23:
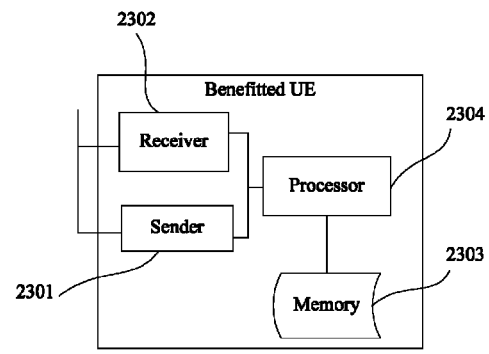
FIG. 23 is a schematic structural diagram of benefited UE according to an embodiment of the present invention.

An embodiment of the present invention provides benefitted UE. As shown in FIG. 23, the benefitted UE includes: a sender 2301, a receiver 2302, a memory 2303, and a processor 2304 separately connected to the sender 2301, the receiver 2302, and the memory 2303.

The memory 2303 stores a group of program code, and the processor 2304 is configured to invoke the program code in the memory 2303.

The processor 2304 is configured to acquire a first short-distance identifier list.

The first short-distance identifier list of the benefitted UE is used to record short-distance identifier information of UE that provides a service to the benefitted UE.

The processor 2304 is further configured to: when self benefitted capability information of the benefitted UE indicates that the benefitted UE allows only friend UE to provide support, acquire a friend UE short-distance identifier list.

The friend UE short-distance identifier list is used to record short-distance identifier information of UE related to the benefited UE. The self benefitted capability information of the benefitted UE is used to indicate whether only friend UE provides support to the benefitted UE. The friend UE of the benefitted UE refers to UE related to the benefitted UE.

Furthermore, the processor 2304 may acquire the friend UE short-distance identifier list of the benefitted UE from an MUCC MBB Control Server. In this case, the processor 2304 is configured to send a friend UE short-distance identifier list request message to the MUCC MBB Control Server, and receive a friend UE short-distance identifier list response message sent by the MUCC MBB Control Server.

The friend UE short-distance identifier list request message carries a short-distance identifier of the benefitted UE. The friend UE short-distance identifier list response message carries the friend UE short-distance identifier list.

It should be noted that, in the MUCC MBB Control Server, a short-distance identifier of UE and a friend UE short-distance identifier list corresponding to the UE are prestored. That is, in the MUCC MBB Control Server, a mapping relationship between the short-distance identifier of the UE and a friend UE short-distance identifier list of the UE is stored.

The processor 2304 is further configured to determine a first friend supporting UE list of the benefitted UE in the first short-distance identifier list of the benefited UE according to the acquired friend UE short-distance identifier list.

The first friend supporting UE list of the benefitted UE is used to record short-distance identifier information of friend supporting UE of the benefitted UE. The short-distance identifier information of the friend supporting UE is short-distance identifier information that is in the first short-distance identifier list and that is the same as the short-distance identifier information recorded in the friend UE short-distance identifier list.

The sender 2301 is configured to send a multiple user equipment cooperative communication establishment request message carrying first information to a network side.

The first information includes the first friend supporting UE list of the benefitted UE and the short-distance identifier of the benefited UE. The short-distance identifier of the benefitted UE may uniquely identify the benefitted UE.

The receiver 2302 is configured to receive a multiple user equipment cooperative communication establishment response message sent by the network side.

The multiple user equipment cooperative communication establishment response message includes: an establishment success response message or an establishment failure response message.

When the multiple user equipment cooperative communication establishment response message is the establishment success response message, the multiple user equipment cooperative communication establishment response message carries a short-distance identifier of supporting UE that sends a pairing establishment response message.

Furthermore, the sender 2301 is further configured to: when the self benefitted capability information of the benefitted UE indicates that the benefitted UE allows any UE to provide support, send a multiple user equipment cooperative communication establishment request message carrying second information to the network side.

The second information includes the first short-distance identifier list of the benefitted UE and the short-distance identifier of the benefitted UE.

Furthermore, the short-distance identifier information of the UE is further used to identify whether the UE provides a supporting service. In this case:

The processor 2304 is further configured to determine, in the first short-distance identifier list according to each piece of short-distance identifier information recorded in the acquired first short-distance identifier list, short-distance identifier information identifying that a supporting service is provided.

The processor 2304 is configured to determine the first friend supporting UE list of the benefitted UE according to the friend UE short-distance identifier list and the short-distance identifier information, in which a supporting service is provided, in the first short-distance identifier list of the benefited UE.

For the benefitted UE provided in this embodiment of the present invention, after the benefitted UE acquires a first short-distance identifier list, when the self benefitted capability information of the benefitted UE indicates that the benefitted UE allows only friend UE to provide support, the benefited UE acquires a friend UE short-distance identifier list, determines a first friend supporting UE list of the benefited UE in the first short-distance identifier list according to the friend UE short-distance identifier list, and sends a first multiple user equipment cooperative communication establishment request message carrying first information to a network side, where the first information includes the first friend supporting UE list of the benefited UE and a short-distance identifier of the benefited UE. In this way, in a process of establishing cooperative communication, when the self benefitted capability information of the benefitted UE indicates that the benefitted UE allows only friend UE to provide support, the benefited UE determines, in the first short-distance identifier list, friend UE that can provide support to the benefitted UE, that is, acquires the first friend supporting UE list, and sends this list to the network side, so that the network side establishes a communication link between friend supporting UE of the benefited UE and the benefitted UE, so as to implement transmission of data between supporting UE and the benefited UE, thereby improving security of data transmission of UE and improving user experience of the UE.

Figure 24:
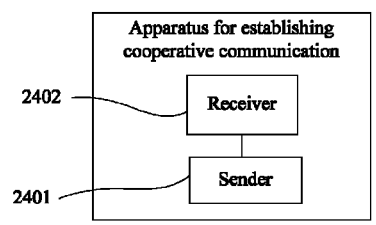
FIG. 24 is a schematic structural diagram of an apparatus for establishing cooperative communication according to an embodiment of the present invention.

An embodiment of the present invention provides an apparatus for establishing cooperative communication. As shown in FIG. 24, the apparatus includes: a sender 2401 and a receiver 2402.

The receiver 2402 is configured to receive a multiple user equipment cooperative communication establishment request message sent by benefitted UE.

The multiple user equipment cooperative communication establishment request message carries first information or second information. The first information includes a first friend supporting UE list of the benefitted UE and a short-distance identifier of the benefitted UE. The second information includes a first short-distance identifier list of the benefitted UE and the short-distance identifier of the benefited UE. The short-distance identifier of the benefitted UE may uniquely identify the benefitted UE.

The sender 2401 is configured to: when the multiple user equipment cooperative communication establishment request message carries the first information, send, according to each piece of short-distance identifier information in the first friend supporting UE list of the benefitted UE, a pairing request message to friend supporting UE corresponding to each piece of short-distance identifier information in the first friend supporting UE list of the benefitted UE. When the multiple user equipment cooperative communication establishment request message carries the second information, send, according to each piece of short-distance identifier information in the first short-distance identifier list of the benefitted UE, the pairing request message to supporting UE corresponding to each piece of short-distance identifier information in the first short-distance identifier list of the benefited UE.

The pairing request message carries the short-distance identifier of the benefitted UE.

The receiver 2402 is further configured to receive a pairing response message sent by supporting UE corresponding to each piece of short-distance identifier information in the first friend supporting UE list of the benefitted UE or a first short-distance list.

The pairing response message includes: a pairing establishment response message or a pairing failure response message.

A multiple user equipment cooperative communication establishment response message includes: an establishment success response message or an establishment failure response message.

Furthermore, when the multiple user equipment cooperative communication establishment response message is the establishment success response message, and the multiple user equipment cooperative communication establishment response message carries a short-distance identifier of supporting UE that sends the pairing establishment response message.

The sender 2401 is further configured to send the multiple user equipment cooperative communication establishment response message to the benefitted UE.

For the apparatus for establishing cooperative communication provided in this embodiment of the present invention, after the apparatus for establishing cooperative communication receives a multiple user equipment cooperative communication establishment request message sent by benefited UE, when the multiple user equipment cooperative communication establishment request message carries first information, according to each piece of short-distance identifier information in a first friend supporting UE list of the benefitted UE, a pairing request message is sent to friend supporting UE corresponding to each piece of short-distance identifier information in the first friend supporting UE list, so that corresponding UE in the first friend supporting UE list determines whether to provide support to this benefitted UE. When the multiple user equipment cooperative communication establishment request message carries second information, according to each piece of short-distance identifier information in a first short-distance identifier list of the benefitted UE, the pairing request message is sent to supporting UE corresponding to each piece of short-distance identifier information in the first short-distance, so that supporting UE corresponding to each piece of short-distance identifier information in the first short-distance identifier list determines whether to provide support to this benefitted UE. The apparatus for establishing cooperative communication receives a pairing response message sent by the first friend supporting UE list of the benefitted UE or supporting UE corresponding to each piece of short-distance identifier information in the first short-distance identifier list, and sends a multiple user equipment cooperative communication establishment response message to the benefitted UE. In this way, in a process of establishing cooperative communication, the benefitted UE may implement that support is only provided to friend UE of the benefitted UE, and therefore a communication link is established between the friend UE of the benefitted UE and the benefitted UE, and/or supporting UE may implement that the supporting UE only provides support to friend UE of the supporting UE, and therefore a communication link is established between the friend UE of the supporting UE and the supporting UE, so that when transmission of data between the supporting UE and the benefitted UE is implemented, security of data transmission of UE is improved and user experience of the UE is improved.

Figure 25:
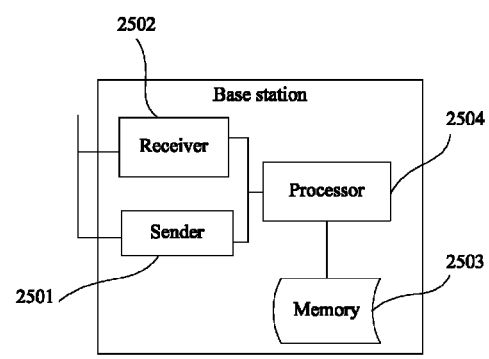
FIG. 25 is a schematic structural diagram of a base station according to an embodiment of the present invention.

An embodiment of the present invention provides a base station. As shown in FIG. 25, the base station includes: a sender 2501, a receiver 2502, a memory 2503, and a processor 2504 separately connected to the sender 2501, the receiver 2502, and the memory 2503.

The memory 2503 stores a group of program code, and the processor 2504 is configured to invoke the program code in the memory 2503.

The receiver 2502 is configured to receive a first multiple user equipment cooperative communication establishment request message sent by benefitted UE.

The first multiple user equipment cooperative communication establishment request message carries a short-distance identifier of the benefitted UE. The short-distance identifier of the benefitted UE may uniquely identify the benefitted UE.

The sender 2501 is configured to send a multiple user equipment cooperative communication authentication request message to a first server.

The multiple user equipment cooperative communication authentication request message carries a first short-distance identifier list of the benefitted UE, self benefitted capability information of the benefitted UE, and the short-distance identifier of the benefitted UE. The first short-distance identifier list of the benefitted UE is used to record short-distance identifier information of UE that provides a service to the benefited UE. The self benefitted capability information of the benefitted UE is information used to indicate whether only friend UE provides support to the benefitted UE.

It should be noted that the first short-distance identifier list of the benefitted UE and the self benefitted capability information of the benefited UE are acquired by the base station in advance.

The receiver 2502 is further configured to receive a multiple user equipment cooperative communication authentication response message sent by the first server.

The multiple user equipment cooperative communication authentication response message carries a supporting UE short-distance identifier list of the benefitted UE. The supporting UE short-distance identifier list is used to record short-distance identifier information of UE that is determined by the first server and that provides a service to the benefitted UE.

Furthermore, the multiple user equipment cooperative communication authentication response message further carries key information of supporting UE corresponding to each piece of short-distance identifier information recorded in the supporting UE short-distance identifier list of the benefitted UE, and key information of the benefitted UE.

The sender 2501 is further configured to send a pairing request message to first supporting UE according to the supporting UE short-distance identifier list.

The first supporting UE is UE corresponding to each piece of short-distance identifier information recorded in the supporting UE short-distance identifier list, and the pairing request message carries the short-distance identifier of the benefitted UE, so that the first supporting UE determines, according to the short-distance identifier of the benefitted UE, whether the first supporting UE performs pairing with the benefitted UE.

Furthermore, the pairing request message further carries the key information of the benefitted UE.

The receiver 2502 is further configured to receive a pairing response message sent by the first supporting UE.

The pairing response message carries a short-distance identifier of the first supporting UE, that is, carries a short-distance identifier of UE that sends the pairing response message to the base station.

Furthermore, the pairing response message includes: a pairing establishment response message or a pairing failure response message.

Furthermore, the pairing response message further carries UE that sends the pairing response message to the base station, that is, key information of the first supporting UE.

The sender 2501 is further configured to send, according to the pairing response message received by the receiver 2502, a multiple user equipment cooperative communication establishment response message to the benefitted UE.

The multiple user equipment cooperative communication establishment response message carries the short-distance identifier of the first supporting UE, that is, a short-distance identifier of UE that sends the pairing response message to the base station.

Further, the multiple user equipment cooperative communication establishment response message includes: an establishment success response message or an establishment failure response message.

The processor 2504 is configured to acquire an information report of UE.

The information report of the UE carries a first short-distance identifier list of the UE, the short-distance identifier of the UE, and self capability information of the UE. The self capability information of the UE includes self supporting capability information of the UE and self benefitted capability information of the UE. The self supporting capability information of the UE is used to indicate whether the UE supports only friend UE. The self benefitted capability information of the UE is used to indicate whether only friend UE provides support to the UE. The UE is UE that performs communication with the base station, and includes: the benefitted UE and the first supporting UE.

The processor 2504 is further configured to acquire link quality information between UE served by the base station and the base station.

The processor 2504 is further configured to update the first short-distance identifier list of the benefitted UE according to the acquired link quality information.

The processor 2504 is configured to determine, according to the acquired link quality information in UEs served by the base station, UE whose link with the base station has quality that is less than a first threshold value; delete, from the first short-distance identifier list of the benefitted UE, short-distance identifier information of the determined UE whose link with the base station has the quality that is less than the first threshold value; and update the first short-distance identifier list of the benefited UE.

It should be noted that the first threshold value is preset.

The sender 2501 is configured to send, to the first server, a multiple user equipment cooperative communication authentication request message that carries the first short-distance identifier list, of the benefitted UE, updated the processor 2504, the short-distance identifier of the benefitted UE, and the self benefitted capability information of the benefitted UE.

For the base station provided in this embodiment of the present invention, after receiving a multiple user equipment cooperative communication establishment request message sent by benefited UE, the base station sends a multiple user equipment cooperative communication authentication request message to a first server, receives a multiple user equipment cooperative communication authentication response message that is sent by the first server and that carries a supporting UE short-distance identifier list of the benefited UE, and sends a pairing request message to first supporting UE according to the supporting UE short-distance identifier list of the benefited UE; and if the base station receives a pairing establishment response message sent by the first supporting UE, the base station sends a multiple user equipment cooperative communication establishment response message to the benefitted UE. In this way, in a process of establishing cooperative communication, after receiving the multiple user equipment cooperative communication establishment request message sent by the benefitted UE, the base station may send the multiple user equipment cooperative communication authentication request message to the first server, so that the first server acquires a supporting UE short-distance list of the benefitted UE, and therefore sends a pairing request to the first supporting UE, so as to establish a communication link between the first supporting UE and the benefited UE, that is, friend UE of the benefitted UE may provide support to the benefitted UE, and/or, supporting UE provides support to friend UE of the supporting UE, so that while transmission of data between the supporting UE and the benefited UE is implemented, security of data transmission of UE can be improved and user experience of the UE can be improved.

Figure 26:
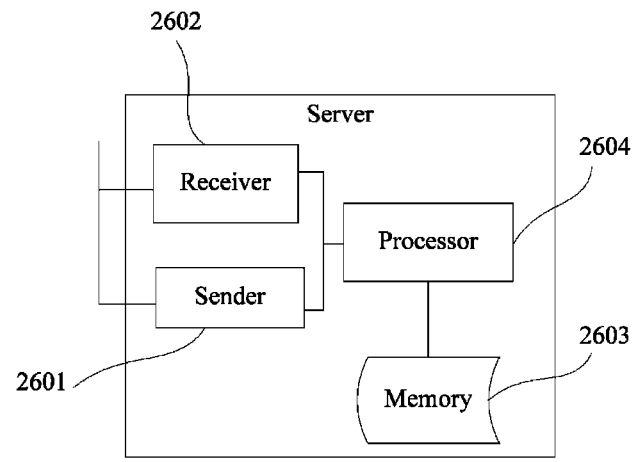
FIG. 26 is a schematic structural diagram of a server according to an embodiment of the present invention.

An embodiment of the present invention provides a server. As shown in FIG. 26, the server includes: a sender 2601, a receiver 2602, a memory 2603, and a processor 2604 separately connected to the sender 2601, the receiver 2602, and the memory 2603.

The memory 2603 stores a group of program code, and the processor 2604 is configured to invoke the program code in the memory 2603.

The receiver 2602 is configured to receive a multiple user equipment cooperative communication authentication request message sent by a base station.

The multiple user equipment cooperative communication authentication request message carries a first short-distance identifier list of a benefitted UE, self benefitted capability information of the benefitted UE, and a short-distance identifier of the benefitted UE. The first short-distance identifier list of the benefited UE is used to record short-distance identifier information of UE that provides support to the benefitted UE. The self benefited capability information of the benefited UE is used to indicate whether only friend UE provides support to the benefitted UE. The short-distance identifier of the benefited UE may uniquely identify the benefited UE.

The processor 2604 is configured to: when the self benefited capability information of the benefited UE indicates that the benefited UE allows only friend UE to provide support, acquire a friend UE short-distance identifier list of the benefited UE according to the short-distance identifier of the benefited UE.

The friend UE short-distance identifier list of the benefitted UE is used to record short-distance identifier information of UE related to the benefitted UE.

The processor 2604 is further configured to determine a first friend supporting UE list of the benefitted UE in the first short-distance identifier list of the benefitted UE according to the acquired friend UE short-distance identifier list of the benefitted UE.

The first friend supporting UE list of the benefited UE is used to record short-distance identifier information of friend supporting UE of the benefitted UE. The short-distance identifier information of the friend supporting UE of the benefitted UE is short-distance identifier information that is in the first short-distance identifier list of the benefitted UE and that is the same as the short-distance identifier information recorded in the friend UE short-distance identifier list of the benefited UE.

The processor 2604 is further configured to acquire, according to the determined short-distance identifier information of the friend supporting UE of the benefitted UE, self supporting capability information of the friend supporting UE of the benefited UE.

The self supporting capability information of the friend supporting UE is used to indicate whether the friend supporting UE supports only friend UE.

The processor 2604 is further configured to determine a supporting UE short-distance identifier list of the benefited UE in the first friend supporting UE list of the benefitted UE according to the acquired self supporting capability information of the friend supporting UE of the benefitted UE.

The supporting UE short-distance identifier list of the benefitted UE is used to record short-distance identifier information of UE that is determined by the server and that provides a supporting service to the benefitted UE.

According to different acquired self supporting capability information of the friend supporting UE of the benefitted UE, a method by using which the processor 2604 determines the supporting UE short-distance identifier list of the benefitted UE in the first friend supporting UE list of the benefitted UE is different, and is as follows.

The processor 2604 is configured to: when the acquired self supporting capability information of the friend supporting UE indicates that the friend supporting UE supports only friend UE, acquire a friend UE short-distance identifier list of the friend supporting UE according to the short-distance identifier information of the friend supporting UE; perform identity authentication on the benefitted UE according to the friend UE short-distance identifier list of the friend supporting UE and the short-distance identifier of the benefited UE; and when it is determined that the benefitted UE has been authenticated, record a short-distance identifier of the friend supporting UE to the supporting UE short-distance identifier list of the benefited UE.

Alternatively, the processor 2604 is configured to: when the acquired self supporting capability information of the friend supporting UE indicates that the friend supporting UE supports all UEs, record a short-distance identifier of the friend supporting UE to the supporting UE short-distance identifier list of the benefitted UE.

The sender 2601 is configured to send a multiple user equipment cooperative communication authentication response message to the base station.

The multiple user equipment cooperative communication authentication response message carries the supporting UE short-distance identifier list of the benefitted UE.

Furthermore, the processor 2604 is further configured to: when the self benefitted capability information of the benefitted UE indicates that the benefitted UE allows any UE to provide support, acquire self supporting capability information of the first UE.

The first UE is a UE corresponding to each piece of short-distance identifier information recorded in the first short-distance identifier list of the benefitted UE.

In this case, the processor 2604 is further configured to determine the supporting UE short-distance identifier list of the benefited UE in the first short-distance identifier list of the benefitted UE according to the acquired self supporting capability information of the first UE.

According to different acquired self supporting capability information of the UE corresponding to each piece of short-distance identifier information recorded in the first short-distance identifier list of the benefited UE, a method by using which the processor 2604 determines the supporting UE short-distance identifier list of the benefitted UE in the first short-distance identifier list of the benefited UE is different, and is as follows.

The processor 2604 is configured to: when the acquired self supporting capability information of the first UE indicates that the first UE supports only friend UE, acquire a friend UE short-distance identifier list of the first UE according to the first short-distance identifier information of the first UE; perform identity authentication on the benefitted UE according to the friend UE short-distance identifier list of the first UE and the short-distance identifier of the benefitted UE; and when it is determined that the benefitted UE has been authenticated, record a short-distance identifier of the first UE to the supporting UE short-distance identifier list of the benefitted UE.

Alternatively, the processor 2604 is configured to: when the acquired self supporting capability information of the first UE indicates that the first UE supports all UEs, record the short-distance identifier of the first UE to the supporting UE short-distance identifier list of the benefitted UE.

Furthermore, the short-distance identifier information of the UE is further used to identify whether the UE provides a supporting service.

In this case, the processor 2604 is further configured to determine, in the supporting UE short-distance identifier list of the UE according to each piece of short-distance identifier information recorded in the supporting UE short-distance identifier list of the benefitted UE, short-distance identifier information identifying that a supporting service is provided.

The processor 2604 is further configured to update the supporting UE short-distance identifier list of the UE according to the determined short-distance identifier information identifying that a supporting service is provided.

The sender 2601 is configured to send the multiple user equipment cooperative communication authentication response message to the base station. In this case, the multiple user equipment cooperative communication authentication response message carries the supporting UE short-distance identifier list, of the UE, updated by the processor 2604.

Furthermore, the processor 2604 is further configured to acquire key information of the benefitted UE and key information of supporting UE corresponding to each piece of short-distance identifier information recorded in the supporting UE short-distance identifier list of the benefitted UE.

The sender 2601 is configured to send the multiple user equipment cooperative communication authentication response message to the base station. In this case, the multiple user equipment cooperative communication authentication response message further carries the key information of the benefitted UE, and the key information of the supporting UE corresponding to each piece of short-distance identifier information in the supporting UE short-distance identifier list of the benefited UE.

For the server provided in this embodiment of the present invention, after the server receives a multiple user equipment cooperative communication authentication request message sent by a base station, when self benefitted capability information of the benefited UE indicates that the only friend UE is allowed to provide support, the server acquires a friend UE short-distance identifier list of the benefited UE according to a short-distance identifier of the benefitted UE, and determines a first friend supporting UE list of the benefitted UE in a first short-distance identifier list of the benefited UE according to the friend UE short-distance identifier list of the benefited UE. The server acquires self supporting capability information of friend supporting UE of the benefitted UE according to short-distance identifier information of the friend supporting UE of the benefitted UE, determines a supporting UE short-distance identifier list of the benefited UE in the first friend supporting UE list of the benefitted UE according to the acquired self supporting capability information of the friend supporting UE of the benefitted UE, and sends, to the base station, a multiple user equipment cooperative communication authentication response message carrying the supporting UE short-distance identifier list of the benefited UE. In this way, when the self benefitted capability information of the benefitted UE indicates that only friend UE is allowed to provide support, the server may determine the first friend supporting UE list that only records short-distance identifier information of friend UE of the benefitted UE, determine, according to self supporting capability information of the UE corresponding to each piece of short-distance identifier information recorded in the first friend supporting UE list, the supporting UE short-distance identifier list of the benefitted UE in the first friend supporting UE according to self supporting capability information of the supporting UE, and send the supporting UE short-distance identifier list to the base station, so that the base station sends a pairing request message to supporting UE corresponding to each piece of short-distance identifier information recorded in the supporting UE short-distance identifier list of the benefitted UE, so as to establish a communication link between the benefited UE and friend supporting UE of the benefitted UE; therefore, while transmission of data between the supporting UE and the benefited UE is implemented, security of data transmission of UE is improved and user experience of the UE is improved.

Figure 27:
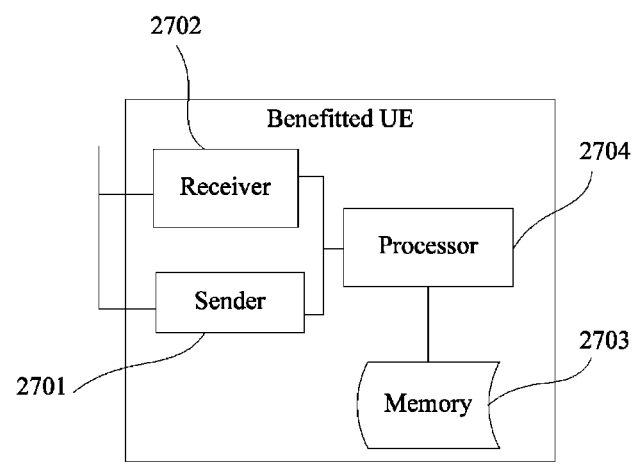
FIG. 27 is a schematic structural diagram of another benefited UE according to an embodiment of the present invention.

An embodiment of the present invention provides benefitted UE. As shown in FIG. 27, the benefitted UE includes: a sender 2701, a receiver 2702, a memory 2703, and a processor 2704 separately connected to the sender 2701, the receiver 2702, and the memory 2703.

The memory 2703 stores a group of program code, and the processor 2704 is configured to invoke the program code in the memory 2703.

The sender 2701 is configured to send a multiple user equipment cooperative communication establishment request message to a base station.

The multiple user equipment cooperative communication establishment request message carries a short-distance identifier of the benefitted UE. The short-distance identifier of the benefitted UE may uniquely identify the benefitted UE.

The receiver 2702 is configured to receive a multiple user equipment cooperative communication establishment response message sent by the base station.

The multiple user equipment cooperative communication establishment response message carries a short-distance identifier of UE that sends a pairing response message to the base station. That is, the multiple user equipment cooperative communication establishment response message carries a short-distance identifier of supporting UE.

The multiple user equipment cooperative communication establishment response message includes: an establishment success response message or an establishment failure response message.

Furthermore, the processor 2704 is configured to acquire an information report of the benefitted UE.

The information report of the benefitted UE carries a first short-distance identifier list of the benefitted UE, the short-distance identifier of the benefited UE, and self capability information of the benefitted UE. The first short-distance identifier list of the benefitted UE is used to record short-distance identifier information of UE that provides a service to the benefitted UE. The self capability information of the benefitted UE includes the self supporting capability information of the benefitted UE and self benefitted capability information of the benefitted UE. The self supporting capability information of the benefitted UE is used to indicate whether the benefitted UE supports only friend UE. The self benefitted capability information of the benefitted UE is used to indicate whether only friend UE provides support to the benefitted UE. Friend UE of the benefited UE refers to UE related to the benefitted UE.

In this case, the sender 2701 is further configured to send the information report of the benefitted UE to the base station.

For the benefitted UE provided in this embodiment of the present invention, the benefitted UE sends a multiple user equipment cooperative communication establishment request message to a base station, so that after receiving the multiple user equipment cooperative communication establishment request message sent by the benefitted UE, the base station sends a multiple user equipment cooperative communication authentication request message to a first server, receives a multiple user equipment cooperative communication authentication response message that is sent by the first server and that carries a supporting UE short-distance identifier list of the benefited UE, and sends a pairing request message to UE corresponding to the supporting UE short-distance identifier list of the benefitted UE according to the supporting UE short-distance identifier list of the benefitted UE; and if the base station receives a pairing establishment response message sent by UE corresponding to the supporting UE short-distance identifier list of the benefitted UE, the base station sends a multiple user equipment cooperative communication establishment response message to the benefitted UE, and the benefited UE receives the multiple user equipment cooperative communication establishment response message sent by the base station. In this way, in a process of establishing cooperative communication, after receiving the multiple user equipment cooperative communication establishment request message sent by the benefitted UE, the base station may send the multiple user equipment cooperative communication authentication request message to the first server, so that the first server acquires a supporting UE short-distance list of the benefitted UE according to self benefitted capability information of the benefitted UE and self supporting capability information of supporting UE, and therefore sends a pairing request to UE corresponding to short-distance identifier information recorded in the supporting UE short-distance list of the benefitted UE, so as to establish a communication link to the benefited UE, that is, friend UE of the benefitted UE may provide support to the benefitted UE, and/or, the supporting UE provides support to friend UE of the supporting UE, so that while transmission of data between the supporting UE and the benefited UE is implemented, security of data transmission of UE can be improved and user experience of the UE can be improved.

Figure 28:
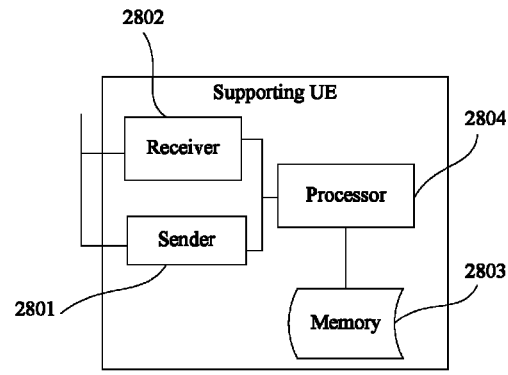
FIG. 28 is a schematic structural diagram of another supporting UE according to an embodiment of the present invention.

An embodiment of the present invention provides supporting UE. As shown in FIG. 28, the supporting UE includes: a sender 2801, a receiver 2802, a memory 2803, and a processor 2804 separately connected to the sender 2801, the receiver 2802, and the memory 2803.

The memory 2803 stores a group of program code, and the processor 2804 is configured to invoke the program code in the memory 2803.

The receiver 2802 is configured to receive a pairing request message of a base station.

The pairing request message carries a short-distance identifier of a benefitted UE.

Furthermore, the pairing request message further carries key information of the benefitted UE.

The processor 2804 is configured to perform pairing processing with the benefitted UE according to the pairing request message received by the receiver 2802.

When the pairing request message carries the key information of the benefitted UE, the processor 2804 is configured to perform pairing processing with the benefitted UE according to the key information of the benefitted UE.

The sender 2801 is configured to send a pairing response message to the base station.

The pairing response message carries a short-distance identifier of the supporting UE. The short-distance identifier of the supporting UE may uniquely identify the supporting UE.

The pairing response message includes: a pairing establishment response message or a pairing failure response message.

Furthermore, the pairing response message further carries key information of the supporting UE.

Furthermore, the processor 2804 is further configured to acquire an information report of the supporting UE.

The information report of the supporting UE carries a first short-distance identifier list of the supporting UE, the short-distance identifier of the supporting UE, and status information of the supporting UE. The first short-distance identifier list of the supporting UE is used to record short-distance identifier information of UE that provides a service to the supporting UE. Self capability information of the supporting UE includes self supporting capability information of the supporting UE and self benefitted capability information of the supporting UE. The self supporting capability information of the supporting UE is used to indicate whether the supporting UE supports only friend UE. The self benefited capability information of the supporting UE is used to indicate whether only friend UE provides support to the supporting UE. The friend UE of the supporting UE refers to UE related to the supporting UE.

The sender 2801 is further configured to send the information report of the supporting UE to the base station.

For the supporting UE provided in this embodiment of the present invention, after receiving a pairing request message, the supporting UE may perform pairing processing with benefitted UE according to the pairing request message, and send a pairing response message to a base station according to a pairing result. In this way, in a process of establishing cooperative communication, after receiving a multiple user equipment cooperative communication establishment request message sent by the benefitted UE, the base station may send a multiple user equipment cooperative communication authentication request message to a first server, so that the first server acquires a supporting UE short-distance list of the benefited UE according to self benefitted capability information of the benefitted UE and self supporting capability information of the supporting UE; therefore, the pairing request message is sent to UE corresponding to short-distance identifier information recorded in the supporting UE short-distance list of the benefitted UE, that is, a pairing request message is sent to the supporting UE, and the supporting UE performs pairing processing according to the pairing request message, so as to establish a communication link to the benefitted UE, that is, friend UE of the benefitted UE may provide support to the benefited UE, and/or, the supporting UE provides support to friend UE of the supporting UE, so that while transmission of data between the supporting UE and the benefitted UE is implemented, security of data transmission of UE can be improved and user experience of the UE can be improved.

Figure 29:
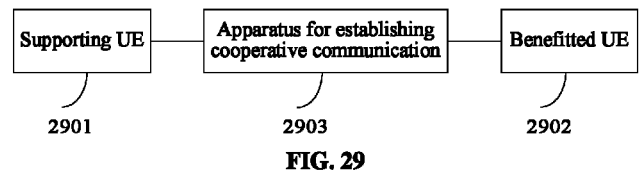
FIG. 29 is a schematic diagram of a system for establishing cooperative communication according to an embodiment of the present invention.

An embodiment of the present invention provides a system for establishing cooperative communication. As shown in FIG. 29, the system includes: supporting UE 2901, benefitted UE 2902, and an apparatus for establishing cooperative communication 2903.

The supporting UE 2901 is the supporting UE according to the foregoing embodiments.

The benefitted UE 2902 is the benefitted UE according to the foregoing embodiments.

The apparatus for establishing cooperative communication 2903 is the apparatus for establishing cooperative communication 2903 according to the foregoing embodiments.

Figure 30:
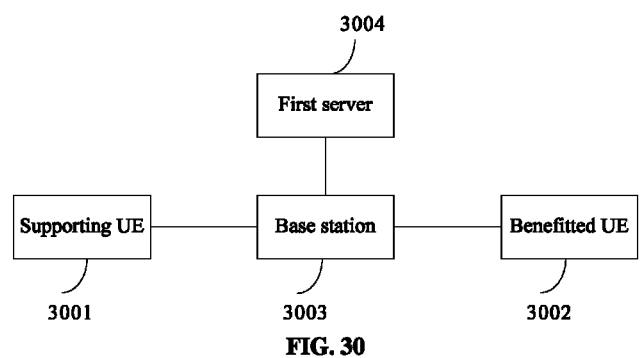
FIG. 30 is a schematic diagram of another system for establishing cooperative communication according to an embodiment of the present invention.

An embodiment of the present invention provides a system for establishing cooperative communication. As shown in FIG. 30, the system includes: supporting UE 3001, benefitted UE 3002, a base station 3003, and a first server 3004.

The base station 3003 is the base station according to the foregoing embodiments.

The first server 3004 is the server according to the foregoing embodiments.

The benefitted UE 3002 is the benefitted UE according to the foregoing embodiments.

The supporting UE 3001 is the supporting UE according to the foregoing embodiments.

For the method, apparatus, and system for establishing cooperative communication provided in the embodiments of the present invention, benefitted UE sends a multiple user equipment cooperative communication establishment request message to a base station, after receiving the multiple user equipment cooperative communication establishment request message sent by the benefitted UE, the base station sends a multiple user equipment cooperative communication authentication request message to a first server, and the first server receives the multiple user equipment cooperative communication authentication request message, determines, according to self benefited capability information of the benefitted UE, supporting UE that provides support to the benefitted UE, determines a supporting UE short-distance identifier list of the benefited UE according to self supporting capability information of the supporting UE that provides support to the benefitted UE, and sends the supporting UE short-distance identifier list of the benefited UE to the base station. After receiving the supporting UE short-distance identifier list of the benefitted UE, the base station sends a pairing request message to first supporting UE according to the supporting UE short-distance identifier list of the benefitted UE. The first supporting UE performs pairing processing with the benefitted UE according to the pairing request message, and sends a pairing response message to the base station. The base station sends a multiple user equipment cooperative communication establishment response message to the benefitted UE. In this way, in a process of establishing cooperative communication, the benefitted UE may implement that only friend UE of the benefitted UE provides support, and therefore a communication link is established between the friend UE of the benefitted UE and the benefitted UE, and/or the supporting UE may implement that the supporting UE provides support to only friend UE of the supporting UE, and therefore a communication link is established between the friend UE of the supporting UE and the supporting UE, so that when transmission of data between the supporting UE and the benefitted UE is implemented, security of data transmission of UE is improved and user experience of the UE is improved.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
  receiving, by a supporting user equipment (UE), a pairing request message sent by a network side, wherein the pairing request message carries a short-distance identifier of a benefitted UE;
  in response to self supporting capability information of the supporting UE indicating that the supporting UE is capable of being paired with a friend UE, acquiring, by the supporting UE, a friend UE short-distance identifier list, wherein the friend UE short-distance identifier list is used to record short-distance identifier information of a UE that is capable of being paired with the supporting UE and that is related to the supporting UE, wherein the supporting UE being paired with the friend UE comprises the supporting UE receiving data for the friend UE from the network side and sending it to the friend UE;

performing, by the supporting UE, identity authentication on the benefitted UE according to the friend UE short-distance identifier list and the short-distance identifier of the benefitted UE that is carried in the pairing request message; and in response to the benefitted UE being authenticated, performing, by the supporting UE, pairing processing with the benefitted UE, and sending a pairing response message to the network side.

2. The method according to claim 1, wherein the acquiring, by the supporting UE, a friend UE short-distance identifier list comprises:

sending, by the supporting UE, a friend UE short-distance identifier list request message to a multiple user equipment cooperative communication mobile broadband control server (MUCC MBB Control Server), wherein the friend UE short-distance identifier list request message carries a short-distance identifier of the supporting UE; and receiving, by the supporting UE, a friend UE short-distance identifier list response message sent by the MUCC MBB Control Server, wherein the friend UE short-distance identifier list response message carries the friend UE short-distance identifier list.

3. The method according to claim 1, further comprising:
determining, by the supporting UE, whether the supporting UE provides a supporting service.

4. The method of claim 3, wherein the acquiring, by the supporting UE, the friend UE short-distance identifier list of the supporting UE occurs in response to the supporting UE determining that the supporting UE provides the supporting service, and in response to the self supporting capability information of the supporting UE indicating that the supporting UE supports the friend UE.

5. The method according to claim 3, further comprising:
in response to the supporting UE determining that the supporting UE does not provide the supporting service, sending a pairing failure response message to the network side.

6. The method according to claim 1, further comprising:
in response to the self supporting capability information of the supporting UE indicating that the supporting UE supports all UEs, performing, by the supporting UE, pairing processing with the benefitted UE, and sending the pairing response message to the network side.

7. A method, comprising:
acquiring, by a benefitted user equipment (UE), a first short-distance identifier list, wherein the first short-distance identifier list of the benefitted UE is used to record short-distance identifier information of a UE that provides a service to the benefitted UE;

in response to self benefitted capability information of the benefitted UE indicating that the benefitted UE allows a friend UE of the benefitted UE to provide support, acquiring, by the benefitted UE, a friend UE short-distance identifier list, wherein the friend UE short-distance identifier list is used to record short-distance identifier information of UE related to the benefitted UE;

determining, by the benefitted UE, a first friend supporting UE list of the benefitted UE in the first short-distance identifier list of the benefitted UE according to the friend UE short-distance identifier list, wherein the first friend supporting UE list of the benefitted UE is used to record short-distance identifier information of friend supporting UE of the benefitted UE, and the short-distance identifier information of the friend supporting UE is short-distance identifier information that is in the first short-distance identifier list and that is the same as the short-distance identifier information recorded in the friend UE short-distance identifier list;

sending, by the benefitted UE, a multiple user equipment cooperative communication establishment request message carrying first information to a network side, wherein the first information comprises the first friend supporting UE list of the benefitted UE and a short-distance identifier of the benefitted UE; and receiving, by the benefitted UE, a multiple user equipment cooperative communication establishment response message sent by the network side.

8. The method according to claim 7, further comprising:
in response to the self benefitted capability information of the benefitted UE indicating that the benefted UE allows any UE to provide support, sending, by the benefitted UE, a multiple user equipment cooperative communication establishment request message carrying second information to the network side, wherein the second information comprises the first short-distance identifier list of the benefitted UE and the short-distance identifier of the benefitted UE.

9. The method according to claim 7, wherein the multiple user equipment cooperative communication establishment response message comprises an establishment success response message or an establishment failure response message.

10. The method according to claim 7, wherein the respective short-distance identifier information is further used to identify whether a respective UE provides a supporting service.

11. The method according to claim 10, further comprising:
determining, in the first short-distance identifier list by the benefitted UE according to each piece of short-distance identifier information recorded in the first short-distance identifier list, short-distance identifier information identifying that a supporting service is provided, wherein the determining, by the benefitted UE, a first friend supporting UE list of the benefitted UE in the first short-distance identifier list of the benefited UE according to the friend UE short-distance identifier list comprises:

determining, by the benefitted UE, the first friend supporting UE list of the benefitted UE according to the friend UE short-distance identifier list and the short-distance identifier information, in which a supporting service is provided, in the first short-distance identifier list of the benefitted UE.

12. A supporting user equipment (UE), comprising:
a processor; and
a receiver, configured to receive a pairing request message sent by a network side, wherein the pairing request message carries a short-distance identifier of a benefitted UE;

a non-transitory computer-readable storage medium storing a program to be executed by the processor, the program including instructions for:
acquiring a friend UE short-distance identifier list in response to self supporting capability information of the supporting UE indicating that the supporting UE is capable of being paired with a friend UE, wherein the friend UE short-distance identifier list is used to record short-distance identifier information of a UE that is capable of being paired with by the supporting UE and that is related to the supporting UE, wherein the supporting UE being paired with the friend UE comprises the supporting UE receiving data for the friend UE from the network side and sending it to the friend UE;

performing identity authentication on the benefitted UE according to the friend UE short-distance identifier list and the short-distance identifier of the benefitted UE that is carried in the pairing request message;

performing pairing processing with the benefitted UE in response to the benefitted UE having been authenticated; and sending a pairing response message to the network side.

13. The supporting UE according to claim 12, wherein the program further includes instructions for sending a friend UE short-distance identifier list request message to a multiple user equipment cooperative communication mobile broadband control server (MUCC MBB Control Server), wherein the friend UE short-distance identifier list request message carries a short-distance identifier of the supporting UE;

wherein the receiver is further configured to receive a friend UE short-distance identifier list response message sent by the MUCC MBB Control Server, wherein the friend UE short-distance identifier list response message carries the friend UE short-distance identifier list.

14. The supporting UE according to claim 12, wherein the program further comprises instructions for:

determining whether the supporting UE provides a supporting service, and acquiring the friend UE short-distance identifier list of the supporting UE in response to determining that the supporting UE provides a supporting service, and in response to the self supporting capability information of the supporting UE indicating that the supporting UE supports only friend UE.

15. The supporting UE according to claim 14, wherein the program further includes instructions for sending a pairing failure response message to the network side in response to determining that the supporting UE does not provide a supporting service.

16. The supporting UE according claim 12, wherein the program further includes instructions for performing pairing processing with the benefitted UE in response to the self supporting capability information of the supporting UE indicating that the supporting UE supports all UEs.

17. The supporting UE according to claim 12, wherein the program further includes instructions for sending a pairing failure response message to the network side in response to the benefitted UE not being authenticated.

18. A benefitted user equipment (UE), comprising:
a processor; and
a non-transitory computer-readable storage medium storing a program to be executed by the processor, the program including instructions for:

acquiring a first short-distance identifier list, wherein the first short-distance identifier list of the benefitted UE is used to record short-distance identifier information of a UE that provides a service to the benefitted UE;

acquiring a friend UE short-distance identifier list, in response to self benefitted capability information of the benefitted UE indicating that the benefitted UE allows a friend UE to provide support, wherein the friend UE short-distance identifier list is used to record short-distance identifier information of UE related to the benefitted UE;

determining a first friend supporting UE list of the benefitted UE in the first short-distance identifier list of the benefitted UE according to the friend UE short-distance identifier list, wherein the first friend supporting UE list of the benefitted UE is used to record short-distance identifier information of friend supporting UE of the benefited UE, and the short-distance identifier information of the friend supporting UE is short-distance identifier information that is in the first short-distance identifier list and that is the same as the short-distance identifier information recorded in the friend UE short-distance identifier list;

sending a multiple user equipment cooperative communication establishment request message carrying first information to a network side, wherein the first information comprises the first friend supporting UE list of the benefitted UE and a short-distance identifier of the benefitted UE; and receiving a multiple user equipment cooperative communication establishment response message sent by the network side.

19. The benefitted UE according to claim 18, wherein the program further includes instructions for sending a multiple user equipment cooperative communication establishment request message carrying second information to the network side in response to the self benefitted capability information of the benefitted UE indicating that the benefitted UE allows any UE to provide support, wherein the second information comprises the first short-distance identifier list of the benefitted UE and the short-distance identifier of the benefitted UE.

20. The benefitted UE according to claim 18, wherein the short-distance identifier information of the UE is further used to identify whether the UE provides a supporting service; and wherein the program further includes instructions for:

determining, in the first short-distance identifier list according to each piece of short-distance identifier information recorded in the first short-distance identifier list, short-distance identifier information identifying that a supporting service is provided; and determining the first friend supporting UE list of the benefitted UE according to the friend UE short-distance identifier list and the short-distance identifier information, in which a supporting service is provided, in the first short-distance identifier list of the benefitted UE.

* * * * *